(12) United States Patent
Li et al.

(10) Patent No.: US 10,798,578 B2
(45) Date of Patent: Oct. 6, 2020

(54) COMMUNICATION METHOD AND RELATED APPARATUS

(71) Applicant: Huawei Technologies Co., Ltd., Shenzhen (CN)

(72) Inventors: He Li, Shanghai (CN); Jing Chen, Shanghai (CN); Li Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/386,462

(22) Filed: Apr. 17, 2019

(65) Prior Publication Data

US 2019/0246282 A1    Aug. 8, 2019

Related U.S. Application Data

(63) Continuation of application No. PCT/CN2017/095348, filed on Jul. 31, 2017.

(30) Foreign Application Priority Data

May 5, 2017 (WO) ................ PCT/CN2017/083362

(51) Int. Cl.
*H04W 8/08* (2009.01)
*H04W 12/10* (2009.01)
(Continued)

(52) U.S. Cl.
CPC ............. *H04W 12/10* (2013.01); *H04L 63/10* (2013.01); *H04L 63/205* (2013.01); *H04W 8/08* (2013.01);
(Continued)

(58) Field of Classification Search
CPC ..... H04W 12/10; H04W 76/27; H04W 80/10; H04W 12/0401; H04W 8/08
See application file for complete search history.

(56) References Cited

U.S. PATENT DOCUMENTS

2011/0261961 A1    10/2011    Dharmaraju et al.
2011/0312299 A1    12/2011    Patil et al.
(Continued)

FOREIGN PATENT DOCUMENTS

CN        101001252 A      7/2007
CN        101064921 A      10/2007
(Continued)

OTHER PUBLICATIONS

Machine Translation and Abstract of Chinese Publication No. CN101001252, Jul. 18, 2007, 23 pages.
(Continued)

*Primary Examiner* — Chuong A Ngo
(74) *Attorney, Agent, or Firm* — Conley Rose, P.C.

(57) ABSTRACT

A communication method and a related apparatus are provided. A base station obtains a security policy, where the security policy includes integrity protection indication information, and the integrity protection indication information is used to indicate the base station whether to enable integrity protection for a terminal device; and when the integrity protection indication information indicates the base station to enable integrity protection for the terminal device, the base station sends a target user plane integrity protection algorithm to the terminal device.

15 Claims, 6 Drawing Sheets

(51) Int. Cl.

| | |
|---|---|
| H04W 76/27 | (2018.01) |
| H04W 12/04 | (2009.01) |
| H04W 12/00 | (2009.01) |
| H04L 29/06 | (2006.01) |
| H04W 92/10 | (2009.01) |
| H04W 12/02 | (2009.01) |
| H04W 12/08 | (2009.01) |
| H04W 80/10 | (2009.01) |

(52) U.S. Cl.
CPC ... *H04W 12/0013* (2019.01); *H04W 12/0017* (2019.01); *H04W 12/02* (2013.01); *H04W 12/0401* (2019.01); *H04W 12/08* (2013.01); *H04W 12/1006* (2019.01); *H04W 76/27* (2018.02); *H04W 80/10* (2013.01); *H04W 92/10* (2013.01)

(56) References Cited

U.S. PATENT DOCUMENTS

| | | | |
|---|---|---|---|
| 2012/0066727 A1 | 3/2012 | Nozoe et al. | |
| 2012/0066737 A1 | 3/2012 | Zhang et al. | |
| 2012/0315878 A1 | 12/2012 | Deng | |
| 2013/0236016 A1* | 9/2013 | Zhang | H04W 12/02 380/270 |
| 2015/0094073 A1 | 4/2015 | Peng | |
| 2015/0163678 A1 | 6/2015 | Zhang et al. | |
| 2016/0360447 A1 | 12/2016 | Ghadge et al. | |
| 2018/0167807 A1 | 6/2018 | Ying et al. | |
| 2018/0213403 A1 | 7/2018 | Shi | |
| 2018/0249479 A1* | 8/2018 | Cho | H04W 12/08 |
| 2019/0124502 A1 | 4/2019 | Zhang et al. | |
| 2019/0313479 A1 | 10/2019 | Myhre et al. | |
| 2020/0037386 A1 | 1/2020 | Park et al. | |

FOREIGN PATENT DOCUMENTS

| | | |
|---|---|---|
| CN | 101075865 A | 11/2007 |
| CN | 101242645 A | 8/2008 |
| CN | 101355811 A | 1/2009 |
| CN | 101478752 A | 7/2009 |
| CN | 101483865 A | 7/2009 |
| CN | 101854625 A | 10/2010 |
| CN | 102149088 A | 8/2011 |
| CN | 102264066 A | 11/2011 |
| CN | 102413461 A | 4/2012 |
| CN | 102448058 A | 5/2012 |
| CN | 102487507 A | 6/2012 |
| CN | 104936171 A | 9/2015 |
| CN | 103609171 B | 4/2018 |
| CN | 108347410 A | 7/2018 |
| CN | 106797562 B | 4/2019 |
| EP | 2416521 A1 | 2/2012 |
| WO | 2014112262 A1 | 7/2014 |
| WO | 2016177143 A1 | 11/2016 |

OTHER PUBLICATIONS

Machine Translation and Abstract of Chinese Publication No. CN101242645, Aug. 13, 2008, 32 pages.
Machine Translation and Abstract of Chinese Publication No. CN102149088, Aug. 10, 2011, 8 pages.
Machine Translation and Abstract of Chinese Publication No. CN102264066, Nov. 30, 2011, 12 pages.
Machine Translation and Abstract of Chinese Publication No. CN108347410, Jul. 31, 2018, 84 pages.
"3rd Generation Partnership Project; Technical Specification Group Services and System Aspects; System Architecture for the 5G System; Stage 2 (Release 15)," 3GPP TS 23.501, V0.4.0, Apr. 2017, 124 pages.
"3rd Generation Partnership Project; Technical Specification Group Services and System Aspects; Procedures for the 5G System; Stage 2 (Release 15)," 3GPP TS 23.502, V0.3.0, Mar. 2017, 115 pages.
"3rd Generation Partnership Project; Technical Specification Group Services and System Aspects; Study on the security aspects of the next generation system (Release 14)," 3GPP TR 33.899, V1.1.0, Mar. 2017, 491 pages.
"3rd Generation Partnership Project; Technical Specification Group Radio Access Network; NG Radio Access Network (NG-RAN); NG Application Protocol (NGAP) (Release 15)," 3GPP TS 38.413, V0.0.2, May 2017, 39 pages.
Ericsson, et al., "Service Request procedure updates," SA WG2 Meeting #119, S2-171375 (revision of S2-170806, 1074, 1144, 0720, 1156), Feb 13-17, 2017, Dubrovnik, Croatia, 9 pages.
CATT, "Security Procedure for Network Slicing," 3GPP TSG SA WG3 (Security) Meeting #86, S3-170114, Feb. 6-10, 3-10, 2017, 5 pages.
"3rd Generation Partnership Project; Technical Specification Group Services and System Aspects; Study on the security aspects of the next generation system (Release 14)," 3GPP TR 33.899, V1.0.0, Mar. 2017, 471 pages.
Foreign Communication From a Counterpart Application, PCT Application No. PCT/CN2017/083362, English Translation of International Search Report dated Feb. 1, 2018, 2 pages.
Foreign Communication From a Counterpart Application, PCT Application No. PCT/CN2017/095348, English Translation of International Search Report dated Jan. 26, 2018, 3 pages.
Machine Translation and Abstract of Chinese Publication No. CN101478752, Jul. 8, 2009, 19 pages.
Machine Translation and Abstract of Chinese Publication No. CN101483865, Jul. 15, 2009, 27 pages.
Foreign Communication From a Counterpart Application, Chinese Application No. 201910028368.1, Chinese Office Action dated Sep. 3, 2019, 5 pages.
Foreign Communication From a Counterpart Application, Chinese Application No. 201811498436.2, Chinese Office Action dated Aug. 27, 2019, 10 pages.
Huawei, et al., "PCR of User Plane Security Protection," 3GPP Draft; S3-161197, vol. SA WG3, Chennai (India); Jul. 25-29, 2016, 12 pages.
Foreign Communication From A Counterpart Application, European Application No. 17908356.3, Extended European Search Report dated Oct. 18, 2019, 9 pages.
Machine Translation and Abstract of Chinese Publication No. CN102413461, Apr. 11, 2012, 13 pages.
Machine Translation and Abstract of Chinese Publication No. CN104936171, Sep. 23, 2015, 18 pages.
Foreign Communication From A Counterpart Application, Chinese Application No. 201910028820.4, Chinese Search Report dated Sep. 30, 2019, 2 pages.
Foreign Communication From A Counterpart Application, Chinese Application No. 201910028820.4, Chinese Office Action dated Oct. 10, 2019, 6 pages.
Machines Translation and Abstract of Chinese Publication No. CN101355811, Jan. 28, 2009, 18 pages.
Foreign Communication From A Counterpart Application, Chinese Application No. 201780031003.3, Chinese Office Action dated Feb. 3, 2020, 15 pages.

* cited by examiner

COMMUNICATION METHOD AND RELATED APPARATUS

CROSS-REFERENCE TO RELATED APPLICATIONS

This application is a continuation of International Application No. PCT/CN2017/095348, filed on Jul. 31, 2017, which claims priority to International Application No. PCT/CN2017/083362, filed on May 5, 2017. The disclosures of the aforementioned applications are hereby incorporated by reference in their entireties.

TECHNICAL FIELD

This application relates to the field of wireless communications technologies, and in particular, to a communication method and a related apparatus.

BACKGROUND

In a Long Term Evolution (LTE) system, a terminal device and a base station perform security operations such as encryption/decryption and integrity protection, to provide encryption protection and integrity protection for signaling. Because different terminal devices have different security capabilities, for example, support different encryption algorithms or integrity protection algorithms, before encryption protection and integrity protection are performed at an access stratum (AS), a set of security algorithms needs to be negotiated between the terminal device and the base station. A process of negotiating the security algorithms includes the following steps:

1. The terminal device sends an attach request to a mobility management entity (MME) by using the base station. The attach request carries an algorithm supported by the terminal device.

2. The base station selects, based on a preconfigured algorithm allowed by a serving network for use and in combination with the algorithm that is supported by the terminal device and that is forwarded by the MME, a security algorithm supported by the serving network. The security algorithm includes an encryption algorithm and an integrity protection algorithm. The base station generates an AS encryption key based on the selected encryption algorithm and generates an integrity protection key based on the integrity protection algorithm. The security algorithm supported by the serving network and selected by the base station is both a security algorithm of a user plane and a security algorithm applied to a signaling plane.

3. By using an AS security mode command (Security mode command, SMC) procedure, the terminal device applies the security algorithm selected by the base station to the user plane and the signaling plane. For example, the encryption algorithm and the integrity protection algorithm selected by the base station are carried in an AS SMC and sent to the terminal device.

In the prior art, the security algorithm applied to both the user plane and the signaling plane is determined by using the AS SMC procedure, and the security algorithm includes the encryption algorithm and the integrity protection algorithm. A negotiation solution of this security algorithm is relatively fixed. For example, a same set of security algorithms is applicable to the user plane and the signaling plane and cannot be split. For another example, the encryption algorithm and the integrity protection algorithm need to be determined at the same time and cannot be split. Therefore, the security negotiation algorithm is relatively fixed, and cannot adapt to flexible and changeable application scenarios.

SUMMARY

Embodiments of this application provide a communication method, a related apparatus, and a storage medium, to adapt to a solution in which a user plane integrity protection algorithm can be flexibly and independently negotiated.

According to a first aspect, an embodiment of this application provides a communication method, including: obtaining, by a base station, a security policy, where the security policy includes integrity protection indication information, and the integrity protection indication information is used to indicate the base station whether to enable integrity protection for a terminal device; and when the integrity protection indication information indicates the base station to enable integrity protection for the terminal device, sending, by the base station, a target user plane integrity protection algorithm to the terminal device. In this way, whether to enable integrity protection for the terminal device may be selected flexibly based on the security policy. In addition, only when integrity protection is enabled for the terminal device, the base station sends the target user plane integrity protection algorithm to the terminal device. On one hand, because a user plane security algorithm is independently negotiated, flexibility of separately determining the user plane security algorithm and a signaling plane security algorithm is improved. On the other hand, because the integrity protection indication information is added, flexibility of determining the target user plane integrity protection algorithm of the terminal device is improved.

Optionally, the integrity protection indication information is an identifier of a user plane integrity protection algorithm. That is, if it is determined that the security policy carries an identifier of a user plane integrity protection algorithm, it may be determined that the base station enables integrity protection for the terminal device. The security policy in this embodiment may carry one or more identifiers of user plane integrity protection algorithms (which may be referred to as an algorithm list). The user plane integrity protection algorithm carried in the security policy in this embodiment may be determined based on at least one of a user plane integrity protection algorithm allowed by a serving network, a user plane integrity protection algorithm supported by the terminal device, and a user plane integrity protection algorithm allowed by the base station. In other words, the user plane integrity protection algorithm carried in the security policy is a user plane integrity protection algorithm allowed by the serving network.

Optionally, the obtaining, by a base station, a security policy may be receiving, by the base station, the security policy from another network element, or may be determining, by the base station, the security policy from at least one security policy prestored on the base station. The security policy prestored on the base station side may also be a security policy preconfigured on the base station side. The base station obtains, in a plurality of manners, the security policy from the at least one security policy prestored on the base station. For example, a security policy that is corresponding to an identifier of the terminal device and that is stored on the base station may be determined based on a correspondence between the identifier of the terminal and the security policy prestored on the base station. For another example, a security policy that is corresponding to a session identifier and that is stored on the base station may be determined based on a correspondence between the session identifier and the security policy prestored on the base station. The solution may be similar to a solution of obtaining the security policy by an SMF entity. Details are not described herein.

Optionally, the sending, by the base station, a target user plane integrity protection algorithm to the terminal device includes: sending, by the base station, the target user plane integrity protection algorithm to the terminal device by using RRC signaling. The solution provided in this embodiment of this application is implemented by reusing RRC signaling in the prior art, so that better compatibility with the prior art is implemented, and a modification to the prior art is relatively small.

In an optional implementation in which the base station sends the target user plane integrity protection algorithm to the terminal device, the base station sends a target signaling plane integrity protection algorithm to the terminal device, and the terminal device also determines the received target signaling plane integrity protection algorithm as the target user plane integrity protection algorithm. That is, the base station sends an integrity protection algorithm to the terminal device, and the integrity protection algorithm is both a signaling plane integrity protection algorithm and a user plane integrity protection algorithm.

Optionally, before the sending, by the base station, a target user plane integrity protection algorithm to the terminal device, the method further includes: determining, by the base station, the target user plane integrity protection algorithm based on a user plane integrity protection algorithm supported by the terminal device and a user plane integrity protection algorithm allowed by the base station. In this way, both a security capability of the terminal device and a security capability of the base station can be considered, so that the determined target user plane integrity protection algorithm matches both the security capability of the terminal device and the security capability of the base station.

Optionally, the user plane integrity protection algorithm allowed by the base station is a user plane integrity protection algorithm sorted based on a priority, so that a better target user plane integrity protection algorithm on the base station side can be selected. Alternatively, optionally, the user plane integrity protection algorithm supported by the terminal device is a user plane integrity protection algorithm sorted based on a priority, so that a better target user plane integrity protection algorithm on the terminal device side can be selected.

Optionally, the security policy further includes a user plane integrity protection algorithm allowed by a serving network, and the determining, by the base station, the target user plane integrity protection algorithm based on a user plane integrity protection algorithm supported by the terminal device and a user plane integrity protection algorithm allowed by the base station includes: determining, by the base station, the target user plane integrity protection algorithm based on the user plane integrity protection algorithm allowed by the base station, the user plane integrity protection algorithm supported by the terminal device, and the user plane integrity protection algorithm allowed by the serving network. In this way, both the security capability of the terminal device and the security capability of the base station can be considered, and an actual status of the serving network is also considered. Therefore, on one hand, the determined target user plane integrity protection algorithm can match the security capability of the terminal device and the security capability of the base station; on the other hand, better matches the actual status of the serving network.

Optionally, when the security policy further includes the user plane integrity protection algorithm allowed by the serving network, the base station may also determine an algorithm, included in the security policy, other than the user plane integrity protection algorithm allowed by the serving network, as the target user plane integrity protection algorithm. For example, one algorithm may be determined from the user plane integrity protection algorithm allowed by the base station as the target user plane integrity protection algorithm.

Optionally, the user plane integrity protection algorithm allowed by the serving network is a user plane integrity protection algorithm sorted based on a priority, so that a better target user plane integrity protection algorithm based on the serving network can be selected.

Optionally, the method further includes: when the security policy further includes encryption indication information, and the encryption indication information is used to indicate the base station to enable encryption protection for the terminal device, sending, by the base station, a target user plane encryption algorithm to the terminal device; or when the security policy further includes a key length, sending, by the base station, the key length to the terminal device; or when the security policy further includes D-H indication information, and the D-H indication information is used to indicate the base station to enable D-H for the terminal device, sending, by the base station, a D-H related key to the terminal device. In this way, any information in the security policy may be more flexibly indicated, so that a finally determined security policy is more adapted to a complex application scenario.

Optionally, before the sending, by the base station, a target user plane integrity protection algorithm to the terminal device, the method further includes: receiving, by the base station, quality of service of a current session of the terminal device from an SMF entity, and allocating, by the base station, a target data radio bearer to the terminal device based on at least one of the security policy and the quality of service.

To save resources, optionally, the allocating, by the base station, a target data radio bearer to the terminal device based on at least one of the security policy and the quality of service includes: when at least one historical data radio bearer meeting a first condition exists on the base station, determining, by the base station, one of the at least one historical data radio bearer meeting the first condition as the target data radio bearer, where quality of service supported by each data radio bearer of the at least one historical data radio bearer meeting the first condition is the same as the quality of service of the current session, and the security policy is the same as a security policy supported by each data radio bearer.

Optionally, the first condition includes that quality of service of two data radio bearers is the same, and security policies of the two data radio bearers are the same.

To save resources, in another optional solution, the allocating, by the base station, a target data radio bearer to the terminal device based on at least one of the security policy and the quality of service includes: when no historical data radio bearer meeting a first condition exists on the base station, but at least one historical data radio bearer meeting a second condition exists on the base station, updating, by the base station, one historical data radio bearer of the at least one historical data radio bearer meeting the second condition, and determining the historical data radio bearer as the target data radio bearer, where quality of service supported by each data radio bearer of the at least one historical data radio bearer meeting the second condition is the same as the quality of service of the current session, and the security policy matches a security policy supported by each data radio bearer; or quality of service supported by each data radio bearer of the at least one historical data radio bearer meeting the second condition matches the quality of service of the current session, and the security policy is the same as a security policy supported by each data radio bearer; or quality of service supported by each data radio bearer of the at least one historical data radio bearer meeting the second condition matches the quality of service of the current session, and the security policy matches a security policy supported by each data radio bearer.

Optionally, the second condition includes that quality of service of two data radio bearers matches each other, and security policies of the two data radio bearers are the same. Alternatively, optionally, the second condition includes that quality of service of two data radio bearers is the same, and security policies of the two data radio bearers match each other. Alternatively, optionally, the second condition includes that quality of service of two data radio bearers matches each other, and security policies of the two data radio bearers match each other.

To select an appropriate target data radio bearer, in another optional solution, the allocating, by the base station, a target data radio bearer to the terminal device based on at least one of the security policy and the quality of service includes: when no historical data radio bearer meeting a first condition exists on the base station, and no at least one historical data radio bearer meeting a second condition exists on the base station, creating, by the base station, the target data radio bearer for the terminal device based on at least one of the security policy and the quality of service.

To select an appropriate target data radio bearer, in another optional solution, the allocating, by the base station, a target data radio bearer to the terminal device based on at least one of the security policy and the quality of service includes: when no historical data radio bearer meeting a first condition exists on the base station, creating, by the base station, the target data radio bearer for the terminal device based on at least one of the security policy and the quality of service.

To select an appropriate target data radio bearer, in another optional solution, the allocating, by the base station, a target data radio bearer to the terminal device based on at least one of the security policy and the quality of service includes: creating, by the base station, the target data radio bearer for the terminal device based on at least one of the security policy and the quality of service.

Optionally, the obtaining, by a base station, a security policy includes: receiving, by the base station, the security policy from the SMF entity; or receiving, by the base station, an identifier of the security policy from the SMF entity, and obtaining the security policy based on the identifier of the security policy.

Optionally, in this embodiment of this application, the method further includes: obtaining, by the base station, a signaling plane security algorithm supported by the terminal device; determining, by the base station, a target signaling plane security algorithm based on the signaling plane security algorithm supported by the terminal device and a signaling plane security algorithm allowed by the base station; and adding, by the base station, the target signaling plane security algorithm to an access stratum AS security mode command SMC, and sending the AS SMC to the terminal device. In this way, a signaling plane algorithm and a user plane security algorithm may be decoupled, so that the user plane security algorithm and the signaling plane security algorithm are separately negotiated, to provide a basis for more flexibly determining the user plane security algorithm.

Optionally, when determining to enable user plane integrity protection, the base station enables user plane integrity protection.

Optionally, when determining to enable user plane encryption protection, the base station enables user plane encryption protection.

Optionally, when the base station determines not to enable user plane integrity protection temporarily, or the base station currently cannot determine whether to enable user plane integrity protection, the base station does not enable user plane integrity protection.

Optionally, when the base station determines not to enable user plane encryption protection temporarily, or the base station currently cannot determine whether to enable user plane encryption protection, the base station does not enable user plane encryption protection.

"Temporarily" means that there is a time period. That user plane integrity protection is not enabled temporarily means that user plane integrity protection is not enabled within one time period, but user plane integrity protection is enabled in another time period. That user plane encryption protection is not enabled temporarily means that user plane encryption protection is not enabled within one time period, but user plane encryption protection is enabled in another time period.

In an optional implementation, it is stipulated in a network that after an AS security mode command is received, user plane encryption protection may be enabled, but whether to enable user plane integrity protection is notified to the terminal device by using an RRC reconfiguration message. In this case, the terminal device cannot determine whether to enable user plane integrity protection.

In another optional implementation, it is stipulated in a network that after an AS security mode command is received, only signaling plane security is enabled (signaling plane integrity protection and/or signaling plane encryption protection are/is enabled), but whether to enable user plane integrity protection and whether to enable user plane encryption protection are notified to the terminal device by using an RRC reconfiguration message. In this case, whether to enable user plane integrity protection and whether to enable user plane encryption protection cannot be determined.

Optionally, not enabling user plane integrity protection includes: when whether to enable user plane integrity protection cannot be determined or it is determined not to enable user plane integrity protection temporarily, generating a user plane integrity protection key but not performing user plane integrity protection by using the user plane integrity protection key; and when it is determined to enable user plane integrity protection, performing user plane integrity protection by using the user plane integrity protection key. In this implementation, the user plane integrity protection algorithm is obtained before the user plane integrity protection key is generated, for example, the signaling plane integrity protection algorithm may also be used as the user plane integrity protection algorithm.

Optionally, not enabling user plane integrity protection includes: when it is determined to enable user plane integrity protection, generating a user plane integrity protection key, and performing user plane integrity protection by using the user plane integrity protection key. That is, when whether to enable user plane integrity protection cannot be determined or it is determined not to enable user plane integrity protection temporarily, the user plane integrity protection key may not be generated when user plane integrity protection is not enabled. Correspondingly, for example, for the terminal device and the base station, if it is determined that the terminal device and the base station always do not enable user plane integrity protection (for example, which may be a preset condition), the user plane integrity protection key may not be generated.

Optionally, not enabling user plane encryption protection includes: when whether to enable user plane encryption protection cannot be determined or it is determined not to enable user plane encryption protection temporarily, generating a user plane encryption key, but not performing user plane encryption protection by using the user plane encryption key; and when it is determined to enable user plane encryption protection, performing user plane encryption protection by using the user plane encryption key. In this implementation, the user plane encryption algorithm is obtained before the user plane encryption key is generated, for example, the signaling plane encryption algorithm may also be used as the user plane encryption algorithm. Optionally, not enabling user plane encryption protection includes: when it is determined to enable user plane encryption protection, generating a user plane encryption key, and performing user plane encryption protection by using the user plane encryption key. That is, when whether to enable user plane encryption protection cannot be determined or it is determined not to enable user plane encryption protection temporarily, the user plane encryption key may not be generated. Correspondingly, for example, for the terminal device and the base station, if it is determined that the terminal device and the base station always do not enable user plane encryption protection (for example, which may be a preset condition), the user plane encryption key may not be generated.

Optionally, the base station obtains integrity protection indication information and/or encryption indication information, and determines, based on the obtained integrity protection indication information, whether to enable integrity protection, or determines, based on the encryption indication information, whether to enable user plane encryption protection. The integrity protection indication information is used to indicate whether to enable user plane integrity protection, and the encryption indication information is used to indicate whether to enable user plane encryption protection.

Optionally, there are a plurality of manners of obtaining the integrity protection indication information and/or the encryption indication information by the base station. For example, the base station generates the integrity protection indication information and/or the encryption indication information through determining or receives at least one of the integrity protection indication information and the encryption indication information sent by another network element. The another network element may be the SMF entity.

Optionally, the base station may send at least one of the integrity protection indication information and the encryption indication information to the terminal device, so that the terminal device determines whether to enable user plane integrity protection and/or whether to enable user plane encryption protection. Alternatively, the terminal device determines whether to enable user plane integrity protection and/or whether to enable user plane encryption protection.

Optionally, the integrity protection indication information and/or the encryption indication information may be bit information or an identifier of an algorithm. For example, the integrity protection indication information is an identifier of the target user plane integrity protection algorithm. For another example, the encryption indication information is an identifier of the target user plane encryption protection algorithm. For another example, 1-bit information is used to indicate the integrity protection indication information or the encryption indication information. For another example, 2-bit information is used to indicate the integrity protection indication information and the encryption indication information.

According to a second aspect, an embodiment of this application provides a communication method, including: receiving, by an SMF entity, a request message, where the request message includes a parameter related to a security policy; obtaining, by the SMF entity, the security policy or an identifier of the security policy based on the parameter related to the security policy; and sending, by the SMF entity, the security policy or the identifier of the security policy to a base station, where the security policy includes integrity protection indication information, and the integrity protection indication information is used to indicate the base station whether to enable integrity protection for a terminal device. On one hand, because a user plane security algorithm is independently negotiated, flexibility of separately determining the user plane security algorithm and a signaling plane security algorithm is improved. On the other hand, because the integrity protection indication information is added, flexibility of determining the target user plane integrity protection algorithm of the terminal device is improved.

Optionally, the integrity protection indication information is an identifier of a user plane integrity protection algorithm. That is, if it is determined that the security policy carries an identifier of a user plane integrity protection algorithm, it may be determined that the base station enables integrity protection for the terminal device. The security policy in this embodiment may carry one or more identifiers of user plane integrity protection algorithms (which may be referred to as an algorithm list). The user plane integrity protection algorithm carried in the security policy in this embodiment may be determined based on at least one of a user plane integrity protection algorithm allowed by a serving network, a user plane integrity protection algorithm supported by the terminal device, and a user plane integrity protection algorithm allowed by the base station. In other words, the user plane integrity protection algorithm carried in the security policy is a user plane integrity protection algorithm allowed by the serving network.

Optionally, the parameter related to the security policy includes at least one of an identifier of the terminal device, a data network name DNN of the terminal device, an identifier of a slice of the terminal device, quality of service of the terminal device, and a session identifier of the terminal device. In this way, the security policy may be formulated based on different identifiers from different perspectives or at different granularities, and this is more flexible.

Optionally, the obtaining, by the SMF entity, the security policy or an identifier of the security policy based on the parameter related to the security policy includes: when the parameter related to the security policy includes the identifier of the terminal device, obtaining, by the SMF entity, the security policy based on the identifier of the terminal device and an association relationship between the identifier of the terminal device and the security policy. In this way, the security policy may be determined at a granularity of the terminal device, so that different terminal devices can be corresponding to different security policies.

In another optional implementation, the obtaining, by the SMF entity, the security policy or an identifier of the security policy based on the parameter related to the security policy includes: when the parameter related to the security policy includes the identifier of the slice of the terminal device, obtaining, by the SMF entity, the security policy based on the identifier of the slice of the terminal device and an association relationship between the identifier of the slice and the security policy. In this way, the security policy may be determined at a granularity of the slice, so that a terminal device accessing different slices can be corresponding to different security policies.

In another optional implementation, the obtaining, by the SMF entity, the security policy or an identifier of the security policy based on the parameter related to the security policy includes: when the parameter related to the security policy includes the session identifier of the terminal device, obtaining, by the SMF entity, the security policy based on the session identifier of the terminal device and an association relationship between the session identifier and the security policy. In this way, the security policy may be determined at a granularity of a session, so that a terminal device initiating different sessions can be corresponding to different security policies.

In another optional implementation, the obtaining, by the SMF entity, the security policy or an identifier of the security policy based on the parameter related to the security policy includes: when the parameter related to the security policy includes the quality of service of the terminal device, obtaining, by the SMF entity, the security policy based on the quality of service of the terminal device. In this way, the security policy may be determined at a granularity of the quality of service, so that a terminal device initiating different quality of service can be corresponding to different security policies.

Optionally, the security policy further includes at least one of the following content: encryption indication information, where the encryption indication information is used to indicate the base station to enable encryption protection for the terminal device; a key length; D-H indication information, where the D-H indication information is used to indicate the base station to enable D-H for the terminal device; and a user plane integrity protection algorithm allowed by the serving network. In this way, any information in the security policy may be more flexibly indicated, so that a finally determined security policy is more adapted to a complex application scenario.

Optionally, the SMF entity sends integrity protection indication information and/or encryption indication information to the base station. The integrity protection indication information is used to indicate whether to enable user plane integrity protection, and the encryption indication information is used to indicate whether to enable encryption protection. Optionally, the SMF entity determines whether to enable user plane integrity protection and/or whether to enable user plane encryption protection in a plurality of implementations. Refer to subsequent embodiments, or refer to the implementation in which the base station determines whether to enable user plane integrity protection and/or whether to enable user plane encryption protection, and details are not described herein again.

According to a third aspect, an embodiment of this application provides a base station, where the base station includes a memory, a transceiver, and a processor; the memory is configured to store an instruction; the processor is configured to execute the instruction stored in the memory and control the transceiver to perform signal receiving and signal sending; and when the processor executes the instruction stored in the memory, the base station is configured to perform the method according to any one of the first aspect or the implementations of the first aspect.

According to a fourth aspect, an embodiment of this application provides an SMF entity, where the SMF entity includes a memory, a transceiver, and a processor; the memory is configured to store an instruction; the processor is configured to execute the instruction stored in the memory and control the transceiver to perform signal receiving and signal sending; and when the processor executes the instruction stored in the memory, the SMF entity is configured to perform the method according to any one of the second aspect or the implementations of the second aspect.

According to a fifth aspect, an embodiment of this application provides a base station, configured to implement the method according to any one of the first aspect or the implementations of the first aspect, and including corresponding functional modules, separately configured to implement steps in the foregoing method.

According to a sixth aspect, an embodiment of this application provides an SMF entity, configured to implement the method according to any one of the second aspect or the implementations of the second aspect, and including corresponding functional modules, separately configured to implement steps in the foregoing method.

According to a seventh aspect, an embodiment of this application provides a computer storage medium, where the computer storage medium stores an instruction; and when the instruction runs on a computer, the computer performs the method according to any one of the first aspect or the possible implementations of the first aspect.

According to an eighth aspect, an embodiment of this application provides a computer storage medium, where the computer storage medium stores an instruction; and when the instruction runs on a computer, the computer performs the method according to any one of the second aspect or the possible implementations of the second aspect.

According to a ninth aspect, an embodiment of this application provides a computer program product including an instruction, and when the computer program product runs on a computer, the computer performs the method according to any one of the first aspect or the possible implementations of the first aspect.

According to a tenth aspect, an embodiment of this application provides a computer program product including an instruction, and when the computer program product runs on a computer, the computer performs the method according to any one of the second aspect or the possible implementations of the second aspect.

In the embodiments of this application, the security policy includes the integrity protection indication information, and the integrity protection indication information is used to indicate the base station whether to enable integrity protection for the terminal device. The base station obtains the security policy. When the integrity protection indication information indicates the base station to enable integrity protection for the terminal device, the base station sends the target user plane integrity protection algorithm to the terminal device. In this way, whether to enable integrity protection for the terminal device may be selected flexibly based on the security policy. In addition, only when integrity protection is enabled for the terminal device, the base station sends the target user plane integrity protection algorithm to the terminal device. On one hand, because a user plane security algorithm is independently negotiated, flexibility of separately determining the user plane security algorithm and a signaling plane security algorithm is improved. On the other hand, because the integrity protection indication information is added, flexibility of determining the target user plane integrity protection algorithm of the terminal device is improved.

DESCRIPTION OF EMBODIMENTS

Figure 1:
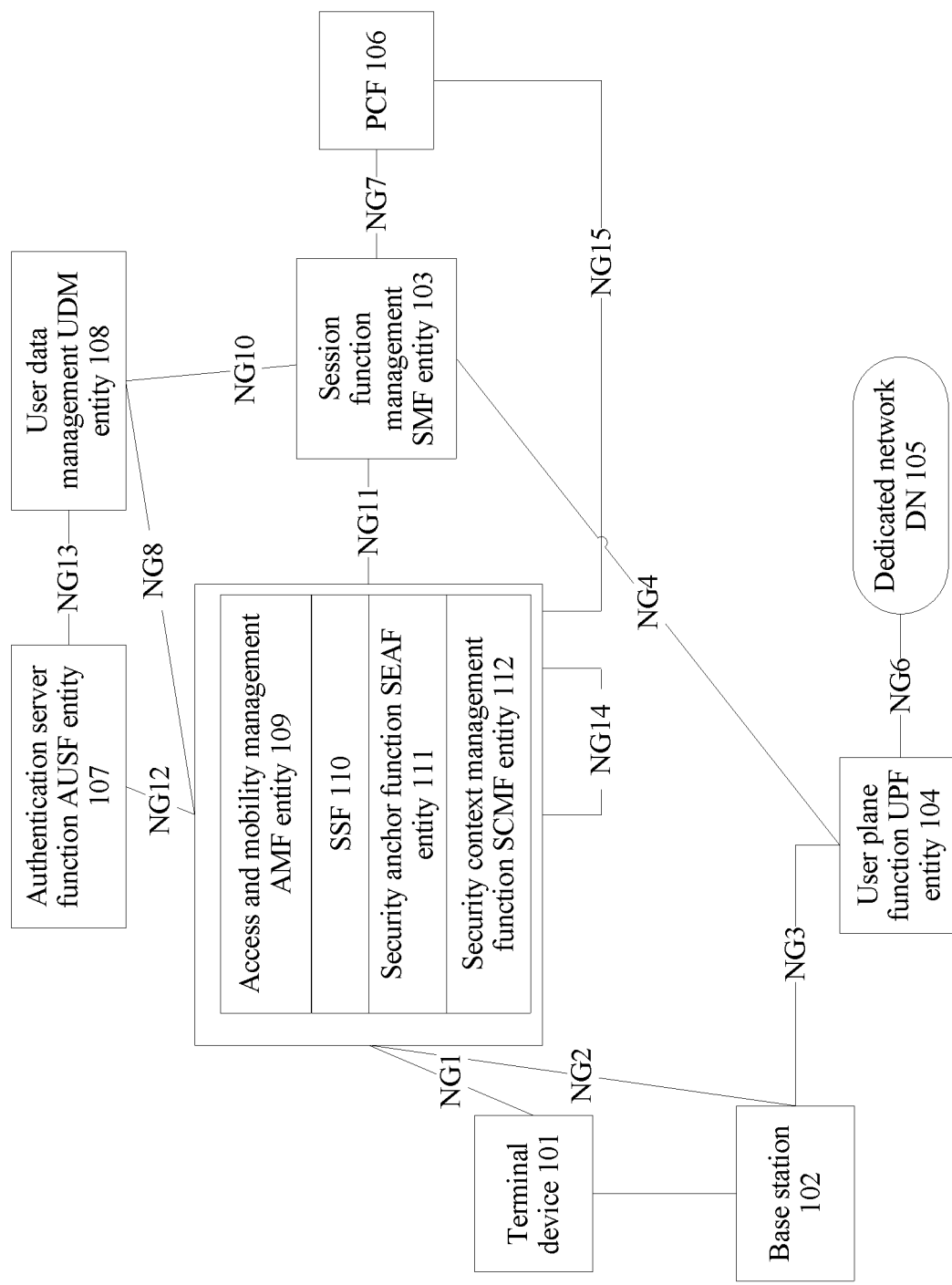
FIG. 1 is a schematic diagram of a system architecture to which an embodiment of this application is applicable.

FIG. 1 shows an example of a schematic diagram of a system architecture to which embodiments of this application is applicable. As shown in FIG. 1, a 5G system architecture includes a terminal device 101. The terminal device 101 may communicate with one or more core networks by using a radio access network (RAN). The terminal device may refer to user equipment (UE), an access terminal device, a subscriber unit, a subscriber station, a mobile station, a mobile console, a remote station, a remote terminal device, a mobile device, a user terminal device, a terminal device, a wireless communications device, a user agent, or a user apparatus. The access terminal device may be a cell phone, a cordless phone, a Session Initiation Protocol (SIP) phone, a wireless local loop (WLL) station, a personal digital assistant (PDA), a handheld device having a wireless communication function, a computing device or another processing device that is connected to a wireless modem, an in-vehicle device, a wearable device, a terminal device in a future 5G network, or the like.

A base station 102 is connected to the terminal device 101. Optionally, the base station 102 may be a 5G NodeB (gNB), may be an evolved eNB, or may be a new base station such as an LTE NodeB eNB, a 3G NodeB NB, or an evolved 5G NodeB, and may be written as an (R) AN in English. The base station 102 may be a device configured to communicate with the terminal device. For example, the base station 102 may be a base transceiver station (BTS) in a GSM system or CDMA, may be a NodeB (NodeB, NB) in a WCDMA system, may be an evolved NodeB (eNB or eNodeB) in an LTE system, or may be a 5G base station. Alternatively, the network device may be a relay node, an access point, an in-vehicle device, a wearable device, a network-side device in a future 5G network, a network device in a future evolved PLMN network, or the like.

A session management function (SMF) entity 103 may be a function split from a mobility management module (MME) in LTE, and may be mainly responsible for establishing a user session, and only after the user session is established, data can be received and transmitted. The MME in the LTE system is a network element responsible for security, mobility management, and session management on a core network side. Security means that the terminal device 101 needs to perform mutual authentication with a network when the terminal device 101 accesses the network initially. After mutual authentication, the terminal device 101 and the core network generate a key. After the key is generated, the terminal device 101 and the MME perform algorithm negotiation, namely, security capability negotiation. Mobility management is to record location information of the terminal device 101, and select an appropriate user plane network element device for the terminal device 101 based on the location information of the terminal device 101. Session management is to be responsible for establishing a user plane link of the terminal device 101. The terminal device 101 can access the network only after a data plane link of a user is established.

A user plane function (UPF) entity 104 may be a combination of a serving gateway (S-GW) and a public data network gateway (P-GW) in the LTE system, is a user plane functional network element of the terminal device 101, and is mainly responsible for connecting to an external network.

A dedicated network (DN) 105 may be network that provides a service for the terminal device 101. For example, some DNs may provide a network access function for the terminal device 101, and some DNs may provide an SMS message function for the terminal device 101. A policy control function (PCF) 106 is further included.

An authentication server function (AUSF) entity 107 interacts with an authentication credential repository and processing function (ARPF) and terminates an authentication request from an SEAF. The authentication server function entity 107 is also a function split from a home subscriber server (HSS) in the LTE system. The AUSF 107 may be an independent network element. The HSS in the LTE system may store subscription information of the user and a long-term key of the user.

The ARPF may be integrated into a user data management (UDM) entity 108 as a part of the UDM. The ARPF is split from the HSS in LTE, and is mainly used to store the long-term key. Processing related to the long-term key is also completed here.

A function of an access and mobility management (AMF) entity 109 is to manage an access problem of the terminal device 101, and further manage mobility of the terminal device 101. The function may be a mobility management module (MM) function in the MME in LTE, and further includes a function of access management. A slice select function (SSF) 110 is further included.

A security anchor function (SEAF) entity 111 is responsible for authentication functions of the terminal device 101 and a network side, and stores an anchor key after authentication succeeds.

A security context management function (SCMF) entity 112 obtains a key from the SEAF 111 and further derives another key, and is a function split from the MME. In an actual situation, the SEAF 111 and the SCMF 112 may further be combined into one separate authentication function (AUF) entity. As shown in FIG. 1, the SEAF 111 and the SCMF 112 are combined into the AMF 109 to form one network element.

FIG. 1 further shows possible implementations of an interface in each network element, for example, an NG2 interface between the base station 102 and the AMF entity 109, and an NG9 interface between the base station 102 and the UPF entity 104. Details are not described herein.

Figure 2A:
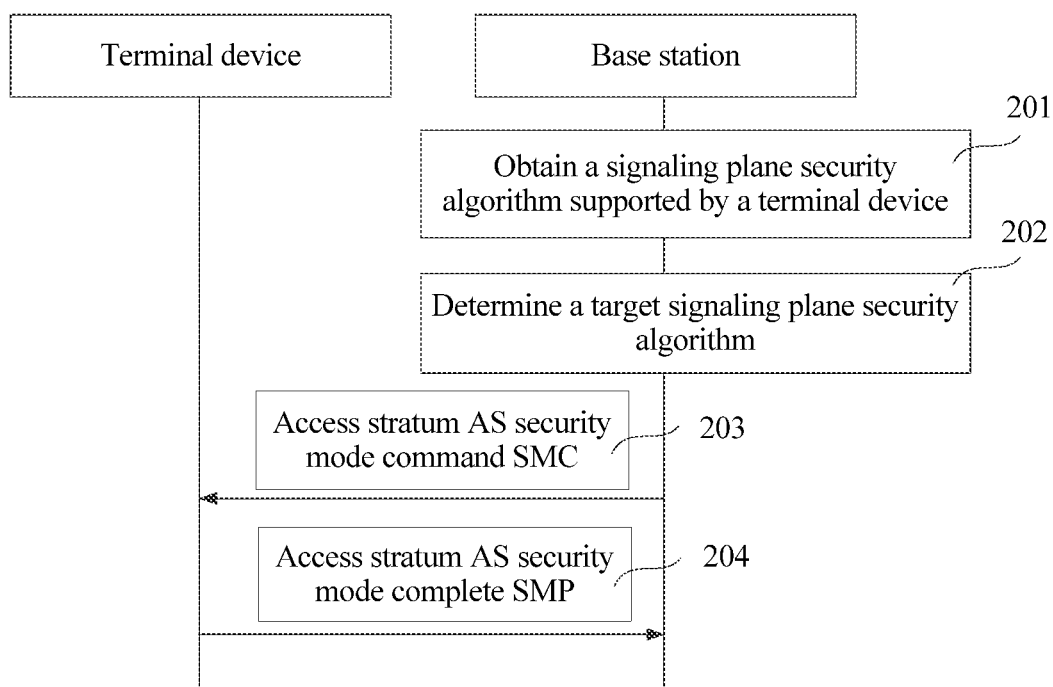
FIG. 2A is a schematic flowchart of a communication method according to an embodiment of this application.
Figure 2B:
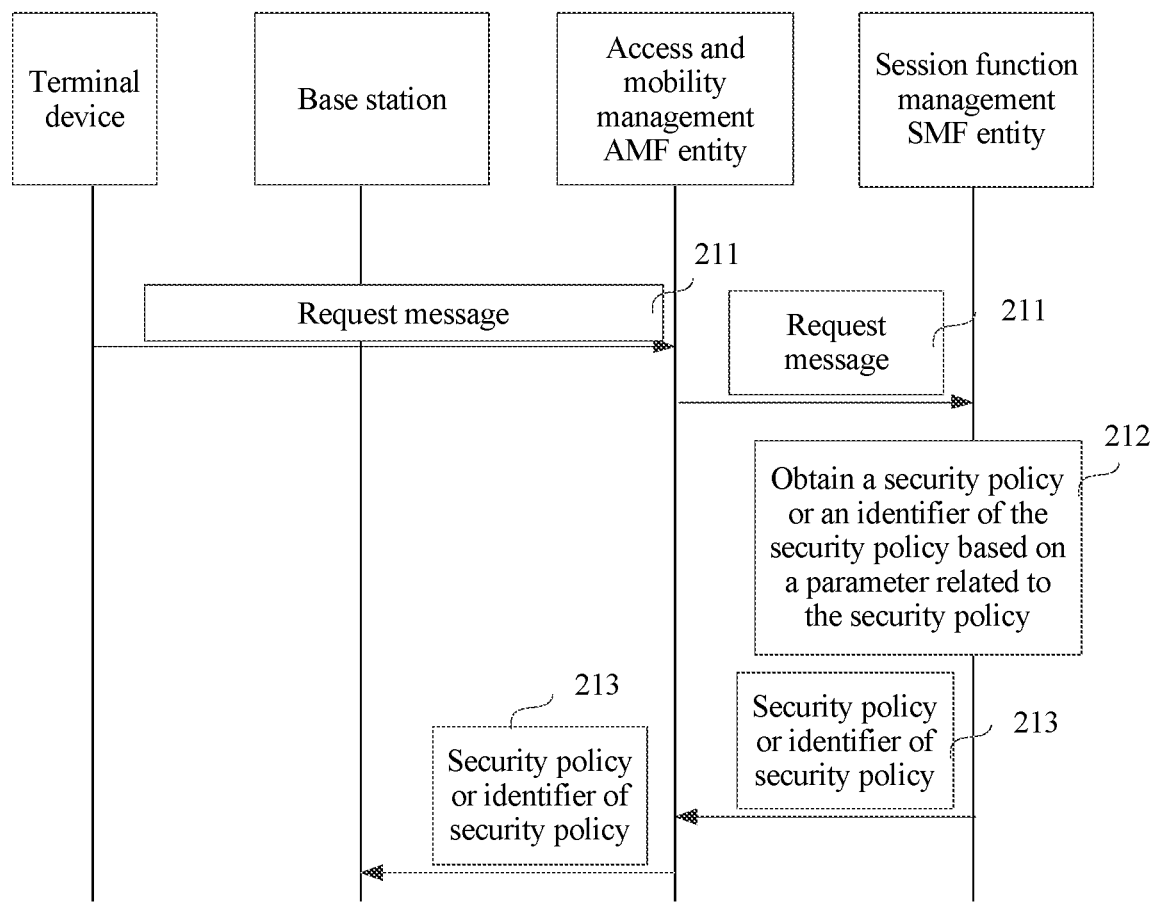
FIG. 2B is a schematic flowchart of another communication method according to an embodiment of this application.
Figure 2C:
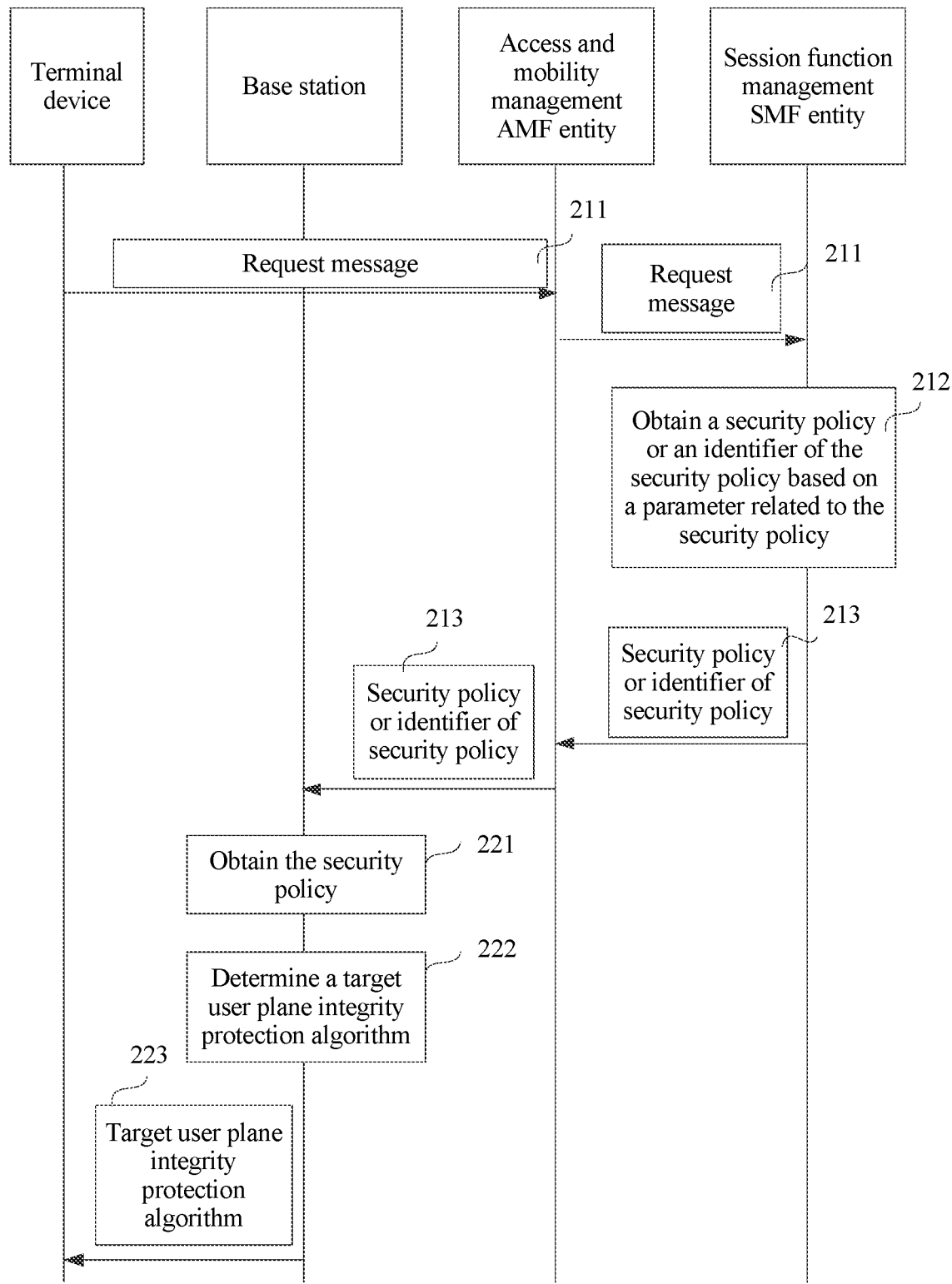
FIG. 2C is a schematic flowchart of another communication method according to an embodiment of this application.

FIG. 2 shows an example of a schematic flowchart of a communication method according to an embodiment of this application.

Based on the foregoing content, this embodiment of this application provides a communication method. As shown in FIG. 2, the method includes the following steps.

Step 201: A base station obtains a signaling plane security algorithm supported by a terminal device. Optionally, there are a plurality of manners of obtaining the signaling plane security algorithm supported by the terminal device. The signaling plane security algorithm supported by the terminal device at least includes at least one signaling plane encryption algorithm and at least one signaling plane integrity protection algorithm. For example, the signaling plane security algorithm is received from an AMF. For another example, the signaling plane security algorithm is directly obtained from the terminal device by using a signaling message or preconfigured on the base station.

In this embodiment of this application, a solution is provided to implement step 201. Specifically, the terminal device sends a non-access stratum (NAS) message to the base station. The NAS message is a signaling plane message exchanged between the terminal device and a core network, for example, an LTE attach request or a 5G registration request. In this embodiment, a 5G registration request message is used as an example for description, and same processing may be performed for another NAS message in a similar step. The terminal device sends a registration request to the base station. The registration request carries the signaling plane security algorithm supported by the terminal device.

Optionally, in the foregoing example, the registration request may also carry a user plane security algorithm supported by the terminal device. The user plane security algorithm supported by the terminal device may include a user plane integrity protection algorithm supported by the terminal device and a user plane encryption algorithm supported by the terminal device. Any two algorithms of the signaling plane encryption algorithm supported by the terminal device, the signaling plane integrity protection algorithm supported by the terminal device, the user plane integrity protection algorithm supported by the terminal device, and the user plane encryption algorithm supported by the terminal device may be the same or different. In an optional solution, the terminal device may separately report the signaling plane integrity protection algorithm supported by the terminal device, the signaling plane encryption algorithm supported by the terminal device, the user plane integrity protection algorithm supported by the terminal device, and the user plane encryption algorithm supported by the terminal device. Alternatively, if at least two of the four algorithms are the same, the terminal device may report one of two same algorithms. For example, if the signaling plane integrity protection algorithm supported by the terminal device is the same as the user plane integrity protection algorithm supported by the terminal device, the terminal device reports only one same algorithm corresponding to the signaling plane integrity protection algorithm supported by the terminal device and the user plane integrity protection algorithm supported by the terminal device. If the signaling plane encryption algorithm supported by the terminal device is the same as the user plane encryption algorithm supported by the terminal device, the terminal device reports only one same algorithm corresponding to the signaling plane encryption algorithm supported by the terminal device and the user plane encryption algorithm supported by the terminal device.

In another optional implementation, if the signaling plane encryption algorithm supported by the terminal device, the signaling plane integrity protection algorithm supported by the terminal device, the user plane integrity protection algorithm supported by the terminal device, and the user plane encryption algorithm supported by the terminal device are all the same, the terminal device may report only one algorithm to indicate the four algorithms. For example, algorithms reported by the terminal device are EEA 1, EEA 2, EIA 1, and EIA 2. Then, EEA 1 and EEA 2 may be selected as both the signaling plane encryption algorithm and the user plane encryption algorithm. Similarly, EIA 1 and EIA 2 may be selected as both the signaling plane integrity protection algorithm and the user plane integrity protection algorithm.

For another example, algorithms reported by the terminal device are EEA 11, EEA 12, EIA 11, EIA 12, EEA 21, EEA 23, EIA 21, and EIA 22. Then, EEA 11 and EEA 12 may be selected as the signaling plane encryption algorithm. EEA 21 and EEA 23 may be selected as the user plane encryption algorithm. EIA 11 and EIA 12 may be selected as the signaling plane integrity protection algorithm. EIA 21 and EIA 22 may be selected as the user plane integrity protection algorithm. For another example, algorithms reported by the terminal device are EEA 11, EEA 12, EIA 1, EIA 2, EEA 21, EEA 23, EIA 21, and EIA 22. Then, EEA 11 and EEA 12 may be selected as the signaling plane encryption algorithm. EEA 21 and EEA 23 may be selected as the user plane encryption algorithm. EIA 1 and EIA 2 may be selected as both the signaling plane integrity protection algorithm and the user plane integrity protection algorithm. For another example, algorithms reported by the terminal device are EEA 1, EEA 2, EIA 11, EIA 12, EIA 21, and EIA 22. Then, EEA 1 and EEA 2 may be selected both as the signaling plane encryption algorithm and the user plane encryption algorithm. EIA 11 and EIA 12 may be selected as the signaling plane integrity protection algorithm. EIA 21 and EIA 22 may be selected as the user plane integrity protection algorithm.

In another aspect, in an optional implementation solution, the terminal device may report, by using a plurality of pieces of signaling, the signaling plane security algorithm supported by the terminal device, the user plane integrity protection algorithm supported by the terminal device, and the user plane encryption algorithm supported by the terminal device, where one piece of signaling includes one algorithm. In another optional solution, the signaling plane security algorithm supported by the terminal device, the user plane integrity protection algorithm supported by the terminal device, and the user plane encryption algorithm supported by the terminal device are reported by using one or more pieces of signaling, where one piece of signaling includes one or more algorithms. When one piece of signaling includes a plurality of algorithms, some fields may be predefined in the signaling, and the fields are used to carry corresponding algorithms. For example, a first field, a second field, and a third field are successively set. The first field is predefined to place the signaling plane security algorithm supported by the terminal device. The second field is predefined to place the user plane integrity protection algorithm supported by the terminal device. The third field is predefined to place the user plane encryption algorithm supported by the terminal device. Alternatively, when the three algorithms are the same, only one algorithm is reported in one piece of signaling, and another network element considers by default that the algorithm is the signaling plane security algorithm supported by the terminal device, the user plane integrity protection algorithm supported by the terminal device, and the user plane encryption algorithm supported by the terminal device. For example, security capabilities reported by the terminal device are EEA 1, EEA 2, EIA 1, and EIA 2. Then, EEA 1 and EEA 2 may be selected as both the signaling plane encryption algorithm and the user plane encryption algorithm. Similarly, EIA 1 and EIA 2 may be selected as both the signaling plane integrity protection algorithm and the user plane integrity protection algorithm. For another example, security capabilities reported by UE are EEA 11, EEA 12, EIA 11, EIA 12, EEA 21, EEA 23, EIA 21, and EIA 22. Then, EEA 11 and EEA 12 may be selected as the signaling plane encryption algorithm. EEA 21 and EEA 23 may be selected as the user plane encryption algorithm. EIA 11 and EIA 12 may be selected as the signaling plane integrity protection algorithm. EIA 21 and EIA 22 may be selected as the user plane integrity protection algorithm. For another example, security capabilities reported by UE are EEA 11, EEA 12, EIA 1, EIA 2, EEA 21, EEA 23, EIA 21, and EIA 22. Then, EEA 11 and EEA 12 may be selected as the signaling plane encryption algorithm. EEA 21 and EEA 23 may be selected as the user plane encryption algorithm. EIA 1 and EIA 2 may be selected as both the signaling plane integrity protection algorithm and the user plane integrity protection algorithm.

Optionally, the base station forwards the registration request to the AMF. Optionally, the AMF sends a first registration accept message to the base station after the AMF performs mutual authentication with the base station and performs another registration procedure with another core network element, such as an SEAF, an AUSF, an SMF, a PCF, or a UDM. The base station forwards the received first registration accept message to the terminal device. Forwarding means that the message is not changed. However, an additional parameter is added to the message because interfaces carrying the message have different functions, to implement a message transmission function. For example, the first registration accept message is sent to the base station through an N2 interface. In addition to the first registration accept message, the N2 interface has information that the base station needs to know. The base station forwards the first registration accept message to the UE by using an RRC message. In addition to the first registration message, the RRC message may include at least other information that the UE needs to know, or information that can be used to find the UE. Alternatively, the first registration accept message is converted to some extent, for example, format conversion is performed based on different interfaces, and the converted first registration accept message is forwarded to the terminal device. In this step, if an interface between the AMF and the base station is NG2, the first registration accept message is carried by using an NG2 message. The first registration accept message further carries a base key (Kan) generated by the AMF or the SEAF for the base station, and the signaling plane security algorithm supported and reported by the terminal device. Optionally, a registration request message may be placed in a NAS container, and the base key (Kan) and a security capability of the terminal device may be placed in the NAS container or may be placed outside the NAS container.

Step 202: The base station determines a target signaling plane security algorithm based on the signaling plane security algorithm supported by the terminal device and a signaling plane security algorithm allowed by the base station.

In step 202, optionally, the base station may preconfigure the signaling plane security algorithm allowed by the base station. Optionally, an algorithm included in the signaling plane security algorithm allowed by the base station is sorted based on a priority, for example, is sorted based on an operator preference or based on a local actual environment configuration. Optionally, the signaling plane security algorithm allowed by the base station may be configured for the base station by using a network management device, or may be configured in a process of installing a software environment during establishment of the base station, or may be configured in another manner.

In step 202, a possible implementation is as follows: The base station selects, based on the signaling plane security algorithm supported by the terminal device and the signaling plane security algorithm that is allowed by the base station and that is sorted based on a priority, a signaling plane security algorithm that is supported by the terminal device and that has a highest priority, as the target signaling plane security algorithm. The target signaling plane security algorithm may include one encryption algorithm and/or one integrity protection algorithm.

One possible specific implementation is as follows: The base station selects a set of all algorithms that exist in the signaling plane security algorithm supported by the terminal device and that also exist in the signaling plane security algorithm allowed by the base station, and selects an algorithm with a relatively high priority in the signaling plane security algorithm allowed by the base station from the set of algorithms, as the target signaling plane security algorithm.

It should be noted herein that the signaling plane security algorithm allowed by the base station and a user plane security algorithm allowed by the base station may be configured or preconfigured for the base station based on at least the operator preference. The signaling plane security algorithm allowed by the base station includes at least one signaling plane encryption algorithm allowed by the base station and/or at least one signaling plane integrity protection algorithm allowed by the base station. The user plane security algorithm allowed by the base station includes at least one user plane encryption algorithm allowed by the base station and/or at least one user plane integrity protection algorithm allowed by the base station. In addition, the at least one signaling plane encryption algorithm allowed by the base station and/or the at least one signaling plane integrity protection algorithm allowed by the base station in the signaling plane security algorithm allowed by the base station are/is sorted based on a priority, and priority sorting may be determined by an operator. The user plane security algorithm allowed by the base station may be or may not be sorted based on a priority. When the user plane security algorithm allowed by the base station is the same as the signaling plane security algorithm allowed by the base station, and a priority of the user plane security algorithm allowed by the base station is the same as a priority of the signaling plane security algorithm allowed by the base station, the base station may store only one set of algorithms sorted based on a priority, that is, store a user plane security algorithm that is allowed by the base station and that is sorted based on a priority, or a signaling plane security algorithm that is allowed by the base station and that is sorted based on a priority.

Optionally, the base station generates only a signaling plane related key based on the target signaling plane security algorithm, for example, a signaling plane integrity protection key and a signaling plane encryption key. The signaling plane related key is, for example, a Radio Resource Control (RRC) related key, and specifically may be an RRC integrity protection key (Krrc-int) and an RRC encryption key (Krrc-enc). The base station may generate the key based on a base key (Kan). Kan is obtained by the base station from a core network element, such as the access and mobility management function (Access and mobility management Function, AMF) or the AUSF.

Step 203: The base station adds the target signaling plane security algorithm to an access stratum (AS) security mode command (SMC), and sends the AS SMC to the terminal device.

Optionally, in step 203, the base station may send the AS SMC to the terminal device in a plurality of implementations. The AS SMC includes indication information of the target signaling plane security algorithm, for example, an identifier of the target signaling plane security algorithm.

Further, the base station may further add the signaling plane security algorithm supported by the terminal device to the AS SMC. Optionally, integrity protection may be performed on the AS SMC by using the signaling plane integrity protection key generated by the base station.

Optionally, after receiving the AS SMC, the terminal device determines the target signaling plane security algorithm based on the indication information of the target signaling plane security algorithm, and generates the signaling plane related key (a method for generating the signaling plane related key by the terminal device is the same as a method for generating the signaling plane related key by the base station), and checks integrity protection on the AS SMC based on a signaling plane integrity protection key. If it is determined that integrity protection on the AS SMC is qualified, it is determined that the signaling plane integrity protection key on the terminal device side is the same as the signaling plane integrity protection key used by the base station for the AS SMC. Optionally, after step 203, the method further includes step 204: The terminal device sends an AS security mode command complete (Security mode command complete, SMP) to the base station.

Optionally, the terminal device may perform encryption and/or integrity protection on the AS SMP by using the generated signaling plane related key. Optionally, after the base station checks that encryption protection and integrity protection on the AS SMP message are correct, the base station forwards the received first registration accept information to the terminal device, or converts the first registration accept message to some extent, for example, performs format conversion on the first registration accept message based on different interfaces to obtain a second registration accept message, and sends the second registration accept message to the terminal device. Then, optionally, the terminal device returns registration complete to the AMF.

Based on the foregoing example, it can be learned that in this embodiment of this application, only a purpose of negotiating the target signaling plane security algorithm by the base station and the terminal device is implemented by using the AS SMC procedure, and the signaling plane security algorithm and the user plane security algorithm are decoupled. The signaling plane security algorithm and the user plane security algorithm may be separately determined, thereby improving communication flexibility.

Further, in the foregoing example, an optional solution is as follows: The terminal device reports, by sending a registration request, the signaling plane security algorithm supported by the terminal device. Optionally, the terminal device may also add the user plane integrity protection algorithm supported by the terminal device and the user plane encryption algorithm supported by the terminal device to the registration request for reporting. For a specific optional reporting solution, refer to the foregoing embodiment, and details are not described herein again.

Optionally, the signaling plane security algorithm supported by the terminal device may also be classified into a signaling plane security algorithm supported by the terminal device on a NAS stratum and a signaling plane security algorithm supported by the terminal device on an AS stratum. The signaling plane security algorithm supported by the terminal device on the AS stratum may also be referred to as a signaling plane security algorithm supported by the terminal device at an RRC layer. When reporting the signaling plane security algorithm supported by the terminal device, the user plane integrity protection algorithm supported by the terminal device, and the user plane encryption algorithm supported by the terminal device, the terminal device may add indication information to each security algorithm. Alternatively, some fields may be predefined, and a manner of placing a corresponding algorithm in a corresponding field is used to identify whether each security algorithm belongs to the signaling plane or the user plane or belongs to the NAS stratum or the AS stratum. For example, a field is predefined to place the signaling plane security algorithm, and another field is predefined to place the user plane security algorithm. For another example, a field is predefined to place a security algorithm on the NAS stratum, and another field is predefined to place a security algorithm on the AS stratum. Alternatively, the terminal device reports all security algorithms supported by the terminal device to the AMF, and the AMF instead of the terminal device distinguishes whether the security algorithms belong to the signaling plane or the user plane. Alternatively, the AMF forwards the security algorithms to the base station, and the base station performs distinguishing.

Correspondingly, when the AMF sends the first registration accept message to the base station, all the security algorithms reported by the terminal device may be sent to the base station, such as the signaling plane security algorithm, the user plane integrity protection algorithm supported by the terminal device, and the user plane encryption algorithm supported by the terminal device. Alternatively, only the signaling plane security algorithm that is supported by the terminal device and that is required by the base station to negotiate the target signaling plane security algorithm is sent to the base station. Alternatively, only the signaling plane security algorithm supported by the terminal device at the RRC layer is transmitted.

To be compatible with the prior art, optionally, the base station may add, to the AS SMC message, indication information for only negotiating the target signaling plane security algorithm. After the terminal device parses the AS SMC message and finds that the indication information for only negotiating the target signaling plane security algorithm exists, the terminal device generates the signaling plane related key based only on the determined target signaling plane security algorithm. In this way, only one set of target signaling plane security algorithms is negotiated between the terminal device and the base station. If the terminal device finds that the indication information for only negotiating the target signaling plane security algorithm does not exist after parsing the AS SMC information, the terminal device determines the determined target signaling plane security algorithm as a target security algorithm, and the target security algorithm is used to generate the signaling plane related key and a user plane related key. The user plane related key includes a user plane encryption key and a user plane integrity protection key. The signaling plane related key includes a signaling plane encryption key and a signaling plane integrity protection key. In this way, one set of target signaling plane security algorithms and one set of target user plane security algorithms are negotiated between the terminal device and the base station.

Optionally, to be compatible with the prior art, the base station may add, to the AS SMC information, indication information used to indicate to negotiate the target signaling plane security algorithm and/or indication information used to indicate to negotiate the user plane related key. For example, one bit is added, and the bit may be newly added or obtained by reusing a current bit. For example, if the bit is 0, it indicates that only the target signaling plane security algorithm is to be negotiated; or if the bit is 1, it indicates that both the target signaling plane security algorithm and the user plane related key are to be negotiated.

In this embodiment of this application, the target signaling plane security algorithm includes the target signaling plane integrity protection algorithm and the target signaling plane encryption algorithm. Optionally, two different target signaling plane integrity protection algorithm and target signaling plane encryption algorithm may be negotiated by using the AS SMC procedure, or one target signaling plane security algorithm is negotiated and is used as both the target signaling plane integrity protection algorithm and the target signaling plane encryption algorithm.

In another optional implementation solution, at least one of the target signaling plane integrity protection algorithm and the target signaling plane encryption algorithm may be negotiated by using the AS SMC procedure, and the other target signaling plane security algorithm may be negotiated by using another procedure.

Optionally, the target signaling plane security algorithm negotiated by the base station and the terminal device may be indicated by using an identifier of the algorithm. In an optional implementation solution, regardless of whether the target signaling plane integrity protection algorithm is the same as or different from the target signaling plane encryption algorithm, the target signaling plane integrity protection algorithm and the target signaling plane encryption algorithm are indicated by using identifiers of two algorithms. In another optional implementation solution, if the target signaling plane integrity protection algorithm is the same as the target signaling plane encryption algorithm, an identifier of one algorithm may be used to indicate the target signaling plane integrity protection algorithm and the target signaling plane encryption algorithm; and if the target signaling plane integrity protection algorithm is different from the target signaling plane encryption algorithm, identifiers of two algorithms are used to indicate the target signaling plane integrity protection algorithm and the target signaling plane encryption algorithm.

In another optional solution, this embodiment of this application includes the target signaling plane security algorithm and the target user plane security algorithm. In an optional implementation solution, regardless of whether the target signaling plane security algorithm is the same as or different from the target user plane security algorithm, the target signaling plane security algorithm and the target user plane security algorithm are indicated by using identifiers of two sets of algorithms. In another optional implementation solution, if the target signaling plane security algorithm is the same as the target user plane security algorithm, identifiers of one set of algorithms may be used to indicate the target signaling plane security algorithm and the target user plane security algorithm; and if the target signaling plane security algorithm is different from the target user plane security algorithm, identifiers of two sets of algorithms are used to indicate the target signaling plane security algorithm and the target user plane security algorithm. Identifiers of one set of algorithms corresponding to the target signaling plane security algorithm include an identifier of at least one target signaling plane integrity protection algorithm and an identifier of at least one target signaling plane encryption algorithm. According to the foregoing example, in the identifiers of one set of algorithms corresponding to the target signaling plane security algorithm, an identifier of one algorithm or identifiers of two algorithms may be used to represent the target signaling plane integrity protection algorithm and the target signaling plane encryption algorithm. Correspondingly, identifiers of one set of algorithms corresponding to the target user plane security algorithm include an identifier of at least one target user plane integrity protection algorithm and an identifier of at least one target user plane encryption algorithm. According to the foregoing example, in the identifiers of one set of algorithms corresponding to the target user plane security algorithm, an identifier of one algorithm or identifiers of two algorithms may be used to represent the target signaling plane integrity protection algorithm and the target user plane encryption algorithm.

FIG. 2a shows an example of a schematic flowchart of another communication method according to an embodiment of this application.

Based on the foregoing description, this embodiment of this application provides another communication method. As shown in FIG. 2a, the method includes the following steps.

Optionally, step 211: An SMF entity receives a request message, where the request message may include an identifier of a terminal device. Optionally, the request message received by the SMF entity may include a plurality of types, such as a registration request (Registration Request), a service request (Service Request), or a session establishment request (Session Establishment Request). The session establishment request may also be referred to as a PDU session establishment request.

Optionally, if the request message is a service request, the service request may first be sent by the terminal device to a base station, the base station forwards the service request to an AMF, and then AMF directly forwards the service request. Forwarding means sending the message to the AMF without changing content of the original message. When the message is sent to the AMF, another parameter may be added based on a factor such as an interface, or the message is converted based on interface information and then sent to the SMF. If an interface between the base station and the AMF is an N2 interface, and an interface between the AMF and the SMF is N11, the service request forwarded by the base station to the AMF is a request that matches the N2 interface, and the service request forwarded by the AMF to the SMF is a request that matches the N11 interface. The service request is a NAS stratum request. Optionally, the request message may be alternatively a registration request.

Optionally, if the request message is a session establishment request, the session establishment request may first be sent by the terminal device to the AMF, and then the AMF directly forwards the session establishment request. Forwarding means sending the message to the AMF without changing content of the original message. When the message is sent to the AMF, another parameter may be added based on a factor such as an interface, or the message is converted based on interface information and then sent to the SMF.

Optionally, before the terminal device sends the session establishment request, the terminal device may be in a session connection disconnected state. Optionally, the terminal device and the base station may perform the registration procedure in the foregoing step again, that is, the terminal device may send a registration request to the base station, to implement registration of the terminal device, and re-negotiate a target signaling plane security algorithm between the terminal device and the base station in an AS SMC and an AS SMP in the registration procedure.

In the foregoing step, the identifier of the terminal device may include any one or more of an IMSI, an IMEI, or a temporary identity.

Step 212: The SMF entity obtains a security policy or an identifier of the security policy based on a parameter related to the security policy.

Step 213: The SMF entity sends the security policy or the identifier of the security policy to a base station, where the security policy includes integrity protection indication information, and the integrity protection indication information is used to indicate the base station whether to enable integrity protection for the terminal device.

Optionally, the SMF or another network element connected to the SMF stores a correspondence between the security policy and the identifier of the security policy. In this case, the security policy is completely preconfigured on the SMF, the base station, the UE, or the another network element connected to the SMF. For example, the security policy is configured based on a specific service, such as a security policy of a VoIP voice service. For example, the security policy is configured based on a service vendor, such as a water meter plant. There are a plurality of configuration bases, which are not listed one by one herein. After the SMF determines the security policy for the terminal device by using the identifier or another parameter of the terminal device, the identifier of the security policy that is corresponding to the security policy may be obtained. The SMF transmits the identifier of the security policy to the base station, and the base station may perform user plane security protection based on the security policy corresponding to the identifier of the security policy. For example, the correspondence between the security policy and the identifier of the security policy is preconfigured on the SMF, and the SMF determines the identifier of the security policy based on content in the service request message, for example, the identifier of the terminal device. For another example, if the correspondence between the security policy and the identifier of the security policy is preconfigured on a PCF, the SMF needs to obtain the identifier of the security policy from a PDC. For another example, both the SMF and the PCF have a preconfigured identifier of the security policy, and the identifier of the security policy that is preconfigured on the PCF may cover the identifier of the security policy that is configured on the SMF, that is, the SMF transmits the identifier of the security policy that is obtained from the PCF to the base station.

In an optional implementation, the SMF entity directly sends the security policy or the identifier of the security policy to the base station. For example, the SMF entity sends the security policy corresponding to the identifier of the terminal device to the base station based on the identifier of the terminal device and a preset relationship between the terminal device and the identifier of the security policy. The preset security policy may be preset on the SMF, or may be preset on the PCF or another network element. The preset security policy and identifier of the security policy may be preset on the SMF, or may be preset on the PCF or another network element. In another optional implementation, after the SMF entity receives the request message, and before the SMF entity sends the security policy or the identifier of the security policy to the base station based on the request message, the method further includes that the SMF entity obtains the security policy based on the request message. In another optional implementation, after the SMF entity receives the request message, and before the SMF entity sends the security policy or the identifier of the security policy to the base station based on the request message, the method further includes that the SMF obtains the identifier of the security policy based on the security policy.

In another aspect, optionally, the security policy identified by the identifier of the security policy or the security policy that is sent by the SMF entity to the base station may be a previously generated security policy, or may be a newly generated security policy.

In step 213, the SMF entity sends the security policy or the identifier of the security policy to the base station in a plurality of forms. For example, the SMF entity may generate the security policy based on the parameter related to the security policy. For example, the security policy may be generated based on the identifier of the terminal device or a session identifier, or some generation rules may be preset, or all security policies may be preconfigured.

Optionally, the base station may send, based on some information carried in the request message, a security policy or an identifier of the security policy that is applicable to the terminal device or the current request message of the terminal device. Optionally, the parameter related to the security policy includes at least one of the identifier of the terminal device, a data network name (Data network name, DNN) of the terminal device, an identifier of a slice of the terminal device, quality of service of the terminal device, and a session identifier of the terminal device. Optionally, the parameter related to the security policy includes at least one of the identifier of the terminal device, the DNN of the terminal device, the identifier of the slice of the terminal device, the quality of service of the terminal device, the session identifier of the terminal device, and a flow identifier of the terminal device.

An association relationship in this embodiment of this application may include a correspondence, or may include some rules, or may include a relationship between some correlations. For example, a correspondence between the related parameter and the security policy may be preset, and then a security policy corresponding to the related parameter is found. For example, a security policy corresponding to the identifier of the slice is determined based on the identifier of the slice. For another example, a security policy corresponding to the session identifier is determined based on the session identifier. For another example, a security policy corresponding to the session identifier and the identifier of the slice is determined based on an association relationship among the session identifier, the identifier of the slice, and the security policy.

In another optional implementation, the parameter related to the security policy includes the identifier of the terminal device, and the SMF entity obtains the security policy based on the identifier of the terminal device and an association relationship between the identifier of the terminal device and the security policy. For example, the correspondence between the terminal device and the security policy may be stored on the SMF or another network element connected to the SMF. For example, there is a correspondence between the terminal device and the security policy. For example, in user subscription data, there is a correspondence between an IMSI and a security policy. Therefore, different security policies may be set for different terminal devices based on some service performance requirements of the terminal devices and the like.

For another example, an association relationship between the identifier of the terminal device and the security policy may be preset. For example, the identifier of the terminal device is associated with a plurality of security policies, and then one security policy may be selected from the plurality of security policies associated with the identifier of the terminal device, or the security policy may be further determined based on another parameter, in the related parameter, different from the identifier of the terminal device. For example, one security policy associated with the session identifier is selected from the plurality of security policies associated with the identifier of the terminal device in combination with the session identifier. For another example, a flow identifier of the quality of service is determined based on the quality of service, and then a security policy of the corresponding quality of service is determined based on the flow identifier of the quality of service.

For example, a terminal device of the Internet of Things is only responsible for reading and sending data of a water meter, that is, sending the data of the water meter to a water plant monthly at a fixed date. Therefore, a security policy of the terminal device is fixed, an identifier of the terminal device may be set to correspond to one security policy, and optionally, the security policy may be obtained from user subscription data stored on a UDM.

To more clearly describe this embodiment of this application, the following further describes in detail several examples of sending the security policy or the identifier of the security policy based on the related parameter. For details, refer to the following implementation a1, implementation a2, implementation a3, and implementation a4.

Implementation a1

An identifier of a slice of a terminal device is information about a slice accessed by the terminal device in a 5G application scenario, and is used to indicate a slice to which the terminal device is to access.

A parameter related to a security policy includes the identifier of the slice of the terminal device, and an SMF entity obtains the security policy based on the identifier of the slice of the terminal device and an association relationship between the identifier of the slice and the security policy. Specifically, one terminal device may be corresponding to an identifier of at least one slice. For example, the terminal device may access different slices, and user plane data of the terminal device may be corresponding to different security policies in the different slices.

The terminal device adds network slice selection assistance information (NSSAI) to an SR message or a PDU session establishment request. The SMF obtains a security policy corresponding to the NSSAI. If a security policy of a slice corresponding to the NSSAI is unique, a security policy obtained by the terminal device when accessing the slice is unique. If the NSSAI information includes at least one slice, a slice needs to be selected based on a security policy of the slice currently accessed by the terminal device (security policies of different slices may be different). If the security policy of the current slice is unique after the accessed slice is determined, the security policy obtained by the terminal device when accessing the slice is unique. If the security policy of the current slice is not unique, the terminal device needs to further determine the security policy based on other information. There are a plurality of implementations in which the terminal device needs to further determine the security policy based on other information. For example, the terminal device makes selection based on at least one identifier, in the related parameter, different from the identifier of the slice, for example, by using the identifier of the terminal device or the session identifier.

Implementation a2

A session identifier of a terminal device is a session identifier corresponding to a session corresponding to a current request message of the terminal device. For example, that the terminal device performs an Internet (internet) service (such as browsing a web page, watching a video, and chatting using WeChat) is a session. The terminal device accesses an intranet of a company in which the terminal device is located, and uses a company-specific service (for example, a company meeting), and this is another session. The terminal device accesses a network of making a VoIP call, and this is another session. Herein, a session identifier of the Internet (internet) access service may be set to 1; a session identifier of the intranet of the company is 2; and a session identifier of the VoIP call is 3.

A parameter related to a security policy includes the session identifier of the terminal device, and an SMF entity obtains the security policy based on the session identifier of the terminal device and an association relationship between the session identifier and the security policy. In this way, for a same terminal device, when the terminal device initiates different sessions, different security policies may be selected for the different sessions.

For example, there is a normal terminal device, and the terminal device enables only services of making a call and sending an SMS message. The two services respectively belong to two sessions. Therefore, quality of service and security policies are different depending on different sessions. For the service of making a call, user plane integrity protection does not need to be enabled, and key mixing is not required. A 128-bit user plane encryption algorithm is used, and a user plane encryption key length is 128 bits. For the SMS message service, user plane integrity protection needs to be enabled, and key mixing is required. A 128-bit user plane encryption algorithm is used, a 128-bit (bit) user plane encryption key is used, a 256-bit user plane integrity protection algorithm is used, and a 256-bit user plane integrity protection key is used.

For example, a service corresponding to the session identifier is an ultra low latency service. To ensure a low latency, the security policy needs to use a user plane integrity protection algorithm and a user plane encryption algorithm that have a relatively low security level, such as a 128-bit user plane integrity protection algorithm and user plane encryption algorithm, and a 128-bit user plane integrity protection key and user plane encryption key; or no user plane integrity protection algorithm or user plane encryption algorithm is enabled. For another example, the service corresponding to the session identifier is a service with a high reliability requirement. Then, not only a user plane encryption key is required for encryption protection, but also a user plane integrity protection key is required for integrity protection. In addition, a user plane integrity protection algorithm and a user plane encryption algorithm that have a relatively high security level, such as a 256-bit user plane integrity protection algorithm and user plane encryption algorithm, and a 256-bit user plane integrity key and user plane encryption key need to be selected. For another example, the service corresponding to the session identifier is a common service, such as a voice service. Then, only user plane encryption key protection may be required, and user plane integrity protection is not required. In addition, a 256-bit user plane encryption algorithm may be required, but a 128-bit user plane encryption key is sufficient. It can be learned that, in this embodiment of this application, different security policies may be selected depending on different services, to meet a dynamic requirement of user plane security.

Implementation a3

After accessing one slice, a terminal device may initiate a plurality of sessions. Therefore, an identifier of the one slice may be corresponding to a plurality of session identifiers. A correspondence described herein is a logical correspondence. In an actual application, this does not necessarily mean that a correspondence between the session identifier and the identifier of the slice may be specified.

An SMF entity obtains a security policy corresponding to the identifier of the slice and the session identifier based on an association relationship among an identifier of the terminal device, the identifier of the slice, the session identifier, and the security policy. In this way, division of a finer granularity may be obtained, and a security policy is separately selected for different sessions initiated in a same slice accessed by a same terminal device.

Implementation a4

Optionally, an SMF entity obtains a security policy of a terminal device based on an association relationship between a flow identifier and the security policy. In this way, division of a finer granularity may be obtained, and a security policy is separately selected based on specific content of a same session initiated in a same network accessed by a same terminal device.

For example, the terminal device supports an Internet access service. Therefore, a data flow of Internet access may be browsing a web page or may be watching a video. For this terminal device, the Internet access service belongs to a session 1. Then, browsing a web page is a flow 1, and watching a video is a flow 2. The SMF sets up quality of service for the flow 1 when finding that there is no quality of service supporting the flow 1. The flow 2 has the same case. If the SMF finds that the quality of service of both the flow 1 and the flow 2 is available, the SMF directly sends the quality of service to a base station.

Implementation a5

A parameter related to a security policy includes quality of service of a terminal device, and an SMF entity obtains the security policy based on the quality of service of the terminal device. Optionally, some quality of service corresponding to an identifier of the terminal device may be obtained based on the identifier of the terminal device that is included in a request message. For example, the quality of service is that the terminal device requires a low latency, high security, and the like. Then, a set of security policies is set for the terminal device based on the quality of service. In this embodiment of this application, the security policy may be preconfigured on the SMF or a PCF, or quality of service corresponding to a DNN may be obtained from a UPF and/or a UDM, and then a security policy is obtained based on the quality of service. Default quality of service is entered on the UDM at the time of subscription. The UPF may learn of dynamic quality of service from an external network processing call or an SMS message, or may learn of the dynamic quality of service from the PCF, or may preconfigure the dynamic quality of service.

Optionally, the parameter related to the security policy includes a DNN of the terminal device, and a set of security policies is correspondingly set based on the DNN. For example, the DNN is Youku. There are many video services in the Youku network, and therefore a security policy set for the terminal device may have a lower latency. For another example, the DNN is a finance related website, and therefore a security policy set for the terminal device needs to have higher security.

Further, quality of service corresponding to the DNN may be obtained based on the DNN from a core network element such as the PCF/the UPF or the UDM. The quality of service carries a security policy, or a security policy is later set based on the quality of service. Quality of service obtained from the PCF is dynamic quality of service information, and quality of service obtained from the UDM is default quality of service information at the time of user subscription.

Optionally, the SMF may obtain information from the UDM by sending a subscription data request (Subscription Data Request) to the UDM, and receiving a subscription data response (Subscription Data Response) from the UDM. The SMF may obtain information from the PCF by using PDU-CAN session modification (PDU-CAN session modification) information. The SMF may obtain information from the UPF by sending a session establishment/modification request (Session Establishment/Modification Request) to the UPF and receiving a session establishment/modification response (Session Establishment/Modification Response) from the UDM.

In implementation a4, the quality of service may be identified by using an identifier (ID) by a quality of service flow (QoS flow), which may be referred to as a QoS Flow ID, QFI for short. In this embodiment of this application, a quality of service profile (QoS Profile) is identified by using the QFI.

The quality of service may include a plurality of parameters, such as a 5G QoS indicator (5QI). The 5QI is used to identify performance characteristics (Performance characteristics), which may include any one or more of a resource type ((Guaranteed flow bit rate, GBR) or Non-GBR), a packet latency degree, and a bit error rate, and may further include another parameter. The 5QI is a basic parameter used by a network element to allocate a resource to the quality of service.

The quality of service may further include an allocation and retention Priority (ARP), and the priority may be identified by 1 to 15, indicating a priority of requesting a resource by the quality of service and whether establishment of a data radio bearer can be rejected because of a resource restriction.

The quality of service may further include two parameters, used to define whether a resource (for example, a data radio bearer) corresponding to other quality of service may be preempted or whether a data radio bearer established for the quality of service may be preempted by other quality of service.

Optionally, for data content with a GBR, the quality of service may further include: a GBR guaranteed flow bit rate (Guaranteed flow bit rate), which may be used for uplink and downlink. The data content with the GBR may be a session or a flow, and GBR data has a corresponding service level. Different service levels may also be corresponding to different quality of service. Non-GBR data is corresponding to a default service level. For example, for an operator, call making needs to be guaranteed. Therefore, call making has a GBR guarantee. For an ordinary SMS message service, that is, non-GBR, a small latency will not be a problem. In addition, for example, if a service of the operator is bought for a Tencent game, a non-GBR service flow of the Tencent game becomes GBR.

Optionally, the quality of service further includes a maximum flow bit rate (Maximum Flow Bit Rate, MFBR), and all flows (flow) of one session add up and cannot exceed the rate. Once the rate is exceeded, refer to the ARP to determine whether to reject establishment or to preempt another resource.

Optionally, the quality of service further includes notification control (Notification control). This setting is on or off. If a data radio bearer cannot be set up for the quality of service, it is necessary to determine, based on on/off of the notification control, whether to notify the terminal device.

Optionally, the security policy further includes at least one of the following content: encryption indication information, where the encryption indication information is used to indicate the base station to enable encryption protection for the terminal device; a key length; D-H indication information, where the D-H indication information is used to indicate the base station to enable D-H for the terminal device; and a user plane integrity protection algorithm allowed by a serving network. That is, the security policy may further include any one or more of: whether to enable user plane encryption, whether to enable user plane integrity protection, whether to use a 128-bit or 256-bit encryption/decryption algorithm, whether to use a 128-bit or 256-bit key length, and whether to enable key mixing. Some specific examples are provided. For example, bits are used to indicate content included in the security policy. For example, a bit sequence 0000000 indicates not to enable user plane encryption protection, and not to enable user plane integrity protection. Because both are not enabled, there are all 0. For another example, a bit sequence 1010100 indicates to enable user plane encryption protection but not to enable user plane integrity protection, to use a 128-bit encryption algorithm, and not to enable key mixing. It should be noted that only examples are given, and all examples that comply with this rule are covered by this patent. In this embodiment of this application, key mixing refers to D-H, and D-H is a key mixing algorithm.

Optionally, when the SMF entity determines that encryption indication information needs to be enabled in the security policy of the terminal device, the security policy may further include a user plane encryption algorithm allowed by the serving network. Alternatively, the user plane encryption algorithm allowed to appear in the security policy means that user plane encryption needs to be enabled. Optionally, the serving network is a network that provides a service for the terminal device.

Optionally, the security policy may include a key length of the user plane integrity protection algorithm, or may include a key length of the user plane encryption algorithm. Alternatively, the allowed user plane encryption algorithm appears in the security policy and the algorithm is 256 bits, indicating that a key length of 256 bits is used.

Optionally, before the base station obtains the security policy, the method further includes that the base station sends first priority indication information to an access and mobility management AMF entity. The first priority indication information is used to indicate that the user plane integrity protection algorithm allowed by the base station is not sorted based on a priority.

Optionally, the AMF forwards the first priority indication information to the SMF. Therefore, after obtaining the first priority indication information, the SMF learns that the user plane integrity protection algorithm allowed by the base station is not sorted based on a priority. Therefore, the SMF performs priority sorting on the user plane integrity protection algorithm allowed by the serving network, or performs priority sorting on the user plane integrity protection algorithm supported by the terminal device. The user plane integrity protection algorithm supported by the terminal device is obtained from the AMF.

In another optional implementation, if the SMF does not obtain the first priority indication information, or the SMF learns, in another manner, that the user plane integrity protection algorithm allowed by the base station is sorted based on a priority, optionally the SMF does not perform priority sorting on the user plane integrity protection algorithm allowed by the serving network. Optionally, priority sorting may be performed on the user plane integrity protection algorithm allowed by the serving network based on many factors, for example, based on factors such as a current operator preference and a local serving network environment.

Optionally, before the base station obtains the security policy, the method further includes that the base station sends second priority indication information to the access and mobility management AMF entity. The second priority indication information is used to indicate whether the user plane encryption allowed by the base station is not sorted based on a priority.

Optionally, the AMF forwards the second priority indication information to the SMF. Therefore, after obtaining the second priority indication information, the SMF learns that the user plane encryption algorithm allowed by the base station is not sorted based on a priority. Therefore, the SMF performs priority sorting on the user plane encryption algorithm allowed by the serving network, or performs priority sorting on the user plane encryption algorithm supported by the terminal device. The user plane encryption algorithm supported by the terminal device is obtained from the AMF.

In another optional implementation, if the SMF does not obtain the second priority indication information, or the SMF learns, in another manner, that the user plane encryption algorithm allowed by the base station is sorted based on a priority, optionally the SMF does not perform priority sorting on the user plane encryption algorithm allowed by the serving network. Optionally, priority sorting may be performed on the user plane encryption algorithm allowed by the serving network based on many factors, for example, based on factors such as a current operator preference and a local serving network environment.

In the foregoing example, the priority of the user plane encryption algorithm and the priority of the user plane integrity protection algorithm are separately described. In another optional implementation, one piece of indication information is used to indicate priorities of both the user plane encryption algorithm and the user plane integrity protection algorithm.

Optionally, before the base station obtains the security policy, the method further includes that the base station sends third priority indication information to the access and mobility management AMF entity. The third priority indication information is used to indicate that both the user plane encryption algorithm and the user plane integrity protection algorithm that are allowed by the base station are not sorted based on a priority. The user plane encryption algorithm and the user plane integrity protection algorithm may be the same or different.

Optionally, the AMF forwards the third priority indication information to the SMF. Therefore, after obtaining the third priority indication information, the SMF learns that the user plane encryption algorithm and the user plane integrity protection algorithm that are allowed by the base station are not sorted based on a priority. Therefore, the SMF performs priority sorting on the user plane encryption algorithm and the user plane integrity protection algorithm that are allowed by the serving network or performs priority sorting on the user plane encryption algorithm and the user plane integrity protection algorithm that are supported by the terminal device. The user plane encryption algorithm and the user plane integrity protection algorithm that are supported by the terminal device are obtained from the AMF.

In another optional implementation, if the SMF does not obtain the third priority indication information, or the SMF learns, in another manner, that the user plane encryption algorithm and the user plane integrity protection algorithm that are allowed by the base station are sorted based on a priority. Optionally, the SMF does not perform priority sorting on the user plane encryption algorithm allowed by the serving network. Optionally, priority sorting may be performed, based on many factors, on the user plane encryption algorithm and the user plane integrity protection algorithm that are allowed by the serving network, for example, based on factors such as a current operator preference and a local network environment.

FIG. 2b shows an example of a schematic flowchart of another communication method according to an embodiment of this application.

Based on the foregoing content, this embodiment of this application provides a communication method. As shown in FIG. 2b, the method includes the following steps.

Step 221: A base station obtains a security policy, where the security policy includes integrity protection indication information, and the integrity protection indication information is used to indicate the base station whether to enable integrity protection for a terminal device.

Similar to the foregoing content, optionally, the security policy may further include an allowed user plane encryption algorithm, a user plane integrity protection algorithm allowed by a serving network, and indication information indicating whether to enable key mixing. Optionally, the user plane encryption algorithm allowed by the serving network may include enabling user plane encryption protection and key length information. For example, when the user plane encryption algorithm is 256 bits, a 256-bit key is used. Optionally, if an empty encryption algorithm occurs in the user plane encryption algorithm allowed by the serving network, the base station is allowed not to enable user plane encryption protection. Optionally, if the user plane integrity protection algorithm allowed by the serving network appears in the security policy, the base station enables user plane integrity protection. Optionally, a key length is determined based on bit information of the integrity algorithm, that is, a 256-bit integrity algorithm uses a 256-bit key. Optionally, the allowed user plane integrity protection algorithm does not have an empty algorithm. If no integrity protection algorithm appears in the security policy, integrity protection is not enabled. Optionally, the base station may also be notified of the key length information by using other information, for example, by using bit information.

Step 222: When the integrity protection indication information indicates the base station to enable integrity protection for the terminal device, the base station determines a target user plane integrity protection algorithm.

Step 223: The base station sends the target user plane integrity protection algorithm to the terminal device. For how the base station sends the target user plane integrity protection algorithm to the terminal device, refer to the foregoing content, and details are not described herein again.

Optionally, the foregoing AS SMC and AS SMP procedures may further be included between step 221 and step 223, and are used to re-negotiate a target signaling plane security algorithm between the base station and the terminal device. Specifically, step 201 to step 204 may be added between step 221 and step 223.

Optionally, that the base station obtains the security policy includes: the base station receives the security policy from an SMF entity. Alternatively, optionally, the base station pre-stores the security policy, and then the base station receives an identifier of the security policy from the SMF entity and obtains the security policy based on the identifier of the security policy.

Optionally, a Service Data Adaptation Protocol (SDAP) layer may be defined on the base station to map quality of service to a Packet Data Convergence Protocol (PDCP) layer. Each PDCP layer is corresponding to one DRB. Therefore, a previously defined security level needs to be further divided on an RAN side. If security is still performed at the PDCP layer, user plane encryption and decryption and integrity protection are still completed at the PDCP layer. Because one PDCP layer is corresponding to one DRB, only DRB-level security processing can be performed on the RAN side. If security or partial security processing may be moved up to the SDAP layer, QoS-flow-level security processing may be implemented. Partial security means that if only user plane integrity protection is based on a flow granularity, only security processing related to integrity protection needs to be placed at the SDAP layer. If user plane encryption and decryption and integrity protection processing are based on the flow granularity, they all need to be completed at the SDAP layer. Therefore, a precondition for security processing based on the flow granularity level is that security or partial security is implemented at the SDAP layer.

For example, there are four service flows (IP-flow) and three QoS flows in one session. NAS-level mapping indicates first-time QoS processing. An IP flow is mapped as a QoS flow, represented by a QFI (QoS flow ID). It can be seen that an IP flow 1 and an IP flow 4 are placed in a QFI 1, and each of other flows is in one separate QFI. At the SDAP layer, the SDAP layer maps QFIs of different flows to different PDCP layers. It can be seen that the QFI 1 and a QFI 2 are placed on one PDCP entity (PDCP entity), indicating that the QFI 1 and the QFI 2 are transmitted by using one DRB. (One PDCP entity is corresponding to one DRB bearer), and a QFI-3 is placed on another PDCP entity-2, which is another DRB bearer.

Optionally, a user plane integrity protection algorithm allowed by the base station is a user plane integrity protection algorithm sorted based on a priority. Alternatively, a user plane integrity protection algorithm supported by the terminal device is a user plane integrity protection algorithm sorted based on a priority. Priority sorting may be performed, based on a local operator preference, a local environment, or the like, on the user plane integrity protection algorithm allowed by the base station, and the user plane integrity protection algorithm allowed by the base station may be preconfigured on the base station. Priority sorting may be performed, based on network access subscription content of the terminal device, a preference of the terminal device, and/or the like, on the user plane integrity protection algorithm supported by the terminal device, and may be performed by the terminal device at the time of subscription or buying more services. Optionally, the security policy may include the user plane integrity protection algorithm supported by the terminal device.

Optionally, in step 222, in an optional implementation solution, the security policy includes at least one user plane integrity protection algorithm. The base station directly determines one user plane integrity protection algorithm in the at least one user plane integrity protection algorithm included in the security policy, as the target user plane integrity protection algorithm. In another optional solution, that the base station determines the target user plane integrity protection algorithm includes: the base station determines the target user plane integrity protection algorithm based on the user plane integrity protection algorithm supported by the terminal device and the user plane integrity protection algorithm allowed by the base station.

The base station may determine the target user plane integrity protection algorithm in several optional implementations. For example, the base station determines at least one algorithm that belongs to the user plane integrity protection algorithm supported by the terminal device and that also belongs to the user plane integrity protection algorithm allowed by the base station, and determines the target user plane integrity protection algorithm in the at least one algorithm. Optionally, if the user plane integrity protection algorithm allowed by the base station is a user plane integrity protection algorithm sorted based on a priority, an algorithm with a relatively high priority or a highest priority in the user plane integrity protection algorithm allowed by the base station is determined from the at least one algorithm as the target user plane integrity protection algorithm. Optionally, if the user plane integrity protection algorithm supported by the terminal device is a user plane integrity protection algorithm sorted based on a priority, the base station determines an algorithm with a relatively high priority or a highest priority in the user plane integrity protection algorithm supported by the terminal device, from the at least one algorithm as the target user plane integrity protection algorithm.

Optionally, the security policy further includes the user plane integrity protection algorithm allowed by the serving network. Optionally, the user plane integrity protection algorithm allowed by the serving network is a user plane integrity protection algorithm sorted based on a priority. Optionally, the user plane integrity protection algorithm allowed by the serving network may be preconfigured on the SMF. A priority of the user plane integrity protection algorithm allowed by the serving network may be sorted based on factors such as an operator preference and/or a local environment. Optionally, that the base station determines the target user plane integrity protection algorithm based on the user plane integrity protection algorithm supported by the terminal device and the user plane integrity protection algorithm allowed by the base station includes the following: The base station determines the target user plane integrity protection algorithm based on the user plane integrity protection algorithm allowed by the base station, the user plane integrity protection algorithm supported by the terminal device, and the user plane integrity protection algorithm allowed by the serving network. Specifically, when the user plane integrity protection algorithm allowed by the serving network is sorted based on a priority, selection is made by using priority sorting allowed by the serving network as a primary condition or by using priority sorting allowed by the base station as the primary condition. Using which priority sorting depends on a policy of a local operator or other information. For example, a current user plane integrity protection algorithm allowed by the base station is updated recently, and the user plane integrity protection algorithm allowed by the serving network was updated a long time ago. Therefore, the priority sorting of the user plane integrity protection algorithm allowed by the base station is used as the primary condition. For another example, the priority sorting of the user plane integrity protection algorithm allowed by the base station is used as the primary condition by default. If the user plane integrity protection algorithm allowed by the serving network is not sorted based on a priority, the priority sorting of the user plane integrity protection algorithm allowed by the base station is used as the primary condition.

The base station may determine the target user plane integrity protection algorithm in several optional implementations. For example, the base station determines at least one algorithm that belongs to the user plane integrity protection algorithm supported by the terminal device, that also belongs to the user plane integrity protection algorithm allowed by the base station, and that also belongs to the user plane integrity protection algorithm allowed by the serving network, and determines the target user plane integrity protection algorithm from the at least one algorithm. Optionally, if the user plane integrity protection algorithm allowed by the base station is a user plane integrity protection algorithm sorted based on a priority, an algorithm with a relatively high priority or a highest priority in the user plane integrity protection algorithm allowed by the base station is determined from the at least one algorithm as the target user plane integrity protection algorithm. Optionally, if the user plane integrity protection algorithm supported by the terminal device is a user plane integrity protection algorithm sorted based on a priority, the base station determines an algorithm with a relatively high priority or a highest priority in the user plane integrity protection algorithm supported by the terminal device, from the at least one algorithm as the target user plane integrity protection algorithm. Optionally, if the user plane integrity protection algorithm allowed by the serving network is a user plane integrity protection algorithm sorted based on a priority, the base station determines an algorithm with a relatively high priority or a highest priority in the user plane integrity protection algorithm allowed by the serving network, from the at least one algorithm as the target user plane integrity protection algorithm. Optionally, the network in this embodiment of this application may include a 5G network or a network evolving from the 5G network.

Optionally, the method further includes the following: When the security policy further includes encryption indication information, and the encryption indication information is used to indicate the base station to enable encryption protection for the terminal device, the base station sends a target user plane encryption algorithm to the terminal device.

Based on the foregoing content, the following describes a method process in which the base station and the terminal device further need to negotiate the target user plane encryption algorithm.

Optionally, the user plane encryption algorithm allowed by the base station is a user plane encryption algorithm sorted based on a priority. Alternatively, the user plane encryption algorithm supported by the terminal device is a user plane encryption algorithm sorted based on a priority. Priority sorting may be performed, based on at least the operator preference, on the user plane encryption algorithm allowed by the base station, and the user plane encryption algorithm allowed by the base station may be sorted by the operator during network construction and may be preconfigured on the base station. Priority sorting may be performed, based on the operator preference, on the user plane encryption algorithm supported by the terminal device, and the user plane encryption algorithm supported by the terminal device may be sorted by the user during network access subscription. Optionally, the security policy may include the user plane encryption algorithm supported by the terminal device.

Optionally, an optional implementation solution is further included. The security policy includes at least one user plane encryption algorithm, and the base station directly determines one user plane encryption algorithm in the at least one user plane encryption algorithm included in the security policy, as the target user plane encryption algorithm. In another optional solution, the base station determines the target user plane encryption algorithm based on the user plane encryption algorithm supported by the terminal device and the user plane encryption algorithm allowed by the base station.

The base station may determine the target user plane encryption algorithm in several optional implementations. For example, the base station determines at least one algorithm that belongs to the user plane encryption algorithm supported by the terminal device and that also belongs to the user plane encryption algorithm allowed by the base station, and determines the target user plane encryption algorithm from the at least one algorithm. Optionally, if the user plane encryption algorithm allowed by the base station is a user plane encryption algorithm sorted based on a priority, an algorithm with a relatively high priority or a highest priority in the user plane encryption algorithm allowed by the base station is determined, as the target user plane encryption algorithm, from the at least one algorithm that belongs to the user plane encryption algorithm supported by the terminal device and that also belongs to the user plane encryption algorithm allowed by the base station. Optionally, if the user plane encryption algorithm supported by the terminal device is a user plane encryption algorithm sorted based on a priority, the base station determines an algorithm with a relatively high priority or a highest priority in the user plane encryption algorithm supported by the terminal device, as the target user plane encryption algorithm from the at least one algorithm that belongs to the user plane encryption algorithm supported by the terminal device and that also belongs to the user plane encryption algorithm allowed by the base station.

Optionally, the security policy further includes a user plane encryption algorithm allowed by the serving network. Optionally, the user plane encryption algorithm allowed by the serving network is a user plane encryption algorithm sorted based on a priority. Optionally, the user plane encryption algorithm allowed by the serving network may be preconfigured on the SMF. A priority of the user plane encryption algorithm allowed by the serving network may be sorted based on at least the operator preference. Optionally, that the base station determines the target user plane encryption algorithm based on the user plane encryption algorithm supported by the terminal device and the user plane encryption algorithm allowed by the base station includes the following: The base station determines the target user plane encryption algorithm based on the user plane encryption algorithm allowed by the base station, the user plane encryption algorithm supported by the terminal device, and the user plane encryption algorithm allowed by the serving network. Specifically, when the user plane encryption algorithm allowed by the serving network is sorted based on a priority, selection is made by using priority sorting allowed by the serving network as a primary condition. If the user plane encryption algorithm allowed by the serving network is not sorted based on a priority, a priority sorting of the user plane security algorithm allowed by the base station is used as the primary condition.

The base station may determine the target user plane encryption algorithm in several optional implementations. For example, the base station determines at least one algorithm that belongs to the user plane encryption algorithm supported by the terminal device, that also belongs to the user plane encryption algorithm allowed by the base station, and that also belongs to the user plane encryption algorithm allowed by the serving network, and determines the target user plane encryption algorithm from the at least one algorithm that belongs to the user plane encryption algorithm supported by the terminal device, that also belongs to the user plane encryption algorithm allowed by the base station, and that also belongs to the user plane encryption algorithm allowed by the serving network. Optionally, if the user plane encryption algorithm allowed by the base station is a user plane encryption algorithm sorted based on a priority, an algorithm with a relatively high priority or a highest priority in the user plane encryption algorithm allowed by the base station is determined as the target user plane encryption algorithm from the at least one algorithm that belongs to the user plane encryption algorithm supported by the terminal device, that also belongs to the user plane encryption algorithm allowed by the base station, and that also belongs to the user plane encryption algorithm allowed by the serving network. Optionally, if the user plane encryption algorithm supported by the terminal device is a user plane encryption algorithm sorted based on a priority, the base station determines an algorithm with a relatively high priority or a highest priority in the user plane encryption algorithm supported by the terminal device, as the target user plane encryption algorithm from the at least one algorithm that belongs to the user plane encryption algorithm supported by the terminal device, that also belongs to the user plane encryption algorithm allowed by the base station, and that also belongs to the user plane encryption algorithm allowed by the serving network. Optionally, if the user plane encryption algorithm allowed by the serving network is a user plane encryption algorithm sorted based on a priority, the base station determines an algorithm with a relatively high priority or a highest priority in the user plane encryption algorithm allowed by the serving network, as the target user plane encryption algorithm from the at least one algorithm that belongs to the user plane encryption algorithm supported by the terminal device, that also belongs to the user plane encryption algorithm allowed by the base station, and that also belongs to the user plane encryption algorithm allowed by the serving network.

Optionally, when the security policy further includes a key length, the base station sends the key length to the terminal device. The key length includes a user plane integrity protection key length and a user plane encryption key length. Optionally, in this embodiment of this application, when sending information such as the target user plane integrity protection algorithm, the target user plane encryption algorithm, and the key length to the terminal device, the base station may use one piece of signaling such as an RRC reconfiguration request, or use a plurality of pieces of information.

In an optional implementation, if the RRC reconfiguration request is used for sending, there may be a plurality of sending manners. For example, an RRC reconfiguration message may be used. The RRC reconfiguration message may include at least one of a target user plane encryption algorithm, a target user plane integrity protection algorithm, a user plane encryption key length, a user plane integrity protection key length, a key mixing policy (which may also be referred to as D-H), information indicating enabling or disabling, DRB-1 (QoS information), DRB-2 (QoS information), and another parameter.

In an optional implementation, if user plane integrity is not enabled, the target user plane integrity protection algorithm is not transmitted. When the algorithm itself can indicate the key length, indication information of the key length may not be carried. When the base station does not support or does not need to enable the key mixing policy, the key mixing policy does not need to be transmitted. In this method, the security policy is not transmitted on each DRB. Therefore, this method is applicable to a case in which all DRBs use a same security capability. In addition, a target security policy can be configured for all the DRBs through one selection process.

In another optional implementation, the RRC reconfiguration message may include: a reconfiguration parameter; DRB-1 (target user plane security encryption algorithm-1, [target user plane integrity protection algorithm-1], [user plane encryption key length-1], [user plane integrity protection key length-1], [key mixing policy], QoS parameter, another parameter); and DRB-2 (target user plane security encryption algorithm-2, [target user plane integrity protection algorithm-2], [user plane encryption key length-2], [user plane integrity protection key length-2], [key mixing policy], QoS parameter, another parameter), another parameter).

The RRC reconfiguration message merely shows two example cases: DRB-1 and DRB-2. A format carried in the RRC reconfiguration message may be similar to that in the foregoing example, and all or some of the parameter items may be carried. For example, the parameters included in [ ] in the foregoing example may be carried or may not be carried. In this way, a target security policy may be configured for each DRB, and the target security policy of each DRB may be the same, or the target security policy of each DRB may be different.

The foregoing two methods may also be used together, that is, some target security policies may be shared by all DRBs, and a security policy is different depending on different DRBs. For example, the RRC reconfiguration message includes: the target user plane security encryption algorithm; DRB-1 ([target user plane integrity protection algorithm-1], [user plane encryption key length-1], [user plane integrity protection key length-1], [key mixing policy], QoS parameter, another parameter); DRB-2 ([target user plane integrity protection algorithm-2], [user plane encryption key length-2], [user plane integrity protection key length-2], [key mixing policy], QoS parameter, another parameter); and another parameter.

Optionally, before the base station sends the target user plane integrity protection algorithm to the terminal device, the method further includes that the base station receives quality of service of a current session of the terminal device from the SMF entity. Optionally, the quality of service of the current session and the security policy may be sent by using one message or may be sent separately by using a plurality of messages. Optionally, the base station further receives, from the AMF, some basic information used to generate a key, for example, a base key used to generate a user plane integrity protection key and a base key used to generate a user plane encryption key.

Optionally, the base station allocates a data radio bearer (DRB) to the terminal device based on at least one of the security policy and the quality of service, and the data radio bearer is allocated by the base station. The base station allocates, based on at least the quality of service, the data radio bearer to data transmitted to the terminal device. In 5G, in one data radio bearer, there may be data flows corresponding to a plurality of types of quality of service.

Optionally, one DRB may be corresponding to a plurality of pieces of quality of service. A target data radio bearer is allocated to the terminal device based on at least one of the security policy and the quality of service.

Optionally, when no historical data radio bearer meeting the first condition exists on the base station, and no at least one historical data radio bearer meeting the second condition exists on the base station, the base station sets up the target data radio bearer for the terminal device based on at least one of the security policy and the quality of service.

Optionally, when no historical data radio bearer meeting the first condition exists on the base station, the base station sets up the target data radio bearer for the terminal device based on at least one of the security policy and the quality of service.

Optionally, the base station sets up the target data radio bearer for the terminal device based on at least one of the security policy and the quality of service.

Optionally, a previously established historical DRB may be selected as the target data radio bearer for the terminal device, or a DRB may be newly established as the target data radio bearer.

In an optional implementation, one of the historical data radio bearer may be directly first selected as the target data radio bearer for the terminal device, and if the target data radio bearer cannot be selected from the historical data radio bearer, a new data radio bearer is set up for the terminal device as the target data radio bearer.

Alternatively, based on some preset rules, first it is determined whether the terminal device is allowed to use the historical data radio bearer. If the terminal device is allowed, one of the historical data radio bearers may be first selected as the target data radio bearer for the terminal device. If the target data radio bearer cannot be selected from the historical data radio bearer, a new data radio bearer is set up for the terminal device and is directly used as the target data radio bearer. For more detailed description of the foregoing solution, the following uses several detailed examples for description.

Implementation b1

When at least one historical data radio bearer meeting the first condition exists on the base station, the target data radio bearer is one of the at least one historical data radio bearer meeting the first condition. Quality of service supported by each data radio bearer of the at least one historical data radio bearer meeting the first condition is the same as the quality of service of the current session, and the security policy is the same as a security policy supported by each data radio bearer.

Optionally, the first condition includes that the supported quality of service is the same as the quality of service of the current session, and that the security policy obtained in step 221 is the same as the supported security policy.

Information about DRB reusing may be implemented by sending a message. For example, the message transmitted to the terminal device for the first time is: RRC reconfiguration message (target user plane encryption algorithm-1, DRB-1 (QoS information-1), DRB-2 (QoS information-2), another parameter); the message transmitted to the terminal device for the second time is: RRC reconfiguration message (current user plane encryption algorithm-1, DRB-1 (QoS information-1), DRB-2 (QoS information-2), DRB-3 (current user plane encryption algorithm-2, QoS information-2/3/4), another parameter)). In this way, a security policy of DRB-2 is modified to achieve a purpose of reusing QoS. It can be learned from this example that a purpose of using the historical data radio bearer as the target data radio bearer is achieved by sending signaling.

For another example, to achieve the purpose of reusing the historical DRB, the message transmitted to the terminal device for the first time is: RRC reconfiguration message (target user plane encryption algorithm-1, DRB-1 (QoS information-1), DRB-2 (QoS information-2), another parameter)); the message transmitted to the terminal device for the second time is: RRC reconfiguration message (current user plane encryption algorithm-1, DRB-1 (QoS information-1), DRB-2 (current user plane encryption algorithm-2, QoS information-2), another parameter)). In this way, the security policy of DRB-2 is modified to achieve the purpose of reusing QoS.

Implementation b2

When no historical data radio bearer meeting the first condition exists on the base station, but at least one historical data radio bearer meeting the second condition exists on the base station, the target data radio bearer is a data radio bearer obtained after one of the at least one historical data radio bearer meeting the second condition is updated based on the security policy. Quality of service supported by each data radio bearer of the at least one historical data radio bearer meeting the second condition is the same as the quality of service of the current session, and the security policy matches a security policy supported by each data radio bearer; or quality of service supported by each data radio bearer of the at least one historical data radio bearer meeting the second condition matches the quality of service of the current session, and the security policy is the same as a security policy supported by each data radio bearer; or quality of service supported by each data radio bearer of the at least one historical data radio bearer meeting the second condition matches the quality of service of the current session, and the security policy matches a security policy supported by each data radio bearer.

Optionally, the second condition includes that the supported quality of service matches the quality of service of the current session, and that the obtained security policy is the same as the supported security policy. Alternatively, optionally, the second condition includes that the supported quality of service is the same as the quality of service of the current session, and the obtained security policy matches the supported security policy. Alternatively, optionally, the second condition includes that the supported quality of service matches the quality of service of the current session, and the obtained security policy matches the supported security policy.

That is, corresponding security policies and quality of service of the found historical data radio bearer and the target data radio bearer are not completely the same but are slightly different. For example, a difference between bandwidth requirements is within a preset range, so that the historical data radio bearer can be used for minimum modification. For example, a relationship between a data radio bearer meeting the second condition and the target data radio bearer may meet the following: User plane encryption protection but not user plane integrity protection is enabled for the data radio bearer meeting the second condition; user plane encryption protection and user plane integrity protection are enabled for the target data radio bearer; and a target user plane encryption algorithm of the data radio bearer meeting the second condition is the same as a target user plane encryption algorithm of the target data radio bearer. In this case, because a resource of the base station is limited, a new DRB cannot be set up; or the base station is set to reuse the historical data radio bearer. Therefore, the base station sends the RRC reconfiguration message for a plurality of times and enables integrity protection.

This embodiment of this application provides a possible implementation: For example, a message transmitted by the base station to the terminal device for the first time is: RRC reconfiguration message (target user plane encryption algorithm, DRB-1 (QoS information-1), DRB-2 (QoS information-2), another parameter)); a message transmitted by the base station to the terminal device for the second time is: RRC reconfiguration message (current user plane encryption algorithm, DRB-1 (QoS information-1), DRB-2 (target user plane integrity protection algorithm, QoS information-2, QoS information-3), another parameter)). In this way, a resource of DRB-2 may be reused. Certainly, there are a plurality of specific implementations, and merely examples are provided herein.

Implementation b3

A data radio bearer is set up directly based on at least one of the security policy or the quality of service.

Implementation b4

The base station preconfigures an association relationship among the data radio bearer, the quality of service, and the security policy, and sets a corresponding identifier for each association relationship, for example, a subscriber profile ID for RAT/frequency priority (Subscriber Profile ID for RAT/Frequency Priority, SPID). That is, regardless of a basis of any one or more of a session ID, an IMSI, a DNN, and NSSAI, or whether searching is performed on a UDM, a UPF, and a PCF, the SMF obtains one SPID anyway. Then, the SMF delivers the SPID to an RAN, and the RAN can find a preset QoS policy and security policy by using the SPID. In this case, the SMF does not need to deliver any security policy, but only the SPID. Then, the RAN may determine a used DRB based on the SPID, and the used DRB meets the QoS policy and the security policy.

Optionally, that the base station sends the target user plane integrity protection algorithm to the terminal device includes that the base station sends the target user plane integrity protection algorithm to the terminal device by using Radio Resource Control (RRC) signaling. Optionally, the RRC signaling includes an RRC reconfiguration request (RRC Connection reconfiguration request).

Optionally, if the security policy indicates that the base station and the terminal device need to negotiate the target user plane encryption algorithm, the base station further needs to send the target user plane encryption algorithm to the terminal device. Optionally, the base station further needs to send the key length to the terminal device. If the security policy indicates that the base station and the terminal device need to negotiate the target user plane encryption algorithm, the key length may include a user plane encryption key length. If the integrity protection indication information indicates the base station enables integrity protection for the terminal device, the key length may include a user plane integrity protection key length. One or more of the target user plane integrity algorithm, the target user plane encryption algorithm, the key length, and the quality of service may be sent to the terminal device by using one piece of signaling, for example, an RRC reconfiguration request.

Optionally, when the security policy further includes D-H indication information, and the D-H indication information is used to indicate the base station to enable D-H for the terminal device, the base station sends a D-H related key to the terminal device. The following example describes in detail a signaling exchanging process between the base station and the terminal device if the D-H indication information is used to indicate the base station to enable D-H for the terminal device.

If the key mixing policy is enabled, the base station selects, based on a D-H capability reported by the UE and a D-H capability allowed by the base station, a D-H capability that is allowed by the base station and that has a highest priority. In addition, the base station generates a public key P1 and a private key B1 based on the selected D-H capability. The base station sends the public key P1 and the selected D-H capability to the terminal device, for example, may use an RRC reconfiguration message. The terminal device generates a public key P2 and a private key B2 based on the selected D-H capability, and generates a key Kdh by using the private key B2 and the public key P1. Then, Kdh and Kan are used for key mixing. A mixing method may be New-Kan=KDF(Kdh, Kan, and another parameter). KDF (key derivation function) is a key generation function, for example, a hash 256 algorithm, and the another parameter may be a freshness parameter, for example, PDCP COUNT. Kdh and Kan may be directly used for key mixing without using the another parameter. After key mixing, a new user plane key is generated based on the New-Kan and the target user plane security algorithm. In addition, the new user plane key is used to protect the RRC reconfiguration message, and then the RRC reconfiguration message is sent to the base station. The RRC reconfiguration message includes the public key P2. After obtaining the public key P2, the base station generates the New-Kan based on the public key P2 and the private key B1 by using a same method as the terminal device, and further uses a same method as the terminal device to obtain a new user plane key. In addition, the new user plane key is used to verify the RRC reconfiguration message. If verification succeeds, the base station starts to enable the new user plane key.

In an optional implementation of the embodiment shown in FIG. 2a or FIG. 2b, after step 213 in FIG. 2b, the method further includes the following: The base station receives the security policy or the identifier of the security policy, and the base station may select one user plane integrity protection algorithm in the security policy as the target user plane integrity protection algorithm based on information provided in the security policy. The security policy may include one or more user plane integrity protection algorithms. Alternatively, the base station may not use the user plane integrity protection algorithm in the security policy as the target user plane integrity protection algorithm. Alternatively, when the user plane integrity protection algorithm in the security policy is not in a list of user plane integrity protection algorithms allowed by the base station, the base station does not use the user plane integrity protection algorithm in the security policy as the target user plane integrity protection algorithm. Further, optionally, when the user plane integrity protection algorithm in the security policy is not used as the target user plane integrity protection algorithm, if the base station enables user plane integrity protection, the base station may select one of a user plane integrity protection algorithm different from the user plane integrity protection algorithm in the security policy as the target user plane integrity protection algorithm. For example, the base station may select one of the user plane integrity protection algorithm allowed by the base station as the target user plane integrity protection algorithm. For another example, if a security policy is preconfigured on the base station, and the base station does not receive a security policy delivered by another network element, the base station may select the target user plane integrity protection algorithm based on the preconfigured security policy on the base station. For example, the preconfigured security policy may include one or more user plane integrity protection algorithms, and the base station selects one user plane integrity protection algorithm from the preconfigured security policy as the target user plane integrity protection algorithm. For more other implementations, refer to the foregoing content.

Optionally, the user plane integrity protection algorithm in the security policy may be the user plane integrity protection algorithm that is included in the security policy described in the foregoing content and that is allowed by the serving network, or may be determined by the SMF entity based on at least one of the user plane integrity protection algorithm allowed by the serving network, the user plane integrity protection algorithm supported by the terminal device, and the user plane integrity protection algorithm allowed by the base station. For example, the SMF entity may determine an algorithm that belongs to the user plane integrity protection algorithm supported by the terminal device and that also belongs to the user plane integrity protection algorithm allowed by the base station, as the target user plane integrity protection algorithm. For another example, the SMF entity may determine an algorithm that belongs to the user plane integrity protection algorithm supported by the terminal device, that also belongs to the user plane integrity protection algorithm allowed by the base station, and that also belongs to the user plane integrity protection algorithm allowed by the serving network, as the target user plane integrity protection algorithm.

The security policy may include a signaling plane integrity protection algorithm, that is, the security policy may include a signaling plane integrity protection algorithm and/or a user plane integrity protection algorithm. For example, the user plane integrity protection algorithm included in the security policy is also a signaling plane integrity protection algorithm, that is, an integrity protection algorithm included in the security policy is used for both user plane integrity protection and signaling plane integrity protection.

It can be learned by a person skilled in the art that there are a plurality of implementations of selecting the target user plane encryption algorithm, the target signaling plane integrity protection algorithm, and the target signaling plane encryption algorithm by the base station. Refer to the solution description of selecting the target user plane integrity protection algorithm. The following briefly describes several implementations.

In an optional implementation of the embodiment shown in FIG. 2a or FIG. 2b, after step 213 in FIG. 2b, the method further includes the following: The base station receives the security policy or the identifier of the security policy, and the base station may select one user plane encryption algorithm in the security policy as the target user plane encryption algorithm based on information provided in the security policy. The security policy may include one or more user plane encryption algorithms. Alternatively, the base station may not use the user plane encryption algorithm in the security policy as the target user plane encryption algorithm. Alternatively, when the user plane encryption algorithm in the security policy is not in a list of user plane encryption algorithms allowed by the base station, the base station does not use the user plane encryption algorithm in the security policy as the target user plane encryption algorithm. Further, optionally, when the user plane encryption algorithm in the security policy is not used as the target user plane encryption algorithm, if the base station enables user plane encryption protection, the base station may select one of a user plane encryption algorithm different from the user plane encryption algorithm in the security policy as the target user plane encryption algorithm. For example, the base station may select one of the user plane encryption algorithm allowed by the base station as the target user plane encryption algorithm. For more other implementations, refer to the foregoing content.

Optionally, the user plane encryption algorithm in the security policy may be the user plane encryption algorithm that is included in the security policy described in the foregoing content and that is allowed by the serving network, or may be determined by the SMF entity based on at least one of the user plane encryption algorithm allowed by the serving network, the user plane encryption algorithm supported by the terminal device, and the user plane encryption algorithm allowed by the base station. For example, the SMF entity may determine an algorithm that belongs to the user plane encryption algorithm supported by the terminal device and that also belongs to the user plane encryption algorithm allowed by the base station, as the target user plane encryption algorithm. For another example, the SMF entity may determine an algorithm that belongs to the user plane encryption algorithm supported by the terminal device, that also belongs to the user plane encryption algorithm allowed by the base station, and that also belongs to the user plane encryption algorithm allowed by the serving network, as the target user plane encryption algorithm.

The security policy may include a signaling plane encryption algorithm, that is, the security policy may include a signaling plane encryption algorithm and/or a user plane encryption algorithm. For example, the user plane encryption algorithm included in the security policy is also a signaling plane encryption algorithm, that is, an encryption algorithm included in the security policy is used for both user plane encryption protection and signaling plane encryption protection.

Optionally, in an implementation of the embodiment shown in FIG. 2a, the method shown in FIG. 2a further includes that the terminal device obtains a target user plane integrity protection algorithm. Specifically, the following two manners may be used:

Manner 1: The terminal device receives the target user plane integrity protection algorithm sent by the base station. For example, in step 223 in FIG. 2b, the base station sends the target user plane integrity protection algorithm to the terminal device, and correspondingly, the terminal device receives the target user plane integrity protection algorithm sent by the base station.

Manner 2: The terminal device determines the target user plane integrity protection algorithm. For example, the terminal device still uses a previously used target user plane integrity protection algorithm. For another example, the terminal device determines a target signaling plane integrity protection algorithm (the target signaling plane integrity protection algorithm may be sent by the base station to the terminal device) as the target user plane integrity protection algorithm. In this way, flexibility of determining the target user plane integrity protection algorithm by the terminal device may be improved.

In addition, the terminal device may further determine the target user plane encryption algorithm. For example, the terminal device still uses a previously used target user plane encryption algorithm. For another example, the terminal device determines the target signaling plane encryption algorithm as the target user plane encryption algorithm.

In an implementation of the embodiment shown in FIG. 2, the method shown in FIG. 2 further includes that the base station determines a target user plane integrity protection algorithm and/or a target user plane encryption algorithm. For example, the target signaling plane integrity protection algorithm in the target signaling plane protection algorithm determined in step 202 may also be used as the target user plane integrity protection algorithm, and the target signaling plane encryption algorithm in the target signaling plane protection algorithm determined in step 202 may also be used as the target user plane encryption algorithm.

Optionally, in an implementation of the embodiments shown in FIG. 2, FIG. 2a, and FIG. 2b, the method further includes the following:

The base station enables user plane integrity protection; or the terminal device and the base station enable user plane integrity protection; or the terminal device enables user plane integrity protection.

The following provides description by using the base station as an example to enable user plane integrity protection or enable user plane encryption protection.

For example, when a condition for enabling user plane integrity protection by the base station is met, the base station enables user plane integrity protection.

The condition for enabling user plane integrity protection by the base station may be as follows: The base station receives a first preset user plane message, such as a session establishment accept message; or the base station receives user plane information, such as a session ID or a QoS profile, where the user plane information may be preset user plane information, such as a preset session ID or a preset QoS profile, and the preset session ID may be a specified session ID; or the base station currently allocates a user plane resource to the terminal device or reallocates a user plane resource to the terminal device, for example, the base station receives a message requesting to allocate a user plane resource to the terminal device, and if the base station currently reallocates the user plane resource to the terminal device, and a network running parameter meets a preset network permission condition, the base station may enable user plane integrity protection; or the security policy received by the base station includes the integrity protection indication information, and the integrity protection indication information indicates to enable user plane integrity protection; or the base station receives a preset session service type. For example, the preconfigured security policy may include an association relationship between the preset session service type and enabling of user plane integrity protection. User plane integrity protection may be enabled when the preset session service type is received.

When the condition for enabling user plane integrity protection by the base station is met, for several specific implementations in which the base station enables user plane integrity protection, refer to the following implementation c1-a1 to implementation c1-a7.

Implementation c1-a1

For example, when receiving a first preset user plane message within a preset time period, the base station may enable user plane integrity protection, and the first preset user plane message may be a session establishment accept message.

For example, if the base station receives a session establishment accept message (which may also be referred to as session establishment complete) within the preset time period, it indicates that the base station is currently in a session establishment procedure, and to improve user plane signaling security, user plane integrity protection may be enabled.

Implementation c1-a2

When receiving user plane information within a preset time period, the base station may enable user plane integrity protection, and the user plane information may be a session ID or a preset QoS profile.

For example, if the base station receives any session ID or any QoS profile (optionally, which may be received from an N2 interface, or may be directly obtained from the terminal device side) within the preset time period, the base station is currently in a session establishment procedure and enables user plane integrity protection. Optionally, signaling plane protection may also be enabled.

Optionally, enabling signaling plane protection may be at least one of enabling signaling plane integrity protection and enabling signaling plane encryption protection. The description in this paragraph is applicable to all embodiments of this application, and is not further provided in the following content.

Implementation c1-a3

When receiving preset user plane information within a preset time period, the base station may enable user plane integrity protection. The preset user plane information may be a preset session ID or a preset QoS profile. An association relationship between the preset user plane information and whether to enable user plane integrity protection is preset on the base station, and the association relationship between the preset user plane information and whether to enable user plane integrity protection may be used as a part of a preconfigured security policy on the base station.

For example, an association relationship between whether to enable user plane integrity protection and the session ID is set. Therefore, if the base station receives the preset session ID within the preset time period, the base station enables user plane integrity protection. The preset session ID is corresponding to enabling of user plane integrity protection in the association relationship between whether to enable user plane integrity protection and the session ID.

For another example, an association relationship between whether to enable user plane integrity protection and the QoS profile is set. Therefore, if the base station receives the preset QoS profile within the preset time period, the base station enables user plane integrity protection. The preset session ID is corresponding to enabling of user plane integrity protection in the association relationship between whether to enable user plane integrity protection and the session ID.

Further, the association relationship between whether to enable user plane integrity protection and the session ID may be preset on the base station, or the base station may receive an updated association relationship sent by another network element. Optionally, the base station may determine, based on the preset association relationship and the updated association relationship, whether to enable user plane integrity protection. For example, when user plane integrity protection is enabled for the first time, whether to enable user integrity protection may be determined based on the preset association relationship. When an updated association relationship exists subsequently, whether to enable user plane integrity protection may also be determined based only on the latest association relationship. Comprehensive determining may further be performed in combination with a specific preset association relationship, an updated association relationship, and a network load status. For example, if the base station reallocates a resource to a session because of overload, user plane integrity protection originally enabled for the session is disabled in a process of reallocating the resource to the session.

Implementation c1-a4

If the base station currently allocates a user plane resource to the terminal device or reallocates a user plane resource to the terminal device, the base station may enable user plane integrity protection. For example, when the base station receives, within a preset time period, a message requesting to allocate a user plane resource to the terminal device, the base station allocates a user plane resource to the terminal device or reallocates a user plane resource to the terminal device, and the procedure is related to user plane signaling. To improve security of the user plane signaling, user plane integrity protection may be enabled.

Implementation c1-a5

If the base station currently reallocates a user plane resource to the terminal device, and a network running parameter meets a preset network permission condition, the base station may enable user plane integrity protection. The network running parameter includes a network load amount and/or a packet loss rate.

It should be noted that, in a process of reallocating a resource to a session by the base station, the following two optional implementations may be used:

Manner 1: A user plane security solution corresponding to a resource previously allocated to the session of the terminal device is still used. For example, the resource previously allocated to the session of the terminal device is corresponding to enabling of user plane integrity protection, and the reallocated resource corresponding to the session of the terminal device is also corresponding to enabling of user plane integrity protection.

Manner 2: A user plane security solution corresponding to the reallocated resource corresponding to the session is re-determined based on a status of the base station. For example, the status of the base station shows that a packet loss rate of a session is too high. Because user plane integrity protection may increase the packet loss rate, user plane integrity protection is disabled in a process of reallocating the resource to the session. For another example, if the base station reallocates a resource to a session because of overload, in a process of reallocating the resource to the session, user plane integrity protection originally enabled for the session is disabled.

Obviously, the foregoing two optional implementations may be combined. For example, if the base station reallocates a resource to a session, and the status of the base station is normal, user plane integrity protection is kept enabled; or if the status of the base station is abnormal, for example, the base station reallocates a resource to the session because of overload, user plane integrity protection is disabled if user plane integrity protection is originally enabled for the session. For another example, a packet loss rate of a session is too high, and therefore a resource is reallocated to the session. Because user plane integrity protection may increase the packet loss rate, user plane integrity protection is disabled. Optionally, this case may be preconfigured on the base station as a part of the security policy (the security policy preconfigured on the base station may also be the security policy preconfigured on the base station in the foregoing content).

Implementation c1-a6

If a security policy received by the base station includes integrity protection indication information, and the integrity protection indication information indicates to enable user plane integrity protection, the base station may enable user plane integrity protection. Optionally, the integrity protection indication information may be an identifier of an integrity protection algorithm, bit indication information, or preset information. For example, the integrity protection indication information may be sent by an SMF entity. When determining that a user plane integrity protection condition of the SMF entity is met, the SMF entity sends the integrity protection indication information indicating to enable user plane integrity protection. There may be a plurality of implementations in which the SMF entity determines that the user plane integrity protection condition of the SMF entity is met, or refer to the implementation of the base station described in implementation c1-a1 to implementation c1-a5.

Implementation c1-a7

A security policy may be preconfigured on the base station, and the preconfigured security policy may include an association relationship between a preset session service type and enabling of user plane integrity protection. A condition for enabling user plane integrity protection by the base station may be that the security policy preconfigured on the base station includes the preset session service type. For example, the preconfigured security policy may include the association relationship between the preset session service type and enabling of user plane integrity protection. When the preset session service type is received, user plane integrity protection may be enabled. Optionally, if the base station does not receive a security policy sent by a network element, the preconfigured security policy on the base station may be used.

For example, the preconfigured security policy on the base station may be specified in a dimension of user plane data (for example, a service type). For example, it is specified in the preconfigured security policy on the base station that user plane integrity protection is not enabled for a procedure corresponding to a VoIP service. Therefore, when determining that a current session is corresponding to the VoIP service, the base station does not enable user plane integrity protection.

Further, the security policy may be preconfigured on the base station, or may be an updated security policy sent by another network element and received by the base station. Optionally, the base station may determine, based on the preconfigured security policy and the updated security policy, whether to enable user integrity protection. For example, when user plane integrity protection is enabled for the first time, whether to enable user integrity protection may be determined based on the preconfigured security policy. When an updated security policy exists subsequently, whether to enable user plane integrity protection may also be determined based only on the latest security policy. Comprehensive determining may further be performed in combination with a specific preconfigured security policy, an updated security policy, and a network load status. For example, if the base station reallocates a resource to a session because of overload, user plane integrity protection originally enabled for the session is disabled in a process of reallocating the resource to the session.

Further, optionally, the method further includes that the base station sends integrity protection indication information to the terminal device, where the integrity protection indication information is used to indicate to enable user plane integrity protection. The integrity protection indication information may be integrity protection indication information included in the security policy received by the base station.

Optionally, in another implementation of the embodiments shown in FIG. 2, FIG. 2a, and FIG. 2b, the method further includes the following:

The base station enables user plane encryption protection; or the terminal device and the base station enable user plane encryption protection; or the terminal device enables user plane encryption protection.

For example, when a condition for enabling user plane encryption protection by the base station is met, the base station enables user plane encryption protection.

The condition for enabling user plane encryption protection by the base station may be as follows: The base station receives a first preset user plane message, such as a session establishment accept message; or the base station receives user plane information, such as a session ID or a QoS profile. The user plane information may be preset user plane information, such as a preset session ID or a preset QoS profile, and the preset session ID may be a specified session ID; or the base station currently allocates a user plane resource to the terminal device or reallocates a user plane resource to the terminal device, for example, the base station receives a message requesting to allocate a user plane resource to the terminal device; or the security policy received by the base station includes encryption indication information, and the encryption indication information indicates to enable user plane encryption protection; or the base station receives a preset session service type. For example, the preconfigured security policy may include an association relationship between the preset session service type and enabling of user plane encryption protection. User plane encryption protection may be enabled when the preset session service type is received; or user plane encryption protection may be enabled when signaling plane protection is enabled.

Further, optionally, the method further includes that the base station sends encryption indication information to the terminal device. The encryption indication information is used to indicate to enable user plane encryption protection. The encryption indication information may be encryption indication information included in the security policy received by the base station.

When the condition for enabling user plane encryption protection by the base station is met, for several specific implementations in which the base station enables user plane encryption protection, refer to the following implementation c1-b1 to implementation c1-b8.

Implementation c1-b1

For example, when receiving a first preset user plane message within a preset time period, the base station may enable user plane encryption protection, and the first preset user plane message may be a session establishment accept message.

For example, if the base station receives a session establishment accept message (which may also be referred to as session establishment complete) within the preset time period, it indicates that the base station is currently in a session establishment procedure, and to improve user plane signaling security, user plane encryption protection may be enabled.

Implementation c1-b2

When receiving user plane information within a preset time period, the base station may enable user plane encryption protection, and the user plane information may be a session ID or a preset QoS profile.

For example, if the base station receives any session ID or any QoS profile (optionally, which may be received from an N2 interface, or may be directly obtained from the terminal device side) within the preset time period, the base station is currently in a session establishment procedure and enables user plane encryption protection. Optionally, signaling plane protection may also be enabled.

Optionally, enabling signaling plane protection may be at least one of enabling signaling plane integrity protection and enabling signaling plane encryption protection. The description in this paragraph is applicable to all embodiments of this application, and is not further provided in the following content.

Implementation c1-b3

When receiving preset user plane information within a preset time period, the base station may enable user plane encryption protection. The preset user plane information may be a preset session ID or a preset QoS profile. An association relationship between the preset user plane information and whether to enable user plane encryption protection is preset on the base station, and the association relationship between the preset user plane information and whether to enable user plane encryption protection may be used as a part of a preconfigured security policy on the base station.

For example, an association relationship between whether to enable user plane encryption protection and the session ID is set. Therefore, if the base station receives the preset session ID within the preset time period, the base station enables user plane encryption protection. The preset session ID is corresponding to enabling of user plane encryption protection in the association relationship between whether to enable user plane encryption protection and the session ID.

For another example, an association relationship between whether to enable user plane encryption protection and the QoS profile is set. Therefore, if the base station receives the preset QoS profile within the preset time period, the base station enables user plane encryption protection. The preset QoS profile is corresponding to enabling of user plane encryption protection in the association relationship between whether to enable user plane encryption protection and the session ID.

Further, the association relationship between whether to enable user plane encryption protection and the session ID may be preset on the base station, or the base station may receive an updated association relationship sent by another network element. Optionally, the base station may determine, based on the preset association relationship and the updated association relationship, whether to enable user encryption protection. For example, when user plane encryption protection is enabled for the first time, whether to enable user encryption protection may be determined based on the preset association relationship. When an updated association relationship exists subsequently, whether to enable user plane encryption protection may also be determined based only on the latest association relationship. Comprehensive determining may further be performed in combination with a specific preset association relationship, an updated association relationship, and a network load status. For example, if the base station reallocates a resource to a session because of overload, user plane encryption protection originally enabled for the session is disabled in a process of reallocating the resource to the session.

Implementation c1-b4

If the base station currently allocates a user plane resource to the terminal device or reallocates a user plane resource to the terminal device, the base station may enable user plane encryption protection. For example, when the base station receives, within a preset time period, a message requesting to allocate a user plane resource to the terminal device, the base station allocates a user plane resource to the terminal device or reallocates a user plane resource to the terminal device, and the procedure is related to user plane signaling. To improve security of the user plane signaling, user plane encryption protection may be enabled.

Implementation c1-b5

If the base station currently reallocates a user plane resource to the terminal device, and a network running parameter meets a preset network permission condition, the base station may enable user plane encryption protection. The network running parameter includes a network load amount and/or a packet loss rate.

It should be noted that, in a process of reallocating a resource to a session by the base station, the following two optional implementations may be used:

Manner 1: A user plane security solution corresponding to a resource previously allocated to the session of the terminal device is still used. For example, the resource previously allocated to the session of the terminal device is corresponding to enabling of user plane encryption protection, and the reallocated resource corresponding to the session of the terminal device is also corresponding to enabling of user plane encryption protection.

Manner 2: A user plane security solution corresponding to the reallocated resource corresponding to the session is re-determined based on a status of the base station. For example, the status of the base station shows that a packet loss rate of a session is too high. Because user plane encryption protection may increase the packet loss rate, user plane encryption protection is disabled in a process of reallocating the resource to the session. For another example, if the base station reallocates a resource to a session because of overload, in a process of reallocating the resource to the session, user plane encryption protection originally enabled for the session is disabled.

Obviously, the foregoing two optional implementations may be combined. For example, if the base station reallocates a resource to a session, and the status of the base station is normal, user plane encryption protection is kept enabled; or if the status of the base station is abnormal, for example, the base station reallocates a resource to the session because of overload, user plane encryption protection is disabled if user plane encryption protection is originally enabled for the session. For another example, a packet loss rate of a session is too high, and therefore a resource is reallocated to the session. Because user plane encryption protection may increase the packet loss rate, user plane encryption protection is disabled. Optionally, this case may be preconfigured on the base station as a part of the security policy (the security policy preconfigured on the base station may also be the security policy preconfigured on the base station in the foregoing content).

Implementation c1-b6

If a security policy received by the base station includes encryption protection indication information, and the encryption protection indication information indicates to enable user plane encryption protection, the base station may enable user plane encryption protection. Optionally, the encryption protection indication information may be an identifier of an encryption algorithm, bit indication information, or preset information. For example, the encryption protection indication information may be sent by an SMF entity. When determining that a user plane encryption protection condition of the SMF entity is met, the SMF entity sends the encryption protection indication information indicating to enable user plane encryption protection. There may be a plurality of implementations in which the SMF entity determines that the user plane encryption protection condition of the SMF entity is met, or refer to the implementation of the base station described in implementation c1-b1 to implementation c1-b5.

Implementation c1-b7

A security policy may be preconfigured on the base station, and the preconfigured security policy may include an association relationship between a preset session service type and enabling of user plane encryption protection. A condition for enabling user plane encryption protection by the base station may be the preset session service type included in the security policy preconfigured on the base station. For example, the preconfigured security policy may include the association relationship between the preset session service type and enabling of user plane encryption protection. When the preset session service type is received, user plane encryption protection may be enabled. Optionally, if the base station does not receive a security policy sent by a network element, the preconfigured security policy on the base station may be used.

For example, the preconfigured security policy on the base station may be specified in a dimension of user plane data (for example, a service type). For example, it is specified in the preconfigured security policy on the base station that user plane encryption protection is not enabled for a procedure corresponding to a VoIP service. Therefore, when determining that a current session is corresponding to the VoIP service, the base station does not enable user plane encryption protection.

Further, the security policy may be preconfigured on the base station, or may be an updated security policy sent by another network element and received by the base station. Optionally, the base station may determine, based on the preconfigured security policy and the updated security policy, whether to enable user encryption protection. For example, when user plane encryption protection is enabled for the first time, whether to enable user encryption protection may be determined based on the preconfigured security policy. When an updated security policy exists subsequently, whether to enable user plane encryption protection may also be determined based only on the latest security policy. Comprehensive determining may further be performed in combination with a specific preconfigured security policy, an updated security policy, and a network load status. For example, if the base station reallocates a resource to a session because of overload, user plane encryption protection originally enabled for the session is disabled in a process of reallocating the resource to the session.

Implementation c1-b8

When enabling signaling plane protection (enabling signaling plane integrity protection and/or signaling plane encryption protection), the base station may also enable user plane encryption protection. For example, in the implementation shown in FIG. 2, after step 202, an optional implementation is further included: When enabling signaling plane protection, the base station also enables user plane encryption protection.

In this implementation, if the terminal device and the base station enable signaling plane protection, and do not enable user plane integrity protection and user plane encryption protection, when user plane integrity protection and user plane encryption protection are enabled, a state of enabling signaling plane protection may be maintained. In this implementation, the base station may send integrity protection indication information and encryption indication information to the terminal device. In this way, on one hand, the terminal device may maintain the enabled state of current signaling plane protection (for example, if the terminal device previously enables signaling plane integrity protection but not signaling plane encryption protection, a state of enabling signaling plane integrity protection but not signaling plane encryption protection is maintained). On the other hand, the terminal device enables user plane integrity protection based on the integrity protection indication information, and enables user plane encryption protection based on the encryption indication information.

In another optional implementation, if the terminal device and the base station enable signaling plane protection, and enable user plane encryption protection but not user plane integrity protection, when user plane integrity protection is enabled, the base station may send, to the terminal device, only the integrity protection indication information used for enabling user plane integrity protection. On one hand, the terminal device may maintain an enabled state of current signaling plane protection (for example, if the terminal device previously enables signaling plane integrity protection but not signaling plane encryption protection, a state of enabling signaling plane integrity protection but not signaling plane encryption protection is maintained). On the other hand, the terminal device enables user plane integrity protection based on the integrity protection indication information, and continuously enables encryption protection. In another optional implementation, the encryption indication information may be transmitted again to indicate to continuously enable user plane encryption protection.

The following provides description by using the terminal device as an example to enable user plane integrity protection or enable user plane encryption protection.

When a condition for enabling user plane integrity protection by the terminal device is met, the terminal device enables user plane integrity protection.

The condition for enabling user plane integrity protection by the terminal device may be as follows: The terminal device receives integrity protection indication information sent by the base station, and the integrity protection indication information indicating to enable user plane integrity protection; or the terminal device sends a second preset user plane message, for example, a session establishment request message.

When the condition for enabling user plane integrity protection by the terminal device is met, for several specific implementations in which the terminal device enables user plane integrity protection, refer to the following implementation c1-c1 and implementation c1-c2.

Implementation c1-c1

In an optional implementation of the embodiments shown in FIG. 2a and FIG. 2b, after step 211, the method further includes that the base station sends integrity protection indication information to the terminal device, where the integrity protection indication information is used to indicate whether to enable user plane integrity protection. The integrity protection indication information may be the integrity protection indication information included in the security policy obtained by the base station in step 221 in FIG. 2b, or may be determined by the base station in any one of the foregoing implementations c1-a1 to c1-a7.

When the terminal device receives the integrity protection indication information, and the integrity protection indication information indicates to enable user plane integrity protection, the terminal device may enable user plane integrity protection.

Implementation c1-c2

For example, the terminal device sends a session establishment request message within a preset time period, and the terminal device is currently in a session establishment procedure. In this case, to improve user plane security, the terminal device may enable user plane integrity protection.

Further, optionally, if the terminal device uses the implementation c1-c2, and the terminal device further receives the integrity protection indication information, if there is a conflict between the implementation c1-c2 and the integrity protection indication information, the terminal device determines, based on the received integrity protection indication information, whether to enable user plane integrity protection.

In an optional implementation of the embodiments shown in FIG. 2a and FIG. 2b, after step 211, the method further includes that the base station sends encryption indication information to the terminal device, where the encryption indication information is used to indicate whether to enable user plane encryption protection. The encryption indication information may be the encryption indication information included in the security policy obtained by the base station in step 221 in FIG. 2b, or may be determined by the base station in any one of the foregoing implementations c1-a1 to c1-a7.

For example, when the terminal device receives the encryption indication information, and the encryption indication information indicates to enable user plane encryption protection, the terminal device may enable user plane encryption protection.

For example, when sending a second preset user plane message within the preset time period, the terminal device may enable user plane encryption protection. For example, the terminal device sends a session establishment request message within the preset time period, and the terminal device is currently in a session establishment procedure. In this case, to improve user plane security, the terminal device may enable user plane encryption protection.

Further, optionally, if the terminal device uses the implementation c1-c2, and the terminal device further receives the encryption indication information, if there is a conflict between the implementation c1-c2 and the encryption indication information, the terminal device determines, based on the received encryption indication information, whether to enable user plane encryption protection.

For another example, when enabling signaling plane protection (enabling signaling plane integrity protection and/or signaling plane encryption protection), the terminal device may also enable user plane encryption protection. For example, in the implementation shown in FIG. 2, between step 203 and step 204, the method further includes that when enabling signaling plane protection, the base station may also enable user plane encryption protection.

The terminal device may determine, based on whether to send the second preset user plane message within the preset time period, whether to enable signaling plane protection (signaling plane integrity protection and/or signaling plane encryption protection). The second preset signaling plane message may include a registration request or a service request. Specifically, if it is determined, based on the current procedure, that the terminal device currently initiates a registration request (or a service request), it is determined that the current procedure is a registration procedure (or a service procedure). Because user plane resource allocation information is not received in the procedure, the terminal device may enable signaling plane protection.

Further, optionally, the terminal device may determine, based on received signaling plane integrity protection indication information, whether to enable signaling plane integrity protection, and may determine, based on received signaling plane encryption indication information, whether to enable signaling plane encryption protection. At least one of the signaling plane integrity protection indication information and the signaling plane encryption indication information received by the terminal device may also be sent by another network element to the base station, and then forwarded by the base station to the terminal device. The another network element may be, for example, an SMF entity.

Optionally, in an implementation of the embodiments shown in FIG. 2, FIG. 2a, and FIG. 2b, the method further includes the following:

The base station does not enable user plane integrity protection; or the terminal device and the base station do not enable user plane integrity protection.

The following uses an example in which the base station does not enable user plane integrity protection for description.

When a condition for not enabling user plane integrity protection by the base station is met, the base station does not enable user plane integrity protection.

The condition for not enabling user plane integrity protection by the base station may be as follows: The base station receives a first preset signaling plane message, such as a registration request complete message or a service request complete message; or the base station does not receive user plane information or preset user plane information such as a session ID, a QoS profile, a preset session ID, or a preset QoS profile within a preset time period; or the base station does not receive, within a preset time period, a message requesting to allocate a user plane resource to the terminal device or reallocate a user plane resource to the terminal device, such as a resource allocation request message; or the integrity protection indication information included in the security policy received by the base station indicates not to enable user plane integrity protection; or a session service type is not a preset session service type, for example, the preconfigured security policy may include an association relationship between the preset session service type and enabling of user plane integrity protection, and user plane integrity protection may be not enabled when the preset session service type is not received.

For example, when a preset default condition indicates that the base station always does not enable user plane integrity protection, a user plane integrity protection key is not generated.

Optionally, in an implementation of the embodiments shown in FIG. 2, FIG. 2a, and FIG. 2b, the method further includes the following:

The base station does not enable user plane encryption protection; or the terminal device and the base station do not enable user plane encryption protection.

The following uses an example in which the base station does not enable user plane encryption protection for description.

When a condition for not enabling user plane encryption protection by the base station is met, the base station does not enable user plane encryption protection.

The condition for not enabling user plane encryption protection by the base station may be as follows: The base station receives a first preset signaling plane message, such as a registration request complete message or a service request complete message; or the base station does not receive user plane information or preset user plane information such as a session ID, a QoS profile, a preset session ID, or a preset QoS profile within a preset time period; or the base station does not receive, within a preset time period, a message requesting to allocate a user plane resource to the terminal device or reallocate a user plane resource to the terminal device, such as a resource allocation request message; or the encryption protection indication information included in the security policy received by the base station indicates not to enable user plane encryption protection; or a session service type is not a preset session service type, for example, the preconfigured security policy may include an association relationship between the preset session service type and enabling of user plane encryption protection.

For example, when a preset default condition indicates that the base station always does not enable user plane encryption protection, a user plane encryption key is not generated.

The following uses an example in which the terminal device does not enable user plane integrity protection for description.

When a condition for not enabling user plane integrity protection by the terminal device is met, the terminal device does not enable user plane integrity protection.

The condition for not enabling user plane integrity protection by the terminal device may be as follows: The terminal device does not send a second preset user plane message within a preset time period, such as a session establishment request message; or the terminal device receives integrity protection indication information sent by the base station, and the integrity protection indication information indicates not to enable user plane integrity protection; or the terminal device receives a first preset signaling plane message within a preset time period, such as a registration request complete message or a service request complete message.

For example, when a preset default condition indicates that the terminal device always does not enable user plane integrity protection, a user plane integrity protection key is not generated.

For example, when a preset default condition indicates that the base station always does not enable user plane encryption protection, a user plane encryption key is not generated.

The following uses an example in which the terminal device does not enable user plane encryption protection for description.

When a condition for not enabling user plane encryption protection by the terminal device is met, the terminal device does not enable user plane encryption protection.

The condition for not enabling user plane encryption protection by the terminal device may be as follows: The terminal device does not send a second preset user plane message within a preset time period, such as a session establishment request message; or the terminal device receives encryption protection indication information sent by the base station, and the encryption protection indication information indicates not to enable user plane encryption protection.

For example, when a preset default condition indicates that the terminal device always does not enable user plane encryption protection, a user plane encryption key is not generated.

There are a plurality of implementations in which the terminal device or the base station does not enable user plane integrity protection, which are as follows:

Manner 1 of not enabling user plane integrity protection: That the terminal device or the base station does not enable user plane integrity protection may be generating a user plane integrity protection key, but not performing user plane integrity protection by using the user plane integrity protection key. That is, when user plane integrity protection is not enabled, the user plane integrity protection key may be first generated, but the user plane integrity protection key is not used; then, when user plane integrity protection is enabled, the user plane integrity protection key is used to perform user plane integrity protection.

In manner 1 of not enabling user plane integrity protection, a user plane integrity protection algorithm is obtained before the terminal device generates the user plane integrity protection key. For example, a signaling plane integrity protection algorithm may be used as the user plane integrity protection algorithm.

Manner 2 of not enabling user plane integrity protection: That the terminal device or the base station does not enable user plane integrity protection may be generating a user plane integrity protection key, and performing user plane integrity protection by using the user plane integrity protection key. That is, when whether to enable user plane integrity protection cannot be determined or it is determined not to enable user plane integrity protection, the user plane integrity protection key may not be generated, and the user plane integrity protection key is generated when user plane integrity protection is enabled.

Correspondingly, for example, for the terminal device and the base station, if it is determined that the terminal device and the base station always do not enable user plane integrity protection (for example, which may be a preset condition), the user plane integrity protection key may not be generated.

Implementations in which the base station and the terminal device do not enable user plane integrity protection may be the same or may be different. For example, both the base station and the terminal device use manner 1 of not enabling user plane integrity protection; or the terminal device uses manner 1 of not enabling user plane integrity protection, and the base station uses manner 2 of not enabling user plane integrity protection.

There are a plurality of implementations in which the terminal device or the base station does not enable user plane encryption protection, which are as follows:

Manner 1 of not enabling user plane encryption protection: That the terminal device or the base station does not enable user plane encryption protection includes generating a user plane encryption protection key, but not performing user plane encryption protection by using the user plane encryption protection key. That is, when user plane encryption protection is not enabled, the user plane encryption protection key may be first generated, but not be used; and when user plane encryption protection is enabled, user plane encryption protection is performed by using the user plane encryption protection key.

In manner 1 of not enabling user plane encryption protection, a user plane encryption algorithm is obtained before the terminal device generates the user plane encryption protection key. For example, a signaling plane encryption algorithm may be used as the user plane encryption algorithm.

Manner 2 of not enabling user plane encryption protection: That the terminal device or the base station does not enable user plane encryption protection includes generating a user plane encryption protection key when user plane encryption protection is enabled, and performing user plane encryption protection by using the user plane encryption protection key. That is, when whether to enable user plane encryption protection cannot be determined or it is determined not to enable user plane encryption protection, the user plane encryption protection key may not be generated, and the user plane encryption key is generated when user plane encryption protection is enabled.

Correspondingly, for example, for the terminal device and the base station, if it is determined that the terminal device and the base station always do not enable user plane encryption protection (for example, which may be a preset condition), the user plane encryption protection key may not be generated.

Implementations in which the base station and the terminal device do not enable user plane encryption protection may be the same or may be different. For example, both the base station and the terminal device use manner 1 of not enabling user plane encryption protection; or the terminal device uses manner 1 of not enabling user plane encryption protection, and the base station uses manner 2 of not enabling user plane encryption protection.

In addition, there are a plurality of implementations in which the base station and the terminal device enable user plane encryption protection. For example, whether to enable user plane encryption protection may be determined based on a preset stipulation. The preset stipulation may be that the terminal device enables user plane encryption protection after receiving an AS security mode command, that is, meeting a user plane encryption protection condition of the base station includes receiving an AS security mode command. Based on this example, for example, meeting a user plane integrity protection condition of the terminal device includes that the terminal device receives integrity protection indication information indicating to enable user plane integrity protection. That is, the terminal device enables user plane encryption protection after receiving the AS security mode command, and whether to enable user plane integrity protection requires the base station to notify the terminal device by sending the integrity protection indication information. In this case, the terminal device does not enable user plane integrity protection when not receiving the integrity protection indication information. Further, when the terminal device receives the integrity protection indication information indicating to enable user plane integrity protection, the terminal device enables user plane integrity protection. In other words, the terminal device does not enable user plane integrity protection within one time period, but may enable user plane integrity protection in another time period. That is, the terminal device does not enable user plane integrity protection temporarily. This is different from a case in which the terminal device always does not enable user plane integrity protection. The base station and the terminal device may further determine, based on a preset stipulation, whether to enable signaling plane protection (including signaling plane integrity protection and/or signaling plane encryption protection), and the preset stipulation may be that the terminal device enables signaling plane protection after receiving an AS security mode command.

For another example, when enabling signaling plane protection (enabling signaling plane integrity protection and/or signaling plane encryption protection), the terminal device or the base station enables user plane encryption protection. That is, meeting the user plane encryption protection condition of the base station includes enabling signaling plane protection. In other words, user plane encryption protection may be enabled together with signaling plane protection, and enabling or disabling user plane integrity protection depends on whether a user plane integrity protection condition of the base station is met. For example, after receiving registration accept or service request accept, the base station may enable signaling plane protection (enable signaling plane integrity protection and/or signaling plane encryption protection), enable user plane encryption protection, but not enable user plane integrity protection. Further, in this implementation, the encryption indication information may not be set.

For example, after step 203 in FIG. 2, that is, after the base station sends the AS security mode command to the terminal device, the terminal device enables signaling plane protection but not user plane protection, and may generate a signaling plane key (signaling plane integrity protection key and/or signaling plane encryption protection key) and a user plane key (user plane integrity protection key and/or user plane encryption protection key). However, only the signaling plane key is used for protection, and the user plane key may be stored. The user plane key is used when user plane protection is enabled.

For another example, after step 203 in FIG. 2, that is, after the base station sends the AS security mode command to the terminal device, the terminal device enables signaling plane protection, enables user plane encryption protection, and does not enable user plane integrity protection, and may generate a signaling plane key (signaling plane integrity protection key and/or signaling plane encryption protection key), a user plane encryption key, and a user plane integrity protection key. However, only the signaling plane key and the user plane encryption key are used for protection. The user plane integrity protection key may be stored. When user plane integrity protection is enabled, the user plane integrity protection key is used to perform integrity protection.

For another example, after step 203 in FIG. 2, that is, after the base station sends the AS security mode command to the terminal device, the terminal device enables signaling plane protection but not user plane protection, may generate a signaling plane key (signaling plane integrity protection key and/or signaling plane encryption protection key) and use the signaling plane key for protection, and does not generate a user plane key (user plane integrity protection key and/or user plane encryption protection key). For another example, when the request message in step 211 in FIG. 2b is a session establishment request, after step 211, the base station sends an AS security mode command or an RRC reconfiguration message to the terminal device, and after receiving the AS security mode command or the RRC reconfiguration message, the terminal device uses the user plane key to perform user plane security protection.

For another example, after step 203 in FIG. 2, that is, after the base station sends the AS security mode command to the terminal device, the terminal device enables signaling plane protection and user plane encryption protection, does not enable user plane integrity protection, may generate a signaling plane key (signaling plane integrity protection key and/or signaling plane encryption protection key) and use the signaling plane key for protection, and may generate a user plane encryption key and use the user plane encryption key for protection, but does not generate a user plane integrity protection key. For another example, when the request message in step 211 in FIG. 2b is a session establishment request, after step 211, the base station sends an AS security mode command or an RRC reconfiguration message to the terminal device, and after receiving the AS security mode command or the RRC reconfiguration message, the terminal device generates the user plane integrity protection key and uses the user plane integrity protection key to perform user plane security protection.

The terminal device may determine, based on received integrity protection indication information sent by the base station, whether to enable user plane integrity protection, or the terminal device may also determine to enable user plane integrity protection or not to enable user plane integrity protection, which is described in the following by using implementation c1 and implementation c2. Further, optionally, to save resources, if the terminal device determines not to enable user plane integrity protection, a user plane integrity protection algorithm may not be sent. That is, in this optional implementation, an empty user plane integrity protection algorithm cannot be sent, but if the terminal device does not enable user plane encryption protection, an empty user plane encryption algorithm is sent.

It should be noted that in the foregoing embodiments and various optional implementations of the embodiments, at least one of the integrity protection indication information, the encryption indication information, the signaling plane integrity protection indication information, and the signaling plane encryption indication information that are sent by the base station to the terminal device may be carried in a preset message. For example, a field is predefined in the preset message, and the predefined field carries at least one of the integrity protection indication information, the encryption indication information, the signaling plane integrity protection indication information, and the signaling plane encryption indication information. The preset message may be an AS security mode command or an RRC reconfiguration request. For example, the integrity protection indication information is sent to the terminal device in a form of an identifier of an algorithm shown in the following implementation c1-1 (b7).

It should be noted that, in the foregoing embodiments and various optional implementations of the embodiments, at least one of the integrity protection indication information, the encryption indication information, the signaling plane integrity protection indication information, and the signaling plane encryption indication information that are received by the base station may be carried in the security policy, and c1-1 (b2) to c1-1 (b7) may be specifically used.

The following describes various representation manners of the integrity protection indication information and/or the encryption indication information.

Implementation c1-1 (b1)

At least one of the integrity protection indication information, the encryption indication information, the signaling plane integrity protection indication information, and the signaling plane encryption indication information may be represented by setting a session ID in a predefined field. For example, when the base station does not receive the session ID, the session ID in the predefined field in the preset message sent to the terminal device is set to 0, indicating that only signaling plane protection is enabled, user plane integrity protection is not enabled, and user plane encryption is not enabled. When the session ID in the predefined field in the preset message received by the terminal device is 0, it may be determined that only signaling plane protection is enabled (signaling plane integrity protection is enabled and/or signaling plane encryption protection is enabled), user plane integrity protection indication information is not enabled, and user plane encryption indication information is not enabled.

Further, enabling signaling plane protection may be enabling at least one of signaling plane integrity protection and signaling plane encryption protection. Specifically, whether to enable signaling plane integrity protection, signaling plane encryption protection, or signaling plane integrity protection and signaling plane encryption protection may be determined based on a preset rule or the like. For example, signaling plane integrity protection and signaling plane encryption protection are enabled by default in the preset rule. The following content similar to that in this paragraph is not repeated below.

For another example, when receiving the session ID, the base station may set the session ID in the predefined field in the preset message sent to the terminal device, to a current session ID. If the terminal device receives the preset message sent by the base station, the predefined field in the preset message includes the session ID, and the session ID is the current session ID, the terminal device enables user plane encryption protection and user plane integrity protection by default. Optionally, an encryption algorithm selected by the base station for the signaling plane may also be used for the user plane, that is, the encryption algorithm selected by the base station is a signaling plane encryption algorithm and a user plane encryption algorithm. Similarly, a selected signaling plane integrity protection algorithm is used as a user plane integrity protection algorithm. Further, if the terminal device receives the preset message sent by the base station, the predefined field in the preset message includes the session ID, and the session ID is not empty, the terminal device may enable user plane integrity protection and/or user plane encryption protection. Specifically, whether to enable user plane encryption protection, user plane integrity protection, or user plane encryption protection and user plane integrity protection may be determined by referring to the preset rule or the description in another embodiment of this application.

In another optional implementation, at least one of the integrity protection indication information, the encryption indication information, the signaling plane integrity protection indication information, and the signaling plane encryption indication information may be indicated by setting related information of QoS in the predefined field in the preset message, for example, setting a QFI value. A manner of using the QFI value may be similar to a manner of using the session ID. For example, when the base station does not receive the QFI, the QFI in the predefined field in the preset message sent to the terminal device is set to 0, indicating that only signaling plane protection is enabled, user plane integrity protection indication information is not enabled, and user plane encryption indication information is not enabled. When the QFI in the predefined field received the terminal device is 0, it may be determined that only signaling plane protection is enabled, user plane integrity protection indication information is not enabled, and user plane encryption indication information is not enabled.

Implementation c1-1 (b2)

The integrity protection indication information and/or the encryption indication information may be represented by using bit information in a predefined field in a preset message or a security policy, for example, the predefined field may include one piece of bit information.

For example, in a default case, user plane encryption protection is enabled, and user plane integrity protection is not enabled. Then, one piece of bit information in the predefined field is the integrity protection indication information. A bit location 1 in the predefined field may indicate enabling of user plane integrity protection. A bit location 0 in the predefined field may indicate not enabling of user plane integrity protection.

For another example, in a default case, user plane encryption protection is not enabled, and user plane integrity protection is enabled. Then, one piece of bit information in the predefined field is the encryption indication information. Specifically, a bit location 1 in the predefined field may indicate enabling of user plane encryption protection, and a bit location 0 in the predefined field may indicate not enabling of user plane encryption protection.

For another example, in a default case, user plane encryption protection is enabled, and user plane integrity protection is enabled. Then, one piece of bit information in the predefined field is the integrity protection indication information and the encryption indication information. A bit location 1 in the predefined field may indicate enabling of user plane integrity protection and enabling of user plane encryption protection. A bit location 0 in the predefined field may indicate not enabling of user plane integrity protection and not enabling of user plane encryption protection.

Implementation c1-1 (b3)

The integrity protection indication information and the encryption indication information may be represented by bit information in a predefined field in a preset message or a security policy. For example, the predefined field may include two pieces of bit information. One piece of bit information indicates whether user plane encryption needs to be enabled or disabled. The other piece of bit information indicates whether user plane integrity protection needs to be enabled or disabled. That is, one piece of bit information is the encryption indication information, and the other piece of bit information is the integrity protection indication information. For example, the bit information corresponding to the encryption indication information in the predefined field is set to 1, indicating enabling of user plane encryption protection. The bit information corresponding to the integrity protection indication information in the predefined field is set to 1, indicating that the terminal device enables user plane integrity protection. The bit information corresponding to the encryption indication information in the predefined field is set to 0, indicating not enabling of user plane encryption protection. The bit information corresponding to the integrity protection indication information in the predefined field is set to 0, indicating that the terminal device does not enable user plane integrity protection.

Implementation c1-1 (b4)

The integrity protection indication information and the encryption indication information may be represented by bit information in a predefined field in a preset message or a security policy. For example, the predefined field may include four pieces of bit information. One piece of bit information in the predefined field indicates whether user plane encryption protection is enabled. For example, the bit information is set to 1, indicating that user plane encryption protection is enabled, and the bit information is set to 0, indicating that user plane encryption protection is not enabled. One piece of bit information in the predefined field indicates whether a key length of user plane encryption protection is 128 bits or 256 bits. For example, the bit information is set to 1, indicating that the key length of user plane encryption protection is 128 bits, and the bit information is set to 0, indicating that the key length of user plane encryption protection is 256 bits. One piece of bit information in the predefined field indicates whether a key length of user plane integrity protection is 128 bits or 256 bits. The bit information is set to 1, indicating that the key length of user plane integrity protection is 128 bits, that is, a 32-bit MAC value is generated. The bit information is set to 0, indicating that the key length of user plane integrity protection is 256 bits, that is, a 64-bit MAC value is generated. One piece of bit information in the predefined field indicates whether user plane integrity protection is enabled. For example, the bit information is set to 1, indicating that user plane integrity protection is enabled, and the bit information is set to 0, indicating that user plane integrity protection is not enabled.

The integrity protection indication information and/or the encryption indication information may be examples shown in the foregoing implementation c1-1 (b2), implementation c1-1 (b3), and implementation c1-1 (b4), and may be bit information. Alternatively, the integrity protection indication information and/or the encryption indication information may be referred to as switching information.

Further, specific content of the switching information may be combined with a specific method. For example, if user plane encryption protection and user plane integrity protection are enabled, and further, if it is defined in a preset rule that user plane encryption protection is enabled by default but user plane integrity protection needs to be flexibly determined, only 1-bit indication information may be carried in a preset field, and the 1-bit indication information is used to indicate whether user plane integrity protection needs to be enabled. Further, if it is defined in the preset rule that neither user plane encryption protection nor user plane integrity protection is enabled before the integrity protection indication information and the encryption indication information are received, 2-bit indication information may be carried in the preset field, and is respectively used to indicate whether to enable user encryption protection and whether to enable user plane integrity protection.

Implementation c1-1 (b5)

The integrity protection indication information and/or the encryption indication information may be an identifier of an algorithm. In this case, the integrity protection indication information and/or the encryption indication information may be carried in a predefined field in a preset message or a security policy, or may be carried in a security policy. In other words, the base station sends an identifier of an algorithm to the terminal device, the identifier of the algorithm is used to indicate the algorithm, and the identifier of the algorithm is also the integrity protection indication information and/or the encryption indication information.

In an optional implementation, AS SMC transmitted by the base station carries, for example, EIA and EEA numbers in an LTE network, and the EIA and EEA numbers represent a selected integrity protection algorithm and encryption algorithm. The EIA and EEA numbers may be carried to represent the integrity protection indication information, the encryption indication information, the signaling plane integrity protection indication information, and the signaling plane encryption indication information. For example, the EIA number indicates that integrity protection is enabled.

In another optional implementation, the identifier of the algorithm may be extended to four preset fields, which are respectively EIA-RRC, EEA-RRC, EIA-UP, and EEA-UP. A selected algorithm is placed at a corresponding location to represent a current negotiation method. For example, the base station selects EIA-RRC=3 and EEA-RRC=2, and then the integrity protection indication information, the encryption indication information, the signaling plane integrity protection indication information, and the signaling plane encryption indication information may be (EIA-RRC=3, EEA-RRC=2, EIA-UP=0, EEA-UP=0). Therefore, after receiving the information, the terminal device enables signaling plane integrity protection because EIA-RRC is not 0, enables signaling plane encryption protection because EEA-RRC is not 0, does not enable user plane integrity protection because EIA-UP is 0, or does not enable user plane encryption protection because EEA-UP is 0.

Further, in this implementation, the identifier of the algorithm may not only indicate the integrity protection indication information and the encryption indication information, but also indicate the algorithm. That is, in a case in which the embodiment is used, when the identifier of the algorithm is sent, all of the algorithm (for example, a target signaling plane integrity protection algorithm, a target signaling plane encryption protection algorithm, a target user plane integrity protection algorithm, and a target user plane encryption algorithm), the integrity protection indication information, and the encryption indication information may be indicated.

For example, EIA-RRC=3 may further indicate a signaling plane integrity protection algorithm. For another example, EEA-RRC=2 may further indicate a signaling plane encryption protection algorithm, and EIA-UP=0 may further indicate a user plane integrity protection algorithm. For another example, EEA-UP=0 may further indicate a user plane encryption protection algorithm.

In an optional implementation of the embodiment shown in FIG. 2a or FIG. 2b, the integrity protection indication information may be an identifier of an algorithm. For example, when the base station enables user plane integrity protection for the terminal device, the integrity protection indication information may be an identifier of the target user plane integrity protection algorithm.

Optionally, when the base station does not enable user plane integrity protection for the terminal device, the integrity protection indication information may be an identifier of a preset user plane integrity protection algorithm, or may not carry information about any integrity protection algorithm. That is, an identifier of any integrity protection algorithm or the identifier of the preset user plane integrity protection algorithm is not sent, meaning that the integrity protection indication information indicates not to enable integrity protection. For example, it is assumed that the identifier of the preset user plane integrity protection algorithm is X123. If the integrity protection indication information received by the terminal device is X123, the terminal device does not enable user plane integrity protection.

In an optional implementation of the embodiment shown in FIG. 2a or FIG. 2b, the base station may further send encryption indication information to the terminal device, where the encryption indication information is used to indicate the base station whether to enable user plane encryption protection for the terminal device. When the base station enables user plane encryption protection for the terminal device, the encryption indication information may be an identifier of an algorithm. For example, the encryption indication information is an identifier of a target user plane encryption algorithm.

Optionally, when the base station does not enable encryption protection for the terminal device, the encryption indication information may be an identifier of a preset user plane encryption algorithm or an empty encryption algorithm. That is, an identifier of any encryption algorithm is not sent or the empty encryption algorithm or the identifier of the preset user plane encryption algorithm is sent, meaning that the encryption indication information indicates not to enable encryption protection. For example, it is assumed that the identifier of the preset user plane encryption algorithm is X321. If the encryption protection indication information received by the terminal device is X321, the terminal device does not enable user plane encryption protection.

In another optional implementation of the embodiment shown in FIG. 2, FIG. 2a, or FIG. 2b, the base station may further send signaling plane integrity protection indication information to the terminal device, where the signaling plane integrity protection indication information is used to indicate the base station whether to enable signaling plane integrity protection for the terminal device. When the base station enables signaling plane integrity protection for the terminal device, the signaling plane integrity protection indication information may be an identifier of an algorithm. For example, the signaling plane integrity protection indication information is an identifier of a target signaling plane integrity protection algorithm.

Optionally, when the base station does not enable signaling plane integrity protection for the terminal device, the signaling plane integrity protection indication information may be an identifier of a preset signaling plane integrity protection algorithm, or may be information that does not carry any integrity protection algorithm. For example, it is assumed that the identifier of the preset signaling plane integrity protection algorithm is X456. If the signaling plane integrity protection indication information received by the terminal device is X456, the terminal device does not enable signaling plane integrity protection.

In another optional implementation of the embodiment shown in FIG. 2, FIG. 2a, or FIG. 2b, the base station may further send signaling plane encryption indication information to the terminal device, where the signaling plane encryption indication information is used to indicate the base station whether to enable signaling plane encryption protection for the terminal device. When the base station enables signaling plane encryption protection for the terminal device, the signaling plane encryption indication information may be an identifier of an algorithm. For example, the signaling plane encryption indication information is an identifier of a target signaling plane encryption algorithm.

Optionally, when the base station does not enable signaling plane encryption protection for the terminal device, the signaling plane encryption indication information may be an identifier of a preset signaling plane encryption algorithm or an empty encryption algorithm. For example, it is assumed that the identifier of the preset signaling plane encryption algorithm algorithm is X654. If the signaling plane encryption protection indication information received by the terminal device is X654, the terminal device does not enable signaling plane encryption protection.

Implementation c1-1 (b6)

The integrity protection indication information and/or the encryption indication information may be a session ID and 4-bit information in a predefined field in a preset message or a security policy. Therefore, the terminal device needs to enable corresponding user plane security of the session ID based on the bit information. For example, the terminal device has a plurality of session IDs. Then, user plane security solutions corresponding to the session IDs may be different. For example, one session ID is corresponding to enabling of user plane integrity protection and enabling of user plane encryption protection. Another session ID may be corresponding to not enabling of user plane integrity protection and enabling of user plane encryption protection.

Implementation c1-1 (b7)

The integrity protection indication information and/or the encryption indication information may be a session ID and an identifier of an algorithm in a predefined field in a preset message or a security policy.

It can be learned from the foregoing embodiment that, in the foregoing implementation, the implementation corresponding to the identifier of the algorithm and the 4-bit information is relatively flexible, because whether user plane encryption protection is enabled and whether user plane integrity protection is enabled can be specified. It can be learned based on the foregoing embodiment that, a negotiated signaling plane algorithm may be reused as the bit information (that is, an algorithm applicable to the signaling plane is also applicable to the user plane, for example, the determined target signaling plane integrity protection algorithm is also used as the target user plane integrity protection algorithm, and the determined target signaling plane encryption algorithm is also used as the target user plane encryption algorithm). In addition, the identifier of the algorithm may implement a difference between the signaling plane algorithm and the user plane security algorithm, for example, a difference between the signaling plane encryption algorithm and the user plane encryption algorithm, and a difference between the signaling plane integrity protection algorithm and the user plane integrity protection algorithm.

The integrity protection indication information and/or the encryption indication information may be carried in an RRC reconfiguration request message and sent by the base station to the terminal device. In this case, if the current terminal device has enabled user plane encryption protection but not user plane integrity protection, but the current terminal device determines to enable user plane integrity protection, optionally, the RRC reconfiguration request message may only transmit the integrity protection indication information.

The base station may generate and send the integrity protection indication information to the terminal device. In another optional implementation, after receiving the integrity protection indication information and the encryption indication information, the base station generates new indication information (the new indication information may include only the integrity protection indication information), and further adds the new indication information to the RRC reconfiguration request. Because the integrity protection indication information and the encryption indication information may come from an N2 interface and the interface may change after they are sent, the base station further needs to perform, based on a format in the RRC reconfiguration request message, some corresponding processing on the integrity protection indication information and/or the encryption indication information that are to be carried.

In a manner in which the base station sends the integrity protection indication information and/or the encryption indication information, the base station may directly forward the integrity protection indication information and/or the encryption indication information to the terminal device.

In another manner in which the base station sends the integrity protection indication information and/or the encryption indication information, based on that the integrity protection indication information and/or the encryption indication information are/is an identifier of an algorithm, in this case, the base station may determine an identifier of a corresponding target algorithm based on the obtained (for example, received by the base station or obtained through determining by the base station) integrity protection indication information and/or the encryption indication information, and sends the identifier of the corresponding target algorithm to the terminal device. For example, when enabling user plane integrity protection, the base station determines a target user plane integrity protection algorithm, and sends an identifier of the target user plane integrity protection algorithm to the terminal device. When receiving the identifier of the target user plane integrity protection algorithm, the terminal device may enable user plane integrity protection algorithm, and perform user plane integrity protection by using the target user plane integrity protection algorithm.

The integrity protection indication information and/or the encryption indication information may be carried in an RRC reconfiguration request message and sent by the base station to the terminal device. Optionally, when the integrity protection indication information and/or the encryption indication information are/is an identifier of an algorithm, the RRC message may carry the identifier of the algorithm.

For example, when the integrity protection indication information and/or the encryption indication information are/is an identifier of an algorithm, the integrity protection indication information and/or the encryption indication information may be an algorithm list. Optionally, if an algorithm in the algorithm list corresponding to the integrity protection indication information and/or the encryption indication information is an integrity protection algorithm, and the integrity protection algorithm is not an empty algorithm, and if the base station determines that there is not intersection among a user plane integrity protection algorithm supported by the terminal device, a user plane integrity protection algorithm allowed by the base station, and the algorithm list corresponding to the integrity protection indication information and/or the encryption indication information, the base station may select one algorithm that belongs to the user plane integrity protection algorithm supported by the terminal device and that also belongs to the user plane integrity protection algorithm allowed by the base station, as the target user plane integrity protection algorithm. If the algorithm in the algorithm list corresponding to the integrity protection indication information and/or the encryption indication information is an empty algorithm, the base station does not select the target user plane integrity protection algorithm, which may be understood as not enabling user plane integrity protection.

Further, optionally, if the algorithm in the algorithm list corresponding to the integrity protection indication information and/or the encryption indication information is an encryption algorithm, and the encryption algorithm is not an empty encryption algorithm, and if the base station determines that there is not intersection among a user plane encryption algorithm supported by the terminal device, a user plane encryption algorithm allowed by the base station, and the algorithm list corresponding to the integrity protection indication information and/or the encryption indication information, the base station may select one algorithm that belongs to the user plane encryption algorithm supported by the terminal device and that also belongs to the user plane encryption algorithm allowed by the base station, as the target user plane encryption algorithm. If the algorithm in the algorithm list corresponding to the integrity protection indication information and/or the encryption indication information is an empty encryption algorithm, the base station may select an empty encryption algorithm as the target user plane encryption algorithm, which may be understood as not enabling user plane encryption protection.

For another example, when the integrity protection indication information and/or the encryption indication information is an identifier of an algorithm, the integrity protection indication information and/or the encryption indication information may be an algorithm list, and an algorithm may be selected from the algorithm list. If the selected algorithm is an integrity protection algorithm, and the selected integrity protection algorithm is a preset integrity protection algorithm, optionally, before forwarding the selected integrity protection algorithm to the terminal device, the base station checks whether the selected integrity protection algorithm is an algorithm that belongs to a user plane integrity protection algorithm supported by the terminal device and that also belongs to a user plane integrity protection algorithm allowed by the base station. If yes, the selected integrity protection algorithm is sent to the terminal device as the target user plane integrity protection algorithm.

On the other hand, if the selected integrity protection algorithm does not meet a condition that the algorithm belongs to the user plane integrity protection algorithm supported by the terminal device and also belongs to the user plane integrity protection algorithm allowed by the base station, and the selected integrity protection algorithm is not an empty algorithm, the base station needs to select an algorithm that belongs to a user plane integrity protection algorithm supported by the terminal device and that also belongs to a user plane integrity protection algorithm allowed by the base station, as the target user plane integrity protection algorithm, and send the target user plane integrity protection algorithm to the terminal device. On the other hand, if the selected integrity protection algorithm does not meet the condition that the algorithm belongs to the user plane integrity protection algorithm supported by the terminal device and also belongs to the user plane integrity protection algorithm allowed by the base station, and the selected integrity protection algorithm is an empty algorithm, the base station does not select the target user plane integrity protection algorithm, which may be understood as not enabling user plane integrity protection.

Further, on the other hand, optionally, if the selected algorithm is an encryption algorithm, and the selected encryption algorithm is a preset encryption algorithm, optionally, before forwarding the selected encryption algorithm to the terminal device, the base station checks whether the selected encryption algorithm is an algorithm that belongs to the user plane encryption algorithm supported by the terminal device and that also belongs to the user plane encryption algorithm allowed by the base station. If yes, the selected encryption algorithm is sent to the terminal device as the target user plane encryption algorithm.

On the other hand, if the selected encryption algorithm does not meet a condition that the algorithm belongs to the user plane encryption algorithm supported by the terminal device and also belongs to the user plane encryption algorithm allowed by the base station, and the selected encryption algorithm is not an empty algorithm, the base station needs to select an algorithm that belongs to the user plane encryption algorithm supported by the terminal device and that also belongs to the user plane encryption algorithm allowed by the base station, as the target user plane encryption algorithm, and send the target user plane encryption algorithm to the terminal device. On the other hand, if the selected encryption algorithm does not meet the condition that the algorithm belongs to the user plane encryption algorithm supported by the terminal device and also belongs to the user plane encryption algorithm allowed by the base station, and the selected encryption algorithm is an empty algorithm, the base station does not select the target user plane encryption algorithm, which may be understood as not enabling user plane encryption protection.

In this embodiment of this application, the integrity protection indication information and/or the encryption indication information may be carried in an AS security mode command and sent to the terminal device by the base station. Optionally, the signaling plane integrity protection indication information and/or the signaling plane encryption indication information may also be carried in the AS security mode command and sent to the terminal device by the base station.

In an optional implementation, before the terminal device enables user plane integrity protection, the terminal device may verify integrity protection of the AS security mode command. Optionally, the base station performs integrity protection on the AS security mode command by using the user plane integrity protection algorithm. Optionally, after determining based on the security policy that user plane integrity protection is enabled, the base station may perform integrity protection on the AS security mode command by using the user plane integrity protection algorithm. Optionally, the terminal device verifies, by using the user plane integrity protection algorithm, whether integrity protection on the AS security mode command is correct. For example, after finding that user plane integrity protection is activated, the terminal device uses the user plane integrity protection algorithm to verify whether integrity protection on the AS security mode command is correct, and it is not excluded that the user plane integrity protection algorithm is a currently used AS signaling plane integrity protection algorithm. Further, the base station receives an AS security mode end message returned by the terminal device. Optionally, the base station verifies integrity protection on the AS security mode end message by using the user plane integrity protection algorithm. Optionally, after finding that the AS security mode end message carries an integrity protection parameter MAC-I, the base station verifies integrity protection on the AS security mode end message, and it is not excluded that the user plane integrity protection algorithm is a currently used AS signaling plane integrity protection algorithm. Optionally, after receiving the security mode end message, the base station correspondingly enables user plane integrity protection (for example, integrity indication information and encryption indication information indicate to enable user plane integrity protection and not to enable user plane encryption protection, and the base station may enable user plane integrity protection but not user plane encryption protection after receiving the security mode end message). Further, optionally, after correspondingly enabling user plane integrity protection, the base station may send an RRC reconfiguration request message to the terminal device, and further, optionally, the terminal device returns an RRC reconfiguration complete message to the base station.

In another optional implementation, in a case of enabling user plane integrity protection, the integrity protection indication information may be carried in an AS security mode command, and then the AS security mode command is carried in an RRC reconfiguration request message and sent to the terminal device by the base station. Optionally, at least one of the encryption indication information, the signaling plane integrity protection indication information, and the signaling plane encryption indication information may also be carried in an AS security mode command, and then the AS security mode command is carried in an RRC reconfiguration request message and sent to the terminal device by the base station.

Figure 3:
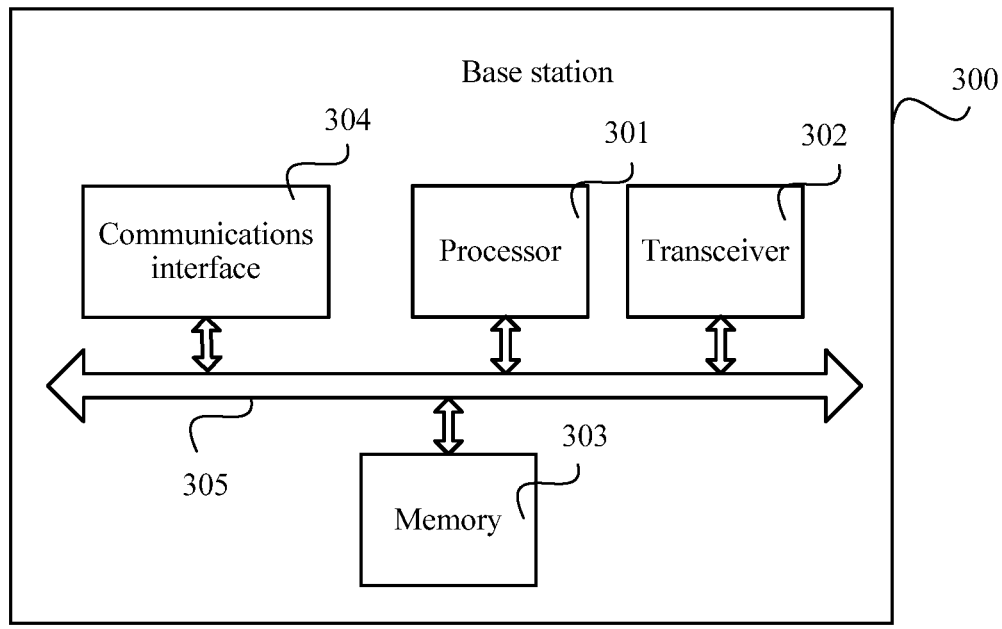
FIG. 3 is a schematic structural diagram of a base station according to an embodiment of this application.

FIG. 3 shows an example of a schematic structural diagram of a base station according to this application.

Based on a same concept, this application provides a base station 300, configured to execute the solution according to any one of the foregoing methods. As shown in FIG. 3, the base station 300 includes a processor 301, a transceiver 302, a memory 303, and a communications interface 304. The processor 301, the transceiver 302, the memory 303, and the communications interface 304 are connected to each other by using a bus 305.

The bus 305 may be a peripheral component interconnect (PCI) bus, an extended industry standard architecture (EISA) bus, or the like. The bus may be categorized as an address bus, a data bus, a control bus, or the like. For ease of indication, the bus is indicated by using only one bold line in FIG. 3. However, it does not indicate that there is only one bus or only one type of bus.

The memory 303 may include a volatile memory, for example, a random access memory (RAM), and may also include a non-volatile memory, for example, a flash memory, a hard disk drive (HDD), or a solid-state drive (SSD); or the memory 303 may include a combination of these types of memories.

The communications interface 304 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor 301 may be a central processing unit (CPU), a network processor (NP), or a combination of a CPU and an NP. The processor 301 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

Optionally, the memory 303 may be further configured to store a program instruction. By invoking the program instruction stored in the memory 303, the processor 301 may perform one or more steps or an optional implementation in the embodiments shown in the foregoing solutions, so that the base station 300 implements a function of the base station in the foregoing methods.

The processor 301 is configured to execute the instruction stored in the memory and control the transceiver 302 to perform signal receiving and signal sending. When the processor 301 executes the instruction stored in the memory, the base station 300 may be configured to execute the following solution.

The processor 301 is configured to obtain a security policy, where the security policy includes integrity protection indication information, and the integrity protection indication information is used to indicate the base station whether to enable integrity protection for a terminal device; and when the integrity protection indication information indicates the base station to enable integrity protection for the terminal device, determine a target user plane integrity protection algorithm. The transceiver 302 is configured to send the target user plane integrity protection algorithm to the terminal device. In this way, whether to enable integrity protection for the terminal device may be selected flexibly based on the security policy. In addition, only when integrity protection is enabled for the terminal device, the base station sends the target user plane integrity protection algorithm to the terminal device. On one hand, because a user plane security algorithm is independently negotiated, flexibility of separately determining the user plane security algorithm and a signaling plane security algorithm is improved. On the other hand, because the integrity protection indication information is added, flexibility of determining the target user plane integrity protection algorithm of the terminal device is improved.

Optionally, the transceiver 302 is configured to send the target user plane integrity protection algorithm to the terminal device by using Radio Resource Control RRC signaling. The solution provided in this embodiment of this application is implemented by reusing RRC signaling in the prior art, so that better compatibility with the prior art is implemented, and a modification to the prior art is relatively small. For a specific optional implementation, refer to the foregoing content, and details are not described herein again.

Optionally, the processor 301 is specifically configured to determine the target user plane integrity protection algorithm based on a user plane integrity protection algorithm supported by the terminal device and a user plane integrity protection algorithm allowed by the base station.

Optionally, the user plane integrity protection algorithm allowed by the base station is a user plane integrity protection algorithm sorted based on a priority, or the user plane integrity protection algorithm supported by the terminal device is a user plane integrity protection algorithm sorted based on a priority.

Optionally, the security policy further includes a user plane integrity protection algorithm allowed by a serving network. The processor 301 is configured to determine the target user plane integrity protection algorithm based on the user plane integrity protection algorithm allowed by the base station, the user plane integrity protection algorithm supported by the terminal device, and the user plane integrity protection algorithm allowed by the serving network.

Optionally, the user plane integrity protection algorithm allowed by the serving network is a user plane integrity protection algorithm sorted based on a priority.

Optionally, the processor 301 is further configured to: when the security policy further includes encryption indication information, and the encryption indication information is used to indicate the base station to enable encryption protection for the terminal device, send a target user plane encryption algorithm to the terminal device by using the transceiver 302; or when the security policy further includes a key length, send the key length to the terminal device by using the transceiver 302; or when the security policy further includes D-H indication information, and the D-H indication information is used to indicate the base station to enable D-H for the terminal device, send a D-H related key to the terminal device by using the transceiver 302.

Optionally, the transceiver 302 is specifically configured to receive quality of service of a current session of the terminal device from a session management function SMF entity, and the processor 301 is further configured to allocate a target data radio bearer to the terminal device based on at least one of the security policy and the quality of service.

For a specific manner of allocating, by the processor 301, the target data radio bearer to the terminal device based on at least one of the security policy and the quality of service, refer to content in the foregoing method embodiments. Details are not described herein again.

In an optional implementation solution, the processor 301 is configured to set up the target data radio bearer for the terminal device based on at least one of the security policy and the quality of service.

Optionally, the transceiver 302 is configured to receive the security policy from the SMF entity; or receive an identifier of the security policy from the SMF entity, and obtain the security policy based on the identifier of the security policy.

Optionally, the processor 301 is further configured to: obtain a signaling plane security algorithm supported by the terminal device; and determine a target signaling plane security algorithm based on the signaling plane security algorithm supported by the terminal device and a signaling plane security algorithm allowed by the base station; and the transceiver 302 is further configured to add the target signaling plane security algorithm to an access stratum AS security mode command SMC and send the AS SMC to the terminal device.

Figure 4:
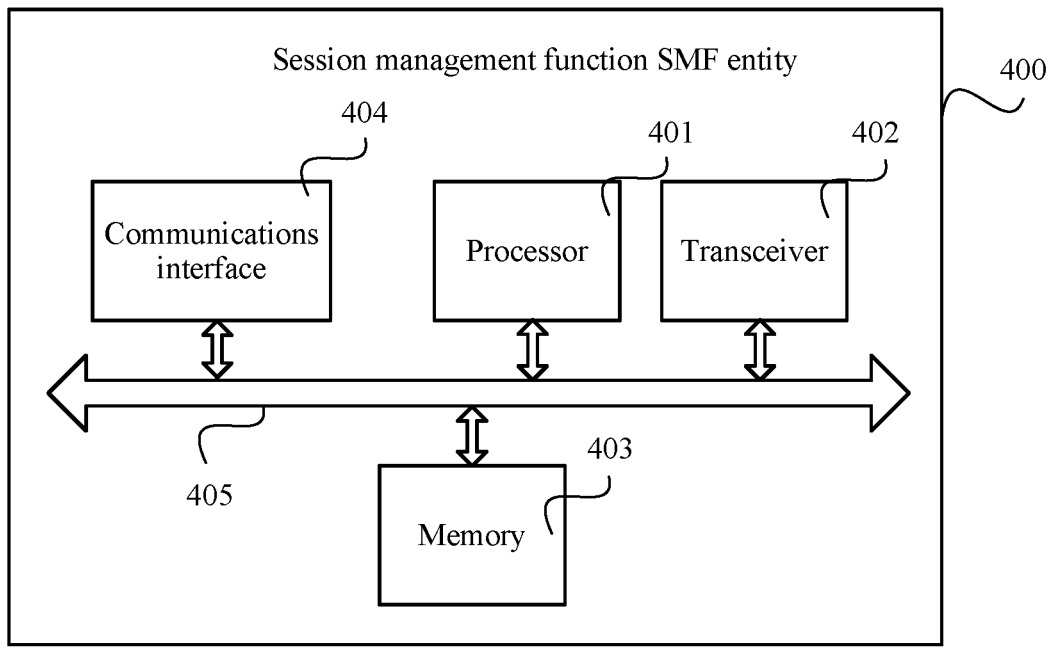
FIG. 4 is a schematic structural diagram of a terminal device according to an embodiment of this application.

FIG. 4 shows an example of a schematic structural diagram of an SMF entity according to this application.

Based on a same concept, this application provides an SMF entity 400, configured to execute the solution according to any one of the foregoing methods. As shown in FIG. 4, the SMF entity 400 includes a processor 401, a transceiver 402, a memory 403, and a communications interface 404. The processor 401, the transceiver 402, the memory 403, and the communications interface 404 are connected to each other by using a bus 405.

The bus 405 may be a peripheral component interconnect (PCI) bus, an extended industry standard architecture (EISA) bus, or the like. The bus may be categorized as an address bus, a data bus, a control bus, or the like. For ease of indication, the bus is indicated by using only one bold line in FIG. 4. However, it does not indicate that there is only one bus or only one type of bus.

The memory 403 may include a volatile memory, for example, a random access memory (RAM), and may also include a non-volatile memory, for example, a flash memory, a hard disk drive (HDD), or a solid-state drive (SSD); or the memory 403 may include a combination of these types of memories.

The communications interface 404 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor 401 may be a central processing unit (CPU), a network processor (NP), or a combination of a CPU and an NP. The processor 401 may further include a hardware chip. The hardware chip may be an application-specific integrated circuit (ASIC), a programmable logic device (PLD), or a combination thereof. The PLD may be a complex programmable logic device (CPLD), a field-programmable gate array (field-programmable gate array, FPGA), a generic array logic (GAL), or any combination thereof.

Optionally, the memory 403 may be further configured to store a program instruction. By invoking the program instruction stored in the memory 403, the processor 401 may perform one or more steps or an optional implementation in the embodiments shown in the foregoing solutions, so that the SMF entity 400 implements a function of the SMF entity in the foregoing methods.

The processor 401 is configured to execute the instruction stored in the memory and control the transceiver 402 to perform signal receiving and signal sending. When the processor 401 executes the instruction stored in the memory, the SMF entity 400 may be configured to execute the following solution.

The transceiver 402 is configured to receive a request message, where the request message includes a parameter related to a security policy, and send the security policy or an identifier of the security policy to a base station. The processor 401 is configured to obtain the security policy or the identifier of the security policy based on the parameter related to the security policy. The security policy includes integrity protection indication information, and the integrity protection indication information is used to indicate the base station whether to enable integrity protection for a terminal device. On one hand, because a user plane security algorithm is independently negotiated, flexibility of separately determining the user plane security algorithm and a signaling plane security algorithm is improved. On the other hand, because the integrity protection indication information is added, flexibility of determining a target user plane integrity protection algorithm of the terminal device is improved.

In an optional implementation solution, the parameter related to the security policy includes at least one of an identifier of the terminal device, a data network name DNN of the terminal device, an identifier of a slice of the terminal device, quality of service of the terminal device, and a session identifier of the terminal device. In this way, the security policy may be formulated based on different identifiers from different perspectives or at different granularities, and this is more flexible.

Optionally, the processor 401 is configured to: when the parameter related to the security policy includes the identifier of the terminal device, obtain the security policy based on the identifier of the terminal device and an association relationship between the identifier of the terminal device and the security policy. In this way, the security policy may be determined at a granularity of the terminal device, so that different terminal devices can be corresponding to different security policies.

In another optional implementation, the processor 401 is configured to: when the parameter related to the security policy includes the identifier of the slice of the terminal device, obtain, by the SMF entity, the security policy based on the identifier of the slice of the terminal device and an association relationship between the identifier of the slice and the security policy. In this way, the security policy may be determined at a granularity of the slice, so that a terminal device accessing different slices can be corresponding to different security policies.

In another optional implementation, the processor 401 is configured to: when the parameter related to the security policy includes the session identifier of the terminal device, obtain, by the SMF entity, the security policy based on the session identifier of the terminal device and an association relationship between the session identifier and the security policy. In this way, the security policy may be determined at a granularity of a session, so that a terminal device initiating different sessions can be corresponding to different security policies.

In another optional implementation, the processor 401 is configured to: when the parameter related to the security policy includes the quality of service of the terminal device, obtain, by the SMF entity, the security policy based on the quality of service of the terminal device. In this way, the security policy may be determined at a granularity of the quality of service, so that a terminal device initiating different quality of service can be corresponding to different security policies.

Optionally, the security policy further includes at least one of the following content: encryption indication information, where the encryption indication information is used to indicate the base station to enable encryption protection for the terminal device; a key length; D-H indication information, where the D-H indication information is used to indicate the base station to enable D-H for the terminal device; and a user plane integrity protection algorithm allowed by a serving network. In this way, any information in the security policy may be more flexibly indicated, so that a finally determined security policy is more adapted to a complex application scenario.

Figure 5:
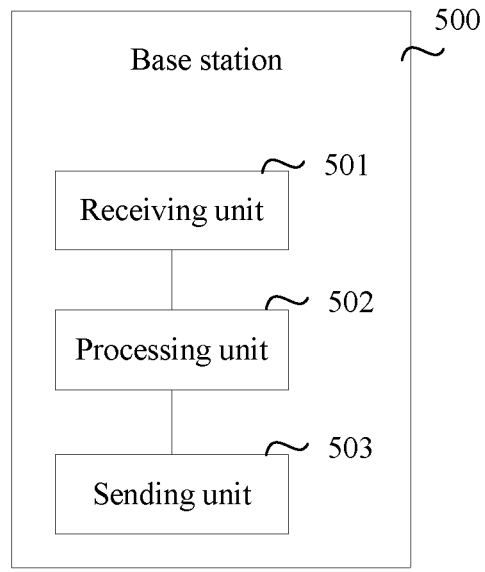
FIG. 5 is a schematic structural diagram of another base station according to an embodiment of this application.

FIG. 5 shows an example of a schematic structural diagram of a base station according to an embodiment of this application.

Based on a same concept, this embodiment of this application provides a base station, configured to execute the solution according to any one of the foregoing method procedures. As shown in FIG. 5, the base station 500 includes a receiving unit 501, a processing unit 502, and a sending unit 503.

The processing unit 502 is configured to obtain a security policy, where the security policy includes integrity protection indication information, and the integrity protection indication information is used to indicate the base station whether to enable integrity protection for a terminal device; and when the integrity protection indication information indicates the base station to enable integrity protection for the terminal device, send a target user plane integrity protection algorithm to the terminal device by using the sending unit 503. The sending unit 503 is configured to send the target user plane integrity protection algorithm to the terminal device. In this way, whether to enable integrity protection for the terminal device may be selected flexibly based on the security policy. In addition, only when integrity protection is enabled for the terminal device, the base station sends the target user plane integrity protection algorithm to the terminal device. On one hand, because a user plane security algorithm is independently negotiated, flexibility of separately determining the user plane security algorithm and a signaling plane security algorithm is improved. On the other hand, because the integrity protection indication information is added, flexibility of determining the target user plane integrity protection algorithm of the terminal device is improved.

Optionally, the sending unit 503 is configured to send the target user plane integrity protection algorithm to the terminal device by using Radio Resource Control RRC signaling. The solution provided in this embodiment of this application is implemented by reusing RRC signaling in the prior art, so that better compatibility with the prior art is implemented, and a modification to the prior art is relatively small. For a specific optional implementation, refer to the foregoing content, and details are not described herein again.

Optionally, before sending the target user plane integrity protection algorithm to the terminal device by using the sending unit 503, the processing unit 502 is further configured to determine the target user plane integrity protection algorithm based on a user plane integrity protection algorithm supported by the terminal device and a user plane integrity protection algorithm allowed by the base station.

Optionally, the user plane integrity protection algorithm allowed by the base station is a user plane integrity protection algorithm sorted based on a priority, or the user plane integrity protection algorithm supported by the terminal device is a user plane integrity protection algorithm sorted based on a priority.

Optionally, the security policy further includes a user plane integrity protection algorithm allowed by a serving network. The processing unit 502 is configured to determine the target user plane integrity protection algorithm based on the user plane integrity protection algorithm allowed by the base station, the user plane integrity protection algorithm supported by the terminal device, and the user plane integrity protection algorithm allowed by the serving network.

Optionally, the user plane integrity protection algorithm allowed by the serving network is a user plane integrity protection algorithm sorted based on a priority.

Optionally, the processing unit 502 is further configured to: when the security policy further includes encryption indication information, and the encryption indication information is used to indicate the base station to enable encryption protection for the terminal device, send a target user plane encryption algorithm to the terminal device by using the sending unit 503; or when the security policy further includes a key length, send the key length to the terminal device by using the sending unit 503; or when the security policy further includes D-H indication information, and the D-H indication information is used to indicate the base station to enable D-H for the terminal device, send a D-H related key to the terminal device by using the sending unit 503.

Optionally, before the target user plane integrity protection algorithm is sent to the terminal device by using the sending unit 503, the receiving unit 501 is configured to receive quality of service of a current session of the terminal device from a session management function SMF entity; and the processing unit 502 is further configured to allocate a target data radio bearer to the terminal device based on at least one of the security policy and the quality of service.

The processing unit 502 is further configured to allocate the target data radio bearer to the terminal device based on at least one of the security policy and the quality of service. For a specific manner, refer to content in the foregoing method embodiments. Details are not described herein again.

In an optional implementation solution, the processing unit 502 is configured to set up the target data radio bearer for the terminal device based on at least one of the security policy and the quality of service.

Optionally, the receiving unit 501 is configured to receive the security policy from the SMF entity; or receive an identifier of the security policy from the SMF entity and obtain the security policy based on the identifier of the security policy.

Optionally, the processing unit 502 is further configured to: obtain a signaling plane security algorithm supported by the terminal device; and determine a target signaling plane security algorithm based on the signaling plane security algorithm supported by the terminal device and a signaling plane security algorithm allowed by the base station; and the sending unit 503 is further configured to add the target signaling plane security algorithm to an access stratum AS security mode command SMC and send the AS SMC to the terminal device.

It should be understood that division of the foregoing units is merely logical function division. In actual implementation, all or some of units may be integrated into one physical entity, or may be physically separate. In this embodiment of this application, the receiving unit 501 and the sending unit 503 may be implemented by the transceiver 302, and the processing unit 502 may be implemented by the processor 301. As shown in FIG. 3, the base station 300 may include the processor 301, the transceiver 302, and the memory 303. The memory 303 may be configured to store code used when the processor 301 executes a solution, and the code may be a program/code pre-installed when the base station 300 is delivered from a factory.

Figure 6:
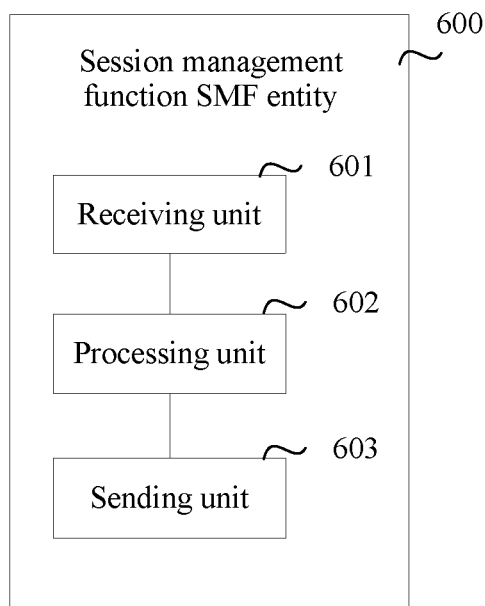
FIG. 6 is a schematic structural diagram of another terminal device according to an embodiment of this application.

FIG. 6 shows an example of a schematic structural diagram of an SMF entity according to an embodiment of this application.

Based on a same concept, this embodiment of this application provides an SMF entity, configured to execute the solution according to any one of the foregoing method procedures. As shown in FIG. 6, an SMF entity 600 includes a receiving unit 601 and a processing unit 602. Optionally, the SMF entity 600 further includes a sending unit 603.

The receiving unit 601 is configured to receive a request message, where the request message includes a parameter related to a security policy, and send the security policy or an identifier of the security policy to a base station. The processing unit 602 is configured to obtain the security policy or the identifier of the security policy based on the parameter related to the security policy. The security policy includes integrity protection indication information, and the integrity protection indication information is used to indicate the base station whether to enable integrity protection for a terminal device. On one hand, because a user plane security algorithm is independently negotiated, flexibility of separately determining the user plane security algorithm and a signaling plane security algorithm is improved. On the other hand, because the integrity protection indication information is added, flexibility of determining a target user plane integrity protection algorithm of the terminal device is improved.

In an optional implementation solution, the parameter related to the security policy includes at least one of an identifier of the terminal device, a data network name DNN of the terminal device, an identifier of a slice of the terminal device, quality of service of the terminal device, and a session identifier of the terminal device. In this way, the security policy may be formulated based on different identifiers from different perspectives or at different granularities, and this is more flexible.

Optionally, the processing unit 602 is configured to: when the parameter related to the security policy includes the identifier of the terminal device, obtain, by the SMF entity, the security policy based on the identifier of the terminal device and an association relationship between the identifier of the terminal device and the security policy. In this way, the security policy may be determined at a granularity of the terminal device, so that different terminal devices can be corresponding to different security policies.

In another optional implementation, the processing unit 602 is configured to: when the parameter related to the security policy includes the identifier of the slice of the terminal device, obtain, by the SMF entity, the security policy based on the identifier of the slice of the terminal device and an association relationship between the identifier of the slice and the security policy. In this way, the security policy may be determined at a granularity of the slice, so that a terminal device accessing different slices can be corresponding to different security policies.

In another optional implementation, the processing unit 602 is configured to: when the parameter related to the security policy includes the session identifier of the terminal device, obtain, by the SMF entity, the security policy based on the session identifier of the terminal device and an association relationship between the session identifier and the security policy. In this way, the security policy may be determined at a granularity of a session, so that a terminal device initiating different sessions can be corresponding to different security policies.

In another optional implementation, the processing unit 602 is configured to: when the parameter related to the security policy includes the quality of service of the terminal device, obtain, by the SMF entity, the security policy based on the quality of service of the terminal device. In this way, the security policy may be determined at a granularity of the quality of service, so that a terminal device initiating different quality of service can be corresponding to different security policies.

Optionally, the security policy further includes at least one of the following content: encryption indication information, where the encryption indication information is used to indicate the base station to enable encryption protection for the terminal device; a key length; D-H indication information, where the D-H indication information is used to indicate the base station to enable D-H for the terminal device; and a user plane integrity protection algorithm allowed by a serving network. In this way, any information in the security policy may be more flexibly indicated, so that a finally determined security policy is more adapted to a complex application scenario.

It should be understood that division of the foregoing units is merely logical function division. In actual implementation, all or some of units may be integrated into one physical entity, or may be physically separate. In this embodiment of this application, the receiving unit 601 and the sending unit 603 may be implemented by the transceiver 402, and the processing unit 602 may be implemented by the processor 401. As shown in FIG. 4, the SMF entity 400 may include the processor 401, the transceiver 402, and the memory 403. The memory 403 may be configured to store code used when the processor 401 executes a solution, and the code may be a program/code pre-installed when the SMF entity 400 is delivered from a factory.

In the foregoing embodiments, all or some of the functions may be implemented by using software, hardware, firmware, or any combination thereof. When being implemented by using a software program, all or some of the functions may be implemented in a form of a computer program product. The computer program product includes one or more instructions. When the computer program instructions are loaded and executed on a computer, the procedures or functions according to the embodiments of this application are all or partially generated. The computer may be a general-purpose computer, a dedicated computer, a computer network, or another programmable apparatus. The instructions may be stored in a computer storage medium or may be transmitted from one computer storage medium to another computer storage medium. For example, the instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible to a computer, or a data storage device, such as a server or a data center, integrating one or more usable media. The usable medium may be a magnetic medium (for example, a floppy disk, a hard disk, or a magnetic tape, or a magneto-optical disk (MO)), an optical medium (for example, a CD, a DVD, a BD, or an HVD), a semiconductor medium (for example, a ROM, an EPROM, an EEPROM, a non-volatile memory (NAND FLASH), or a solid state disk (Solid State Disk, SSD)), or the like.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. A communication method, comprising:
   receiving, by a terminal device, an access stratum (AS) security mode command (SMC) from a base station;
   after receiving the AS SMC, generating, by the terminal device, a signaling plane encryption protection key, a signaling plane integrity protection key, a user plane encryption protection key, and a user plane integrity protection key;
   enabling, by the terminal device, signaling plane protection using the signaling plane encryption protection key and the signaling plane integrity protection key;
   receiving, by the terminal device, a Radio Resource Control (RRC) reconfiguration message from the base station; and
   enabling, by the terminal device, user plane integrity protection for a protocol data unit (PDU) session using the user plane integrity protection key when the RRC reconfiguration message includes integrity protection indication information, wherein the integrity protection indication information is configured to instruct enabling the user plane integrity protection.

2. The method according to claim 1, wherein the integrity protection indication information is expressed by one bit, and wherein the integrity protection indication information indicates enabling the user plane integrity protection when a value of the bit is 1.

3. The method according to claim 1, further comprising enabling, by the terminal device, user plane encryption protection for the PDU session using the user plane encryption protection key when the RRC reconfiguration message includes encryption protection indication information, wherein the encryption protection indication information is configured to instruct enabling the user plane encryption protection.

4. The method according to claim 3, wherein the encryption protection indication information is expressed by one bit, and wherein the encryption protection indication information indicates enabling the user plane encryption protection when a value of the bit is 1.

5. The method according to claim 1, further comprising sending, by the terminal device, an AS SMC complete message to the base station.

6. An apparatus, comprising:
   a processor coupled to a transceiver;
   a memory storing instructions which, when executed by the processor, cause the processor to: implement:
   receive, via the transceiver, an access stratum (AS) security mode command (SMC) from a base station;
   after receiving the AS SMC, generate a signaling plane encryption protection key, a signaling plane integrity protection key, a user plane encryption protection key, and a user plane integrity protection key;
   enable signaling plane protection using the signaling plane encryption protection key and the signaling plane integrity protection key;
   receive, via the transceiver, a Radio Resource Control (RRC) reconfiguration message from the base station; and
   enable, via the transceiver, user plane integrity protection for a protocol data unit (PDU) session using the user plane integrity protection key when the RRC reconfiguration message includes integrity protection indication information, wherein the integrity protection indication information is configured to instruct enabling the user plane integrity protection.

7. The apparatus according to claim 6, wherein the integrity protection indication information is expressed by one bit, and wherein the integrity protection indication information indicates enabling the user plane integrity protection when a value of the bit is 1.

8. The apparatus according to claim 6, wherein the instructions cause the processor to enable user plane encryption protection for the PDU session using the user plane encryption protection key when the RRC reconfiguration message includes encryption protection indication information, and wherein encryption protection indication information is configured to instruct enabling the user plane encryption protection.

9. The apparatus according to claim 8, wherein the encryption protection indication information is expressed by one bit, and wherein the encryption protection indication information indicates enabling the user plane encryption protection when a value of the bit is 1.

10. The apparatus according to claim 6, wherein the instructions II cause the transceiver to send an AS SMC complete message to the base station.

11. A non-transitory computer storage medium, wherein the non-transitory computer readable storage medium stores instructions which, when executed by a processor, cause the processor to:
    receive an access stratum (AS) security mode command (SMC) from a base station;
    after receiving the AS SMC, generate a signaling plane encryption protection key, a signaling plane integrity protection key, a user plane encryption protection key and a user plane integrity protection key;

enable signaling plane protection using the signaling plane encryption protection key and the signaling plane integrity protection key;

receive a Radio Resource Control (RRC) reconfiguration message from the base station; and enable user plane integrity protection for a protocol data unit (PDU) session using the user plane integrity protection key when the RRC reconfiguration message includes integrity protection indication information, wherein the integrity protection indication information is configured to instruct enabling the user plane integrity protection.

12. The non-transitory computer storage medium according to claim 11, wherein the integrity protection indication information is expressed by one bit, and wherein the integrity protection indication information indicates enabling the user plane integrity protection when a value of the bit is 1.

13. The non-transitory computer storage medium according to claim 11, wherein the instructions further cause the processor to protection enable user plane encryption protection for the PDU session using the user plane encryption protection key when the RRC reconfiguration message includes encryption protection indication information, and wherein the encryption protection indication information is configured to instruct enabling the user plane encryption protection.

14. The non-transitory computer storage medium according to claim 13, wherein the encryption protection indication information is expressed by one bit, and wherein the encryption protection indication information indicates enabling the user plane encryption protection when a value of the bit is 1.

15. The non-transitory computer storage medium according to claim 11, wherein the instructions cause the processor to send an AS security mode command complete message to the base station.

* * * * *

UNITED STATES PATENT AND TRADEMARK OFFICE
CERTIFICATE OF CORRECTION

PATENT NO. : 10,798,578 B2
APPLICATION NO. : 16/386462
DATED : October 6, 2020
INVENTOR(S) : He Li, Jing Chen and Li Hu It is certified that error appears in the above-identified patent and that said Letters Patent is hereby corrected as shown below:

In the Claims

Claim 6, Column 76, Line 15: "processor to: implement:" should read "processor to:"
Claim 8, Column 76, Line 43: "instructions cause" should read "instructions further cause"
Claim 10, Column 76, Line 56: "instructions II cause" should read "instructions further cause"
Claim 15, Column 78, Line 15: "instructions cause" should read "instructions further cause"

Signed and Sealed this
Seventeenth Day of November, 2020

Andrei Iancu
*Director of the United States Patent and Trademark Office*